(12) United States Patent
Maeda et al.

(10) Patent No.: US 6,695,259 B1
(45) Date of Patent: Feb. 24, 2004

(54) COMMUNICATION SYSTEM, COMMUNICATION RECEIVING DEVICE AND COMMUNICATION TERMINAL IN THE SYSTEM

(75) Inventors: Toshihide Maeda, Sagamihara (JP); Nobuo Hamano, Tokyo (JP); Shigeki Nakamura, Tokyo (JP); Tomiharu Yoshida, Hitachinaka (JP); Masataka Owada, Hitachi (JP); Masahiko Ikeda, Hitachi (JP); Takashi Yabutani, Hitachinaka (JP); Masahiro Ito, Shimizu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/471,503

(22) Filed: Dec. 23, 1999

Related U.S. Application Data

(63) Continuation-in-part of application No. 09/081,551, filed on May 20, 1998, now Pat. No. 6,352,222.

(30) Foreign Application Priority Data

| | | |
|---|---|---|
| May 21, 1997 | (JP) | 9-131216 |
| Jun. 20, 1997 | (JP) | 9-164296 |
| Jul. 6, 1999 | (JP) | 11-191211 |

(51) Int. Cl.$^7$ ................................. B64G 1/00
(52) U.S. Cl. ................... 244/158 R; 455/427; 455/429; 455/430
(58) Field of Search .................. 244/158 R; 455/427, 455/429, 430

(56) References Cited

U.S. PATENT DOCUMENTS

| | | |
|---|---|---|
| 4,827,421 A | 5/1989 | Dondl |
| 4,943,808 A | 7/1990 | Dulck et al. |
| 5,400,336 A | 3/1995 | Boyer et al. |
| 5,582,367 A * | 12/1996 | Castiel et al. ........... 244/158 R |
| 5,641,134 A * | 6/1997 | Vatt ...................... 244/158 R |
| 5,871,181 A * | 2/1999 | Mass .................... 244/158 R |
| 5,931,417 A * | 8/1999 | Castiel ................. 244/158 R |
| 6,102,335 A * | 8/2000 | Castiel et al. ........... 244/158 R |
| 6,325,332 B1 * | 12/2001 | Cellier et al. .......... 244/158 R |

FOREIGN PATENT DOCUMENTS

| | | |
|---|---|---|
| JP | 61-144139 | 7/1986 |
| JP | 62-219727 | 9/1987 |
| JP | 1-176966 | 7/1989 |
| JP | 1-272235 | 10/1989 |
| JP | 2-128996 | 5/1990 |
| JP | 5-268131 | 10/1993 |

OTHER PUBLICATIONS

"Preliminary Study of Mobile Satellite Communication System using Non–Geostationary Satellite Orbit", IEICE (The Institute of Electronics, Information, and Communication Engineers), Technical Report, vol. 89, No. 57, 1989.

* cited by examiner

Primary Examiner—J. Woodrow Eldred
(74) Attorney, Agent, or Firm—Antonelli, Terry, Stout & Kraus, LLP

(57) ABSTRACT

A communication line not affected by artificial structures and plants is established between mobile objects and stationary stations surrounded with skyscrapers, and economical artificial satellite service capable of efficiently performing satellite broadcast, mobile satellite communication, satellite-to-satellite communication and earth surveillance is provided using the communication line and by constructing the system with a small number of satellites.

Six orbital elements 7–12 of a plurality of artificial satellites at reference time 5 are determined, and a plurality of elliptical orbits corresponding to the determined six orbital elements are combined, and then each of the satellites is appropriately arranged on each of the orbits to form a group of artificial satellites. Satellite communication or satellite broadcast is performed using the group of artificial satellites.

32 Claims, 49 Drawing Sheets

50···EARTH  51···EQUATIONAL PLATE  60, 61, 62···SATELLITES
63···ORBIT OF SATELLITE 60  64···ORBIT OF SATELLITE 61
65···ORBIT OF SATELLITE 62  66···NORTH-BOUND NODE OF ORBIT 63
67···NORTH-BOUND NODE OF ORBIT 64
68···NORTH-BOUND NODE OF ORBIT 65

70a···SATELLITE a   70b···SATELLITE b   70c···SATELLITE c
70d···SATELLITE d   71a···ORBIT OF SATELLITE 70a
71b···ORBIT OF SATELLITE 70b   71c···ORBIT OF SATELLITE 70c
71d···ORBIT OF SATELLITE 70d   72a···NORTH-BOUND NODE OF ORBIT 71a
72b···NORTH-BOUND NODE OF ORBIT 71b   72c···NORTH-BOUND NODE OF ORBIT 71c
72d···NORTH-BOUND NODE OF ORBIT 71d

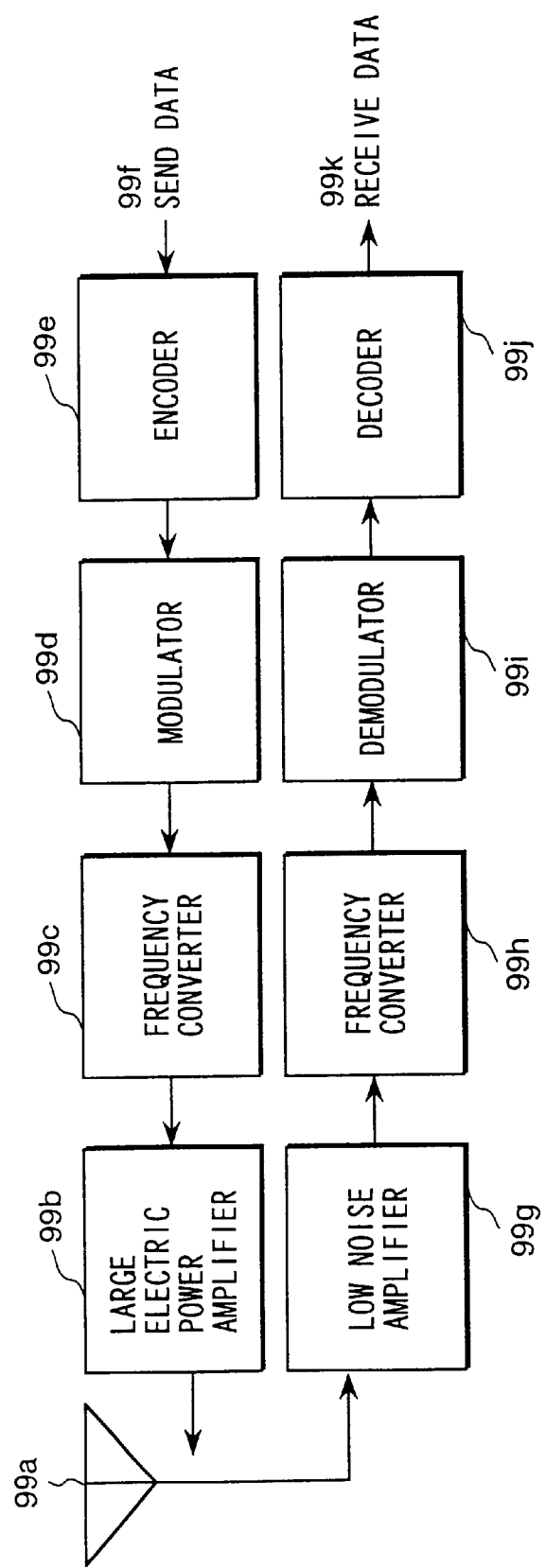

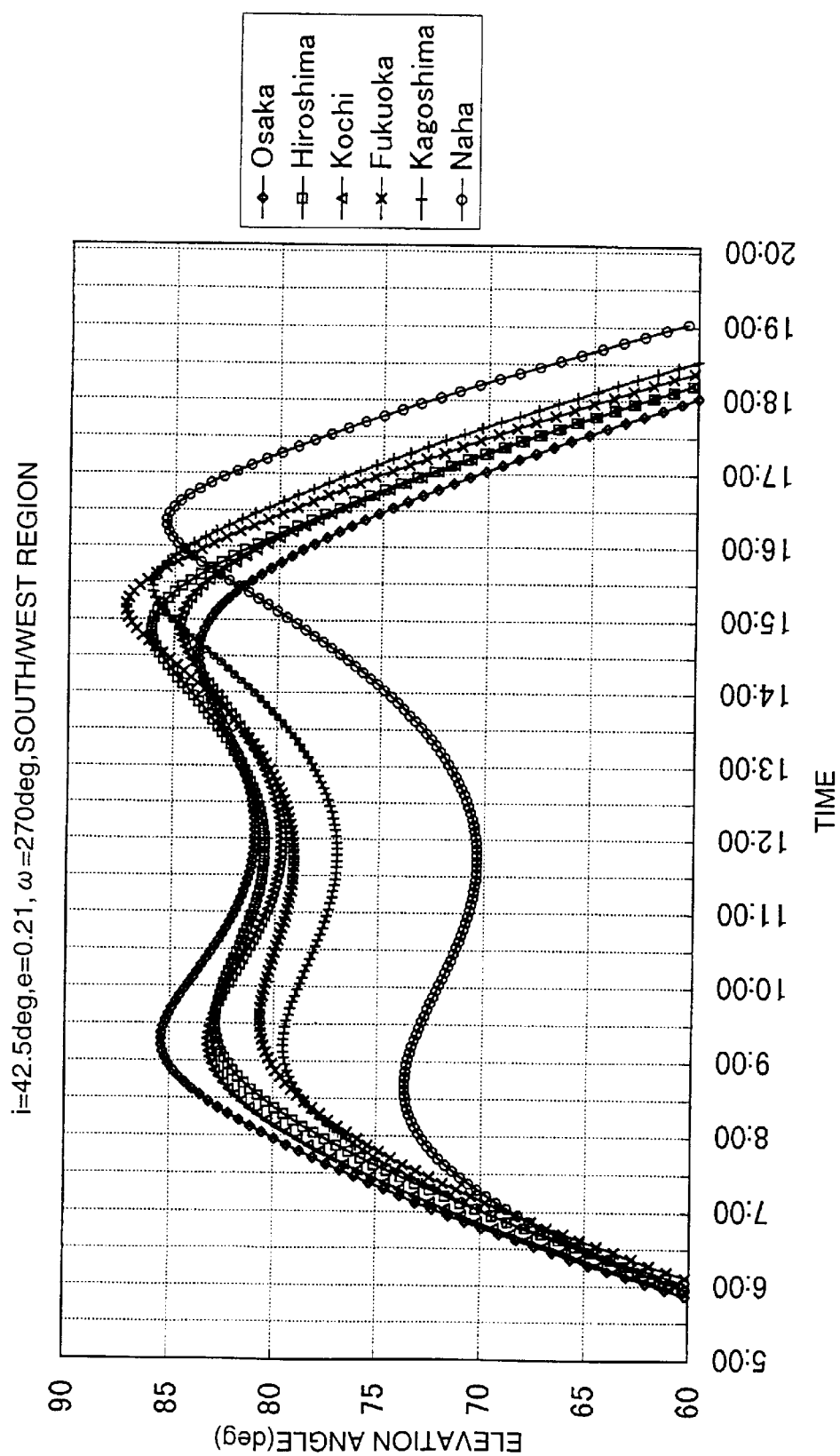
FIG.37A  i=42.5deg, e=0.21, ω=270deg, SOUTH/WEST REGION

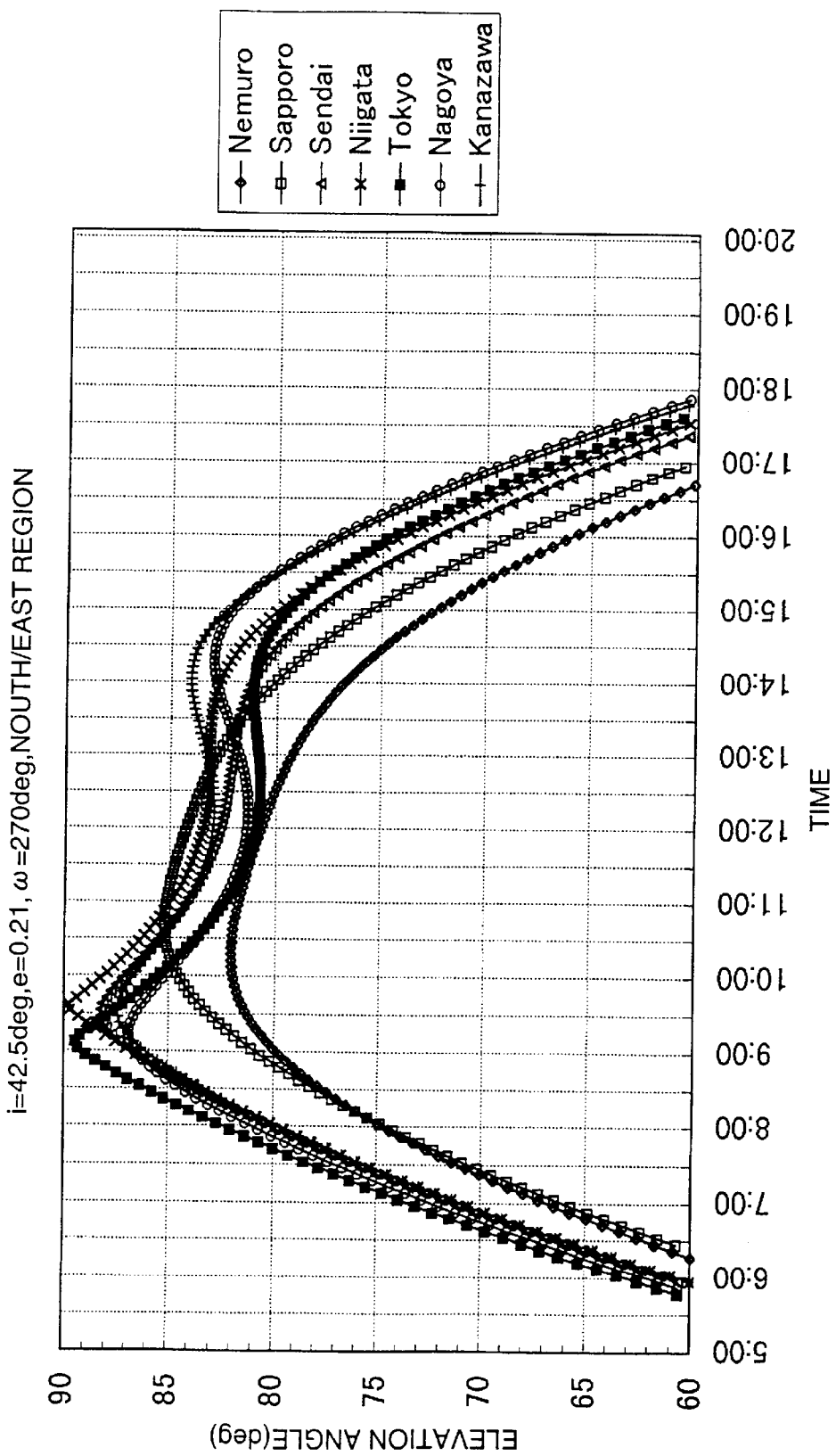

COMMUNICATION SYSTEM, COMMUNICATION RECEIVING DEVICE AND COMMUNICATION TERMINAL IN THE SYSTEM

CROSS REFERENCE TO RELATED APPLICATION

This is a continuation-in-part of U.S. application Ser. No. 09/081,551, filed May 20, 1998, now U.S. Pat. No. 6,352,222, the subject matter of which is incorporated by reference herein.

BACKGROUND OF THE INVENTION

The present invention relates to a communication system, and a communication sending and receiving device and a communication terminal in the system, and particularly to a communication system suitable for a satellite, a satellite orbit and a satellite orbit configuration algorithm usable in the field of communication and broadcast such as satellite communication, satellite broadcast, satellite mobile communication and in the field of observation with regard to a celestial body of the satellite traveling around, and suitable for a communication and broadcast system to which the satellite is applied, and a satellite communication sending and receiving device and a communication terminal in the system.

(a) The Prior Art with Regard to Setting of an Orbital Element (Argument of Perigee) of an Artificial Satellite In a case where an artificial satellite is traveling around the earth as the center, the orbit of the artificial satellite always fluctuates under the influence of the nonuniformity of the earth's gravitational field, the attractive forces of the moon and the sun, the atmospheric drag and the sun's light pressure. From this viewpoint, the orbit of the artificial satellite traveling around the earth as the center can not be a circular orbit but is an elliptical orbit in a broad sense having a little eccentricity.

Accordingly, the "elliptical orbit" in the present specification is defined as an "orbit having an eccentricity larger than zero and smaller than 1, and the eccentricity is not intended to become zero in a process of setting an orbital element of the orbit onto which the artificial satellite is injected in order to attain the purpose".

As an example of practically used artificial satellites having an elliptical orbit, there is the Molniya satellite (about a 12-hour orbital period) which has been used by Russia since the era of the former USSR. As artificial satellites having an elliptical orbit, a communication satellite called as Archimedes (about an 8-hour orbital period) is proposed in Europe. Further, a tundra orbit of about a 24-hour orbital period is proposed though it is not practically used yet. A common point in these satellites is that all the satellites has an orbital inclination angle of approximately 63.4 degrees.

In general, the perigee of an orbit on which an artificial satellite is traveling will rotate on the orbital plane under the influence of the nonuniformity of the earth's gravitational field (oblateness of the earth's shape). However, by setting an orbital inclination angle to 63.4 degrees in a mathematical model for calculating a time-varying rate of the argument of perigee, a multiplicative term becomes zero to make the time-varying rate zero. Therefore, it is considered that the rotation is stopped.

(b) The Prior Art with Regard to Orbit Configuration Methods for a Plurality of Artificial Satellites Communication systems using a plurality of artificial satellites traveling on elliptical orbits have been in practical use and studied. Although arranging of a plurality of artificial satellites in the above-mentioned Molniya satellite and Archimedes is described, no detailed method of arranging the orbits is described.

Although in resent years a communication system using a plurality of artificial satellites is proposed, no detailed technique with regard to orbit configuration method is disclosed. Therefore, a detailed orbit configuration technique is required.

On the other hand, "an artificial satellite on an orbit having a long stretch of time staying in the zenith direction, a method of controlling the orbit and a communication system using the artificial satellite and the method" is proposed in Japanese Patent Application Laid-Open No.11-34996.

(c) The Prior Art with Regard to Mobile Communication and Broadcast to a Mobile Object In the past, when a television broadcast was tried to receive in a mobile object such as a vehicle, there were problems in that the picture came out badly in an area far from a broadcasting facility of a television station, that screen flicker occurred even at a place near the broadcasting facility of the television station, and that receivable channel varied by moving. When a television broadcast from a communication and broadcast satellite on a stationary orbit was received on the mobile object, it was difficult to comfortably enjoy watching television on the mobile object because the electromagnetic wave was frequently shielded by artificial structures such as buildings, trees and natural geographical features.

Transmission of a large volume of data such as images from a mobile object such as an ambulance can not be performed by an existing ground communication infrastructure and an existing communication satellite.

In order to solve the above-mentioned problems, a method of setting orbital elements of an artificial satellite for transmitting a large volume of data to a mobile object such as a vehicle is proposed and in addition an orbital element of the artificial satellite is also proposed in Japanese Patent Application Laid-Open No.11-34996.

The problems in the prior art will be described below, corresponding to each of the above items (a), (b) and (c) based on examples known in the art.

(a) Problems with Regard to Setting of an Orbital Element (Argument of Perigee) of an Artificial Satellite, and an Object of the Present Invention In the above mentioned Molniya satellite, Archimedes and Tundra orbit, all the orbital inclination angles of them are fixed to approximately 63.4. It seems that the main object is to suppress the rotation of the perigee on the orbit plane. On the other hand, there is an advantage in using an orbital inclination angle as large as approximately 63.4 degrees because the area using the above-mentioned artificial satellites is a higher latitude area such as Europe and Russia.

As for the location of Japan, the territory spreads from a middle latitude to a low latitude as Etorofu island in the northernmost end is situated in latitude approximately 45 degrees north and Okino-torishima in the southernmost end is situated in latitude approximately 20 degrees north. Therefor, when the orbital inclination angle of 63.4 degrees is employed as described above, the artificial satellite system becomes difficult to be used from the territory of Japan unless an altitude of the orbit is sufficiently high. Accordingly, when an orbit of an artificial satellite matching the location of the territory of Japan is taken into consideration, the orbital inclination angle can not help employing a value other than approximately 63.4 degrees, and consequently the perigee of orbit rotates.

In order to control the rotation of the perigee, propellent for controlling the rotation needs to be mount on the artificial satellite. An analytical simulation was performed on a case where the orbital inclination angle is 40 degrees and the eccentricity is 0.24 among the orbital elements proposed in, for example, Japanese Patent Application Laid-Open No.11-34996. As a result, it was found that an amount of the propellent for controlling the argument of perigee becomes dominant to the total amount of poropellent depending on a condition of setting the orbital elements because there occurs a case where the orbit control propellent of approximately 75% must be used at maximum for controlling the argument of perigee to nearly 270 degrees. Thereby, devices mountable on the artificial satellite may be reduced, or on-orbit lifetime of the artificial satellite may be shortened.

SUMMARY OF THE INVENTION

An object of the present invention is to set an argument of perigee of one of the six-orbital elements at a setting stage of the orbital elements of an orbit on which the artificial satellite travels in order to solve the above-mentioned problem.

(b) Problems with Regard to Orbit Configuration Methods for a Plurality of Artificial Satellites, and an Object of the Present Invention Many communication systems which use an elliptical orbit of about a 270-degree argument of perigee and about an 8-hour orbital period are proposed. Apogees of these systems appear above three areas of Europe, North America and Japan, and an object of these systems is to provide communication services using three or six artificial satellites. It can be supposed that the number of the satellites, that is, three or six is intuitively or naturally determined so that three of the artificial satellites come around in the sky above the three areas at a time, respectively. The references do not describe any case where different number of satellites is employed. Further, as to methods of setting the orbital elements, most of the references do not describe any specific numerical values except for a semimajor axis of 20,270 km which is mathematically derived from an orbital period of 8 hours and an orbital inclination angle of 63.4 degrees which is considered to be stable in orbit kinetics. In addition, there is no description on the method of deriving the values.

When an orbit of an artificial satellite is mapped on the ground, what can be expressed geometrically and visually are only four orbital elements of an orbital semimajor axis or orbital period, an eccentricity, an orbital inclination angle and an argument of perigee. Therefore, in a stage of preliminary conceptual design, it is sufficient to set these four elements. This is considered one of the reason why the orbital elements are not clearly described and the deriving method is not described.

In Japanese Patent Application Laid-Open No.11-34996, a method of setting orbital elements of an artificial satellite having a satellite orbital period of approximately 12 hours or 24 hours is proposed. Further, there is description on values of orbital elements of a satellite and number of satellite in a case of service target area of Japan and an elevation angle above 70 degrees. However, there is no proposal on numerical values of orbital elements and number of satellites for orbital periods other than the above-mentioned orbital periods. What is described in the above-mentioned reference is a method of setting orbital elements of an artificial satellite on an elliptical orbit having a long stretch of time staying in the zenith direction in a specified area, and the method can not be applied to all the cases of setting orbital elements of an artificial satellite.

Further, description will be made below on systems using a plurality of artificial satellites which are proposed now or have been developed now. In a mobile communication satellite system, the service target is global, and the satellite travels on a circular orbit (zero eccentricity) having a constant semimajor axis and a constant orbital inclination angle, but the other orbital elements and the method of deriving them are not disclosed. The reason why this is not disclosed may be that they think this belongs to the know-how of the inventors proposed the system using the artificial satellites. An earth survey satellite system developed is a combination of satellites traveling on a sun synchronous semi-tropical orbit so as to survey all over the world. On the other hand, in a case where communication service or surveillance is concentratively and continuously performed to a specified area, stationary satellites are used.

In a case where communication service or broadcast service is intended to be concentratively and continuously performed using an arbitrary number of artificial satellites to a specified area on a celestial body of the satellites traveling around, or in a case where a specified area on a celestial body of the satellites traveling around or a weather condition of the area is concentratively and continuously observed, an object of the present invention is to provide a method capable of being generally applied to setting of orbital elements of the artificial satellite, particularly, a method of setting an orbital semimajor axis, an eccentricity, an orbital inclination angle, an argument of perigee, right ascension of north-bound node and true anomaly of the arbitrary number of artificial satellites, and to provide detailed numerical values of the orbital elements obtained from orbit design according to the method.

(c) Problems with Regard to Mobile Communication and Broadcast to a Mobile Object, and an Object of the Present Invention It is clear that the existing communication infrastructures such as common line telephones, cellular phones and personal handy phones can not cope with large volume communication to mobile objects.

The stationary satellite communication system likely to cause communication interruption by artificial structures and natural geographical features can not cope with large volume communication to mobile objects.

It is clear that a satellite communication system using a low-to-middle altitude orbit such as Iridium currently under development can not cope with large volume communication to mobile objects because the duration of time while the satellite comes and stays visible in a high elevation angle is as short as several minutes.

The various kinds of communication systems described above can not sufficiently cope with the communication to the mobile objects, but their applicability to digital television broadcast and digital voice broadcast to the mobile objects is negative.

In the broadcast service to the mobile objects using an artificial satellite, the artificial satellite must stably stay visible in a high elevation angle for a long duration of time within a service target area.

The words "an artificial satellite is visible" in the present specification is determined that "an artificial satellite stays within a spatial area, under the condition of which communication between an artificial satellite tracking and controlling ground station, various kind of satellite communication send and receive facilities and an artificial satellite can be performed with electromagnetic wave of light".

In order to realize the above, it is generally thought that an elliptical orbit of which the apogee stays in the sky above a service target area is preferable, but appropriate methods and algorithms of setting the orbital elements are not firmly proposed except for in Japanese Patent Application Laid-Open No.11-34996.

In the orbital elements proposed in Japanese Patent Application Laid-Open No.11-34996, the minimum value of eccentricity is 0.24. Even if the value of eccentricity is employed, the distance from the ground to the satellite is generally larger than the distance from that position to a stationary satellite. Therefore, there are the following problems to be solved.

(1) Free spatial loss on electromagnetic wave transmission becomes large, and accordingly the communication/broadcasting devices mounted on the artificial satellite are required to have higher sending and receiving capability. In more detail, in the artificial satellite side, a larger antenna or a sender having a larger output power and a receiver having a higher receiving capability are necessary. In the ground side, a send and receive facility for satellite communication similarly requires a larger antenna or a sending unit having a larger output power and a receiving unit having a higher receiving capability.

(2) Communication delay becomes larger because the distance from the ground larger.

Further, the distance to the artificial satellite in service becomes different between one end part of a service target area and the other end part in the opposite side because the eccentricity is somewhat large. Thereby, when the artificial satellite in service is switched, breakdown time may occur in broadcasting.

In order to solve the above problems, the present invention improves the orbital elements proposed in Japanese Patent Application Laid-Open No.11-34996 from the viewpoint of "communication with ground". An object of the present invention is to set more effective ranges of orbital elements within the specified service area of Japanese territory.

Although an object of the present invention is to individually solve the problems described the above items (a), (b) and (c), the object is also to solve combinations of the items (a), (b) and (c), or all of the items (a), (b) and (c) at a time. Another object of the present invention is to provide a method of deriving orbital elements of artificial satellites capable of making mobile communication and mobile broadcast easy to the specified area of Japanese territory using a plurality of artificial satellites by solving the items (a), (b) and (c) together, and at the same time to express the orbital elements suitable for the Japanese territory by limiting the ranges.

Furthermore, a further object of the present invention is to construct various kinds of systems utilizing a plurality of artificial satellites after solving the problems described in the above items (a), (b) and (c).

Description will be made below, corresponding to each of the above items (a), (b) and (c).

(a) With Regard to Setting of One of Orbital Elements of an Argument of Perigee

In a plan using an artificial satellite, a duration to be operable of the artificial satellite is general defined as a mission lifetime. It is necessary to accurately estimate over the period of the mission lifetime using a computer how mach an argument of perigee changes from an initial value of the argument of perigee just after the artificial satellite is injected onto an orbit the satellite should be injected in order to attain its purpose under the condition that the argument of perigee is not controlled at all.

In order to attain the above objects, it is assumed in the present invention that the initial value of the argument of perigee of an orbital element of an orbit on which the artificial satellite travels is set using the above-mentioned estimated value.

In order to attain the above-mentioned objects, the present invention uses an artificial satellite comprising an attitude sensor for detecting its own attitude, a computer for processing detected attitude data, an actuator or gas jet unit for maintaining or changing the attitude using the computer, a gas jet unit for changing its own orbit, and a communication unit for establishing a communication line between the artificial satellite and a control station with electromagnetic wave. In a case where a center celestial body of the artificial satellite traveling around is the earth, the artificial satellite may comprise a unit for receiving electromagnetic wave from a GPS satellite and calculate its own position and velocity. Here, the GPS satellite is a generic name for Navster satellite composing Global Positioning System (GPS) of the USA, Glonass satellite of Russia for navigation, transportation multipurpose satellite of Japan and so on.

(b) With Regard to Orbit Arranging Method for a Plurality of Satellites

In order to attain the above-mentioned objects, in the present invention, an orbit on which an artificial satellite travels is defined by six orbital elements obtained under input conditions of a specified area supplied with service using the artificial satellites, number of the artificial satellites, frequency of service by the artificial satellites to the service target area, a duration time of service by one of the artificial satellites to the service target area and reference time defining the orbital elements.

In more detail, at defining the orbital elements, the six orbital elements are determined by a process of defining number of artificial satellites, a process of defining an orbit semi-major axis, a process of setting an eccentricity, an orbit inclination angle and an argument of perigee, a process of setting a right ascension of north-bound node, a process of setting a true anomaly, and repeating of all the processes from the process of defining number of artificial satellites to the a process of setting a true anomaly.

In order to attain the above-described object, the artificial satellites similar to the above item (a) may be employed in the present invention.

(c) With Regard to Mobile Communication and Broadcast to a Mobile Object

In order to attain the above-described object, the artificial satellites similar to the above item (a) may be employed in the present invention.

Further, in order to attain the above-described object, the present invention employs a group of artificial satellites composed of three or four artificial satellites traveling on three or four elliptical orbits with an orbital period of 24 hours, wherein each of the orbits is formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35. Therein, each of the artificial satellites is arranged on each of the orbits. Here, with regard to the orbital period of 24 hours, the words, 24 hours, in this specification are defined as a time duration including an error of ±10 minutes to 23 hours 56 minutes.

The followings are means commonly used in the above items (a), (b) and (c).

In order to attain the above-described object, in the present invention, the artificial satellites traveling on the orbits in accordance with the present invention are used in systems using various kinds of satellites such as an orbit control system for controlling the orbit of the artificial satellite, a satellite communication system for performing satellite communication through the artificial satellite, an earth survey system using the artificial satellite mounting an earth survey unit and the like.

A satellite communication send and receive apparatus in the satellite communication system is a unit comprising a send and receive means for performing signal sending and receiving with the artificial satellite when the artificial satellite in accordance with the present invention is used within a service target area, and may be mounted on a mobile object moving within the service target area. Further, the send and receive apparatus may be equipped with a GPS means for measuring at least its own position by receiving an electromagnetic wave from a GPS satellite composing a global positioning system, or a measuring means for measuring a consumed amount of substances relating to charges for public services such as electricity, city gas and city water.

Furthermore, in order to attain the above object, in the present invention, the satellite communication system for performing satellite communication through an artificial satellite comprises at least the artificial satellite, a satellite communication send and receive apparatus for performing satellite communication through the artificial satellite and a base station for performing communication with the satellite send and receive apparatus through the artificial satellite. The artificial satellite is an artificial satellite traveling on an elliptical orbit. The satellite communication send and receive apparatus is mountable on a mobile object, and comprises a send and receive means for performing sending and receiving of signals with the artificial satellite when the artificial satellite is used within a specified target service area.

Still further, in order to attain the above object, in the present invention, the satellite communication system for performing satellite communication through an artificial satellite comprises at least the artificial satellite, a plurality of satellite communication send and receive apparatuses for performing satellite communication through the artificial satellite. The artificial satellite is an artificial satellite traveling on an elliptical orbit. Each of the plurality of satellite communication send and receive apparatuses comprises a send and receive means for performing sending and receiving of signals with the other satellite communication send and receive apparatuses through the artificial satellite. At least one of the plurality of satellite communication send and receive apparatuses is located within the above-described target service area though the others are located outside the target service area, and located at a position capable of performing satellite communication through the artificial satellite. Depending on an elevation angle of the artificial satellite when the artificial satellite is seen from the target service area, a relaying mode is selected among a relaying mode between the satellite send and receive apparatuses positioned within the target service area; a relaying mode between the satellite send and receive apparatus positioned within the target service area and the satellite send and receive apparatus positioned within the other area; and a relaying mode between the satellite send and receive apparatuses positioned at positions outside the target service area.

BRIEF DESCRIPTION OF THE DRAWINGS

FIG. 19 is an explanatory diagram showing an example of a satellite communication system to which the present invention is applied.

FIG. 37 is a graph showing a computer simulation result of change with time of elevation angle at which an artificial satellite traveling on an orbit is visible, the computer simulation result being performed on a case where duration time in which the artificial satellite traveling on the orbit of 24-hour orbital period having orbital elements of a 42.5 degree orbital inclination angle and a 0.21 eccentricity is visible above 70 degrees of elevation angle coincidentally from Nemuro, Sapporo, Sendai, Niigata, Tokyo, Nagoya, Kanazawa, Osaka, Hiroshima, Kochi, Fukuoka, Kagoshima and Naha becomes maximum.

DETAILED DESCRIPTION OF THE PREFERRED EMBODIMENTS

Figure 1:
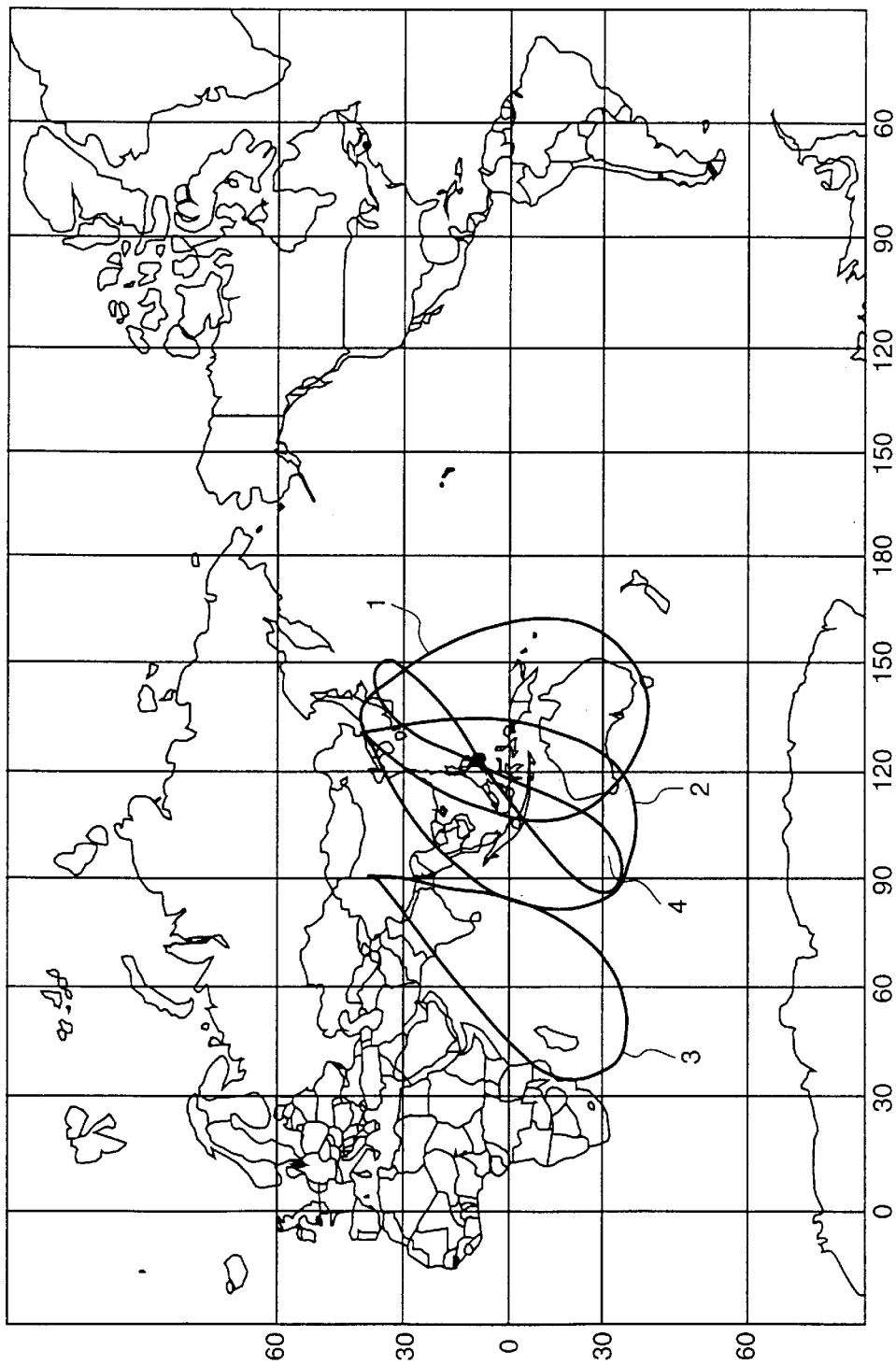
FIG. 1 is a diagram showing the long-term change of an artificial satellite orbit on which an artificial satellite of 24-hour orbital period travels without performing orbit control, the orbit being projected on a map of the world (isometric projection with respect to latitude and longitudinal measures).

The following embodiments in accordance with the present invention will be described below.

Method of setting the orbital elements (algorithm)

Examples of set values of the orbital elements and orbit configuration by the algorithm Method of realizing and controlling the set orbital elements Systems employing an artificial satellite traveling on the orbit according to the present invention (1) Method of Setting the Orbital Elements (Algorithm)

Corresponding to each of the above items (a), (b) and (c), description will be made on the methods with regard to the items (a) and (b) below. With regard to the problem (c), setting of an argument of perigee is solved by the item (a) and a method of arranging a plurality of artificial satellites is solved by the item (b). Therefore, initially, numerical ranges of an orbital elements suitable for mobile broadcast and communication using the group of artificial satellites in Japan will be described here.

Combinations of orbital elements for an orbit of 24 hour orbital period is investigated by taking an evaluation index of time duration that an artificial satellite traveling on the orbit can be seen in an elevation angle above 70 degrees from 13 cities of Nemuro, Sapporo, Sendai, Tokyo, Nagoya, Kanazawa, Osaka, Hiroshima, Kochi, Fukuoka, Kagoshima and Naha at the same time.

An orbit of an artificial satellite can be uniquely determined by giving a position and a velocity of the artificial satellite at a certain time. Therefore, by giving six orbital elements at a certain time, an orbit of an artificial satellite can be uniquely determined. Here, Kepler orbital elements are used for the method of describing the orbital elements. The Kepler orbital elements are composed of six orbital elements, that is, of a semi-major axis expressing size of an ellipse, an eccentricity expressing oblateness of an ellipse, an orbit inclination angle expressing inclination of an orbital plane, a right ascension of north-bound node indicating an angle between a straight line connecting between an ascending node where the orbit passes an equatorial plane from south to north and the vernal equinoctial direction, an argument of perigee indicating an angle from an ascending node to the perigee, and a true anomaly of an angle measuring a position on the orbit of the artificial satellite at a certain time with respect to a geocentric position as a center. An average anomaly or an eccentric anomaly may be used instead of the true anomaly.

Since the orbital period is 24 hours, the orbital semi-major axis of one of the orbital elements is given by the orbital period. Next, the argument of perigee of one of the orbital elements is foxed to 270 degrees. In an orbit having the semi-major axis and the argument of perigee, a combination of two orbital elements of an orbit inclining angle and an eccentricity is considered. By doing so, a shape of the orbit projected on the ground is uniquely determined. If the other remaining orbital elements of aright ascension of north-bound node and a true anomaly are determined to a reference time, a position in the longitudinal direction of the orbit projected on the ground is determined. At that time, a duration time in which the artificial satellite is visible above an elevation angle of 70 degrees from the above-described 13 cities at a time can be calculated. Therefore, by successively changing the combination of two orbital elements of an orbit inclining angle and an eccentricity, the orbit projected on the ground is shifted in the longitudinal direction. By doing so, a duration time in which the artificial satellite is visible above an elevation angle of 70 degrees from the above-described 13 cities to a combination of two orbital elements of an orbit inclining angle and an eccentricity can be successively calculated. By comparing these results, a maximum value of the duration time in which the artificial satellite is visible above an elevation angle of 70 degrees from the above-described 13 cities to a combination of two orbital elements of an orbit inclining angle and an eccentricity can be finally calculated.

Figure 35:
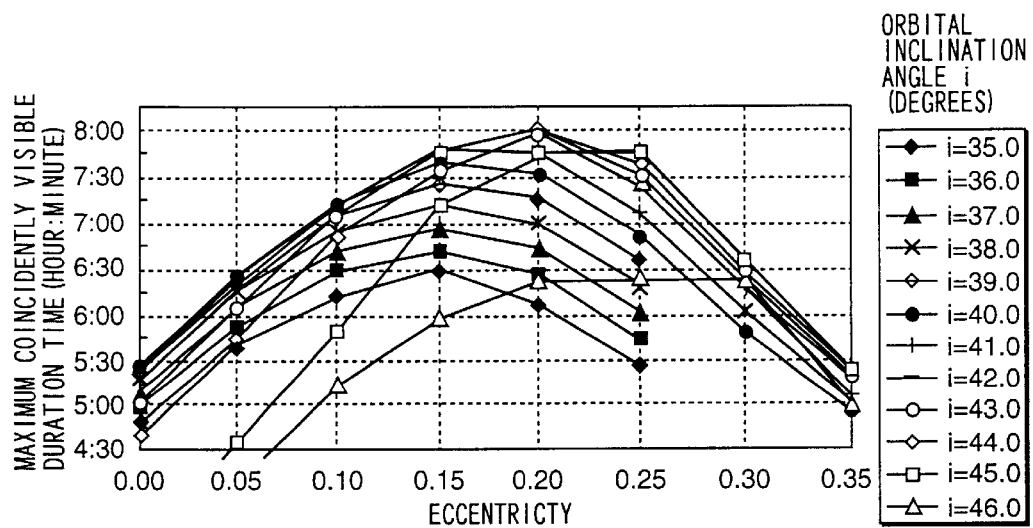
FIG. 35 is a characteristic graph showing maximum coincidentally visible duration time for each combination of orbital inclination angle and eccentricity with respect to duration time in which an artificial satellite traveling on an orbit of 24-hour orbital period is visible above 70 degrees of elevation angle coincidentally from Nemuro, Sapporo, Sendai, Niigata, Tokyo, Nagoya, Kanazawa, Osaka, Hiroshima, Kochi, Fukuoka, Kagoshima and Naha.

FIG. 35 shows maximum coincidentally visible duration time given by a combination of an orbit inclination angle and an eccentricity through the above-described procedure when the orbit inclination angle is changed within a range of from 35 degrees to 44 degrees and the eccentricity is changed within a range of from 0.0 to 0.35. It can be understood from FIG. 35 that, for example, when the orbit inclination angle is 35 degrees and the eccentricity is 0.2, the maximum coincidentally visible duration time becomes approximately 6 hours.

Figure 36:
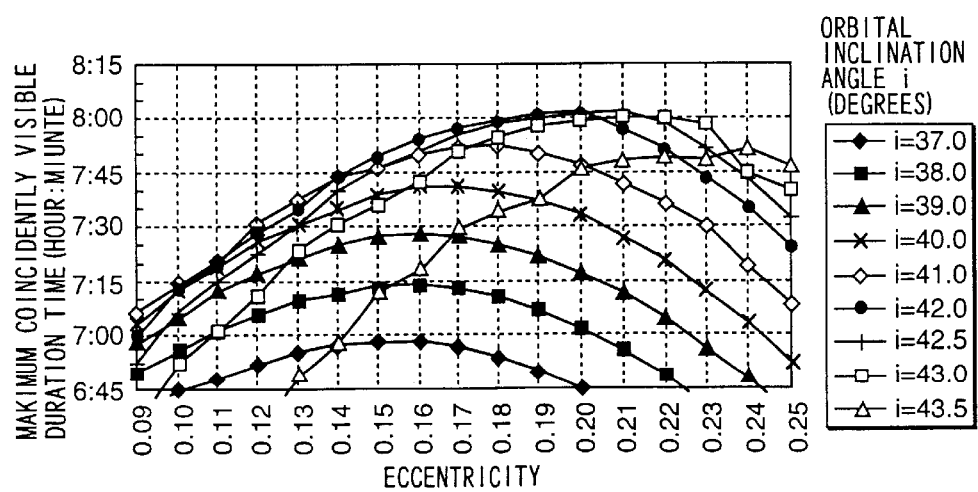
FIG. 36 is a detailed characteristic graph showing a part of FIG. 35 where the maximum coincidentally visible duration time is above 6 hours and 45 minutes.

FIG. 36 shows a portion of the above figure in detail where the maximum coincidentally visible duration time is above 6 hours and 45 minutes and the eccentricity range of from 0.09 to 0.25.

It can be understood from FIG. 36 that the maximum value among the maximum coincidentally visible duration time is given by the combination of the orbit inclination angle of 42.5 and the eccentricity of 0.21, and that the maximum coincidentally visible duration time in that condition is longer than 8 hours. FIG. 37 is a graph showing change with time of elevation angle when the artificial satellite is seen from the above-described 13 cities. Since the time when the elevation angle becomes above 70 degrees is latest at Sapporo and the time when the elevation angle becomes below 70 degrees is earliest at Nemuro, the time difference between the two time points is larger than 8 hours.

Figure 38:
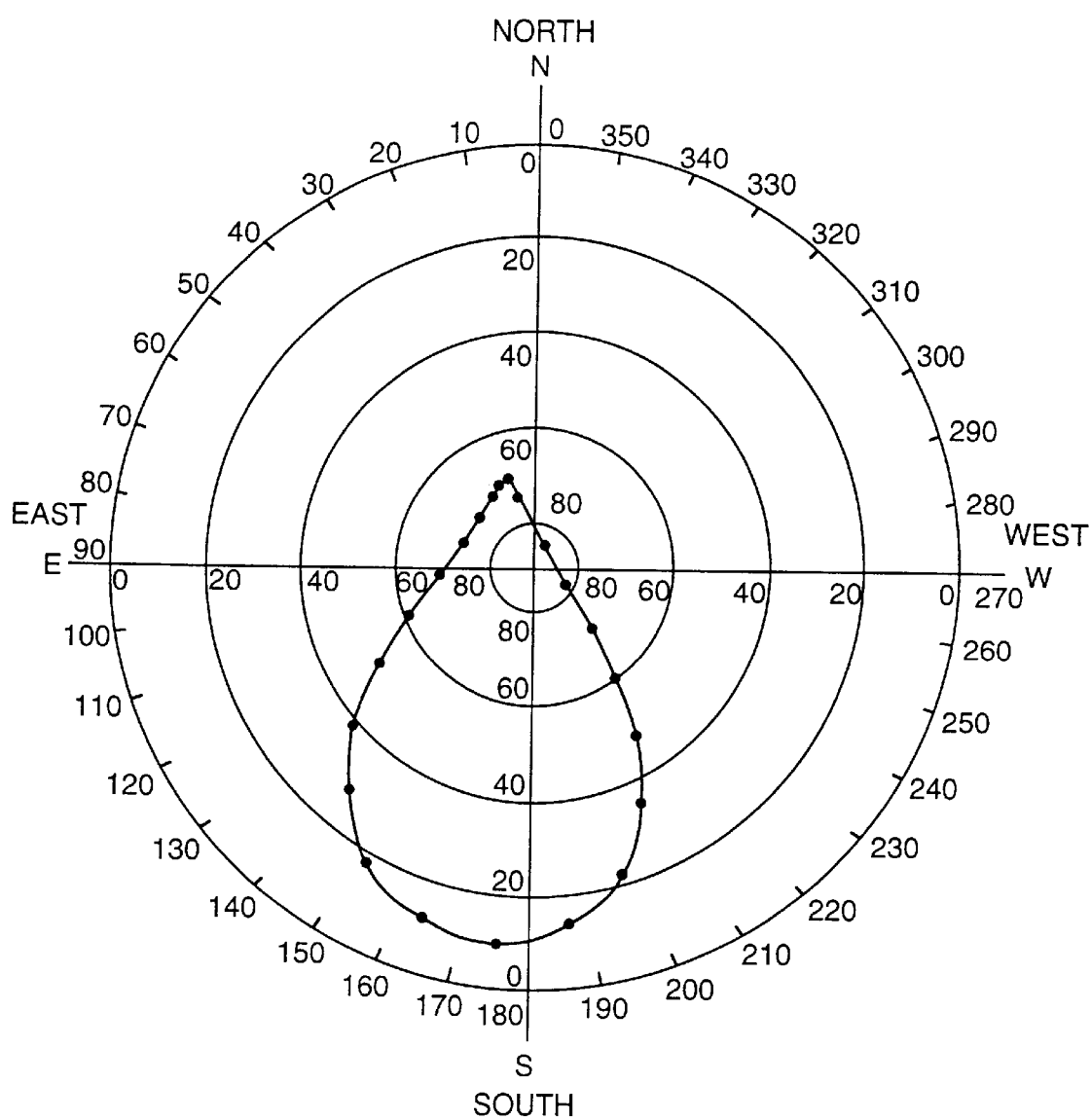
FIG. 38 is a sky map showing a computer simulation result of visible direction at Naha of an artificial satellite traveling on an orbit, the computer simulation result being performed on a case where duration time in which the artificial satellite traveling on the orbit of 24-hour orbital period having orbital elements of a 42.5 degree orbital inclination angle and a 0.21 eccentricity is visible above 70 degrees of elevation angle coincidentally from Nemuro, Sapporo, Sendai, Niigata, Tokyo, Nagoya, Kanazawa, Osaka, Hiroshima, Kochi, Fukuoka, Kagoshima and Naha becomes maximum.

As shown in FIG. 37, the elevation angle at Naha changes in such a manner that the elevation angle increases, then decrease, after that again increases and finally decreases. FIG. 38 is a sky map showing a computer simulation result of visible direction at Naha of the artificial satellite in this case. FIG. 38 may be seen in a same manner as a star chart, and the center of the concentric circles is the zenith, the top directs to the north, the right hand side directs to the west, the bottom direct to the south and the left hand side directs to the east. The concentric circles are elevation angle and drawn at intervals of 20 degrees. The plotted dots express positions of the artificial satellite in the sky at intervals of 1 hour, and the line connecting the plotted dots is the orbit in the sky.

It can be understood from FIG. 38 that the visible direction of the artificial satellite is shifted from the zenith direction toward the horizon direction in the north, and from this the change with time of the elevation angle in FIG. 37 can be explained. The changes with time of the elevation angle at the other cities in FIG. 37 can be explained using similar star charts. The reason why the maximum coincidentally visible duration time is shortened at the orbit inclination angle of 44 degrees in FIG. 35 and FIG. 36 is that the visible direction of the artificial satellite at Naha is shifted excessively toward the horizon direction so that the elevation angle once becomes below 70 degrees and then is returned toward the direction of the elevation angle above 70 degrees. Therefore, the coincidentally visible duration time is shortened.

In a case where 24-hour service is performed using three artificial satellites, the combination of the orbit inclination angle and the eccentricity which makes the maximum coincidentally visible duration time above 8 hours is preferable. In a case where 24-hour service is performed using four artificial satellites, the combination of the orbit inclination angle and the eccentricity which makes the maximum coincidentally visible duration time above 6 hours is preferable. The combination of the orbit inclination angle and the eccentricity may be referred to FIG. 35 and FIG. 36.

In a case where broadcast service is performed using a plurality of artificial satellites traveling on elliptical orbits, the artificial satellite to perform the broadcast service needs to be successively switched. In a case where performing mobile broadcast and communication is performed as described above, it is important that the artificial satellite becomes visible at a high elevation angle from a plurality of cities at a time.

(a) Method of Setting an Argument of Perigee

Here, it is assumed that the other orbital elements of the semi-major axis, the eccentricity and the orbit inclination angle have been set by a method (b) to be described later.

In a case where a specified area such as the territory of Japan is set to a service area, when a right ascension of north-bound node at a certain reference time is set, the argument of perigee is given with a certain range in order that the artificial satellite travels above the service area.

When an argument of perigee is set, the argument of perigee is set by computer simulation using the orbital element and the reference time as the input condition.

As a known example, in a case where the orbit inclination angle is 40 degrees and the eccentricity is 0.24 in a 24-hour orbital period, a result of computer simulation of change in the orbital elements over 10 years is shown in Table 1. The duration of 10 years is determined by summing the above-described mission lifetime is 10 years. The simulation result is based on a condition that the orbit correction control is not performed for the 10 years, in detail, the gas jet unit mounted on the artificial satellite is not jetted at all for the 10 years.

TABLE 1

| Time | Date | Time (UTC) | Semimajor axis (km) | Eccentricity | Orbit Incl. Angle (degrees) | Right Ascension of north-bound node (degrees) | Argument of perigee (degrees) | True Anomaly (degrees) |
|---|---|---|---|---|---|---|---|---|
| initial value | Feb. 1, 2000 | 0:00:00 | 42,164 | 0.240 | 40.0 | 357.5 | 270.0 | 0.0 |
| 365 days after | Jan. 31, 2001 | 0:00:00 | 42,183 | 0.239 | 39.8 | 352.1 | 278.0 | 271.5 |
| 730 days after | Jan. 31, 2002 | 0:00:00 | 42,158 | 0.237 | 39.6 | 346.7 | 286.0 | 236.5 |
| 1095 days after | Jan. 31, 2003 | 0:00:00 | 42,149 | 0.235 | 39.3 | 341.5 | 294.5 | 310.0 |
| 1460 days after | Jan. 31, 2004 | 0:00:00 | 42,175 | 0.234 | 38.9 | 336.3 | 303.0 | 316.3 |
| 1825 days after | Jan. 30, 2005 | 0:00:00 | 42,174 | 0.233 | 38.5 | 331.1 | 311.7 | 231.0 |
| 2190 days after | Jan. 30, 2006 | 0:00:00 | 42,147 | 0.233 | 38.0 | 326.0 | 320.7 | 246.2 |
| 2555 days after | Jan. 30, 2007 | 0:00:00 | 42,162 | 0.234 | 37.5 | 320.8 | 329.8 | 313.2 |
| 2920 days after | Jan. 30, 2008 | 0:00:00 | 42,183 | 0.236 | 36.9 | 315.5 | 339.0 | 247.2 |
| 3285 days after | Jan. 29, 2009 | 0:00:00 | 42,157 | 0.239 | 36.3 | 310.2 | 348.2 | 216.2 |
| 3650 days after | Jan. 29, 2010 | 0:00:00 | 42,157 | 0.242 | 35.5 | 304.6 | 357.4 | 278.6 |

FIG. 1 shows the orbits projected on the ground when the orbital elements shown in Table 1 are employed. Each of the orbits projected on the ground over one day is calculated based on the orbital elements of the initial values, the values on 1095 days after, the values on 2190 days after, and the values on 3650 days after in Table 1.

The followings can be understood from the orbits projected on the ground of the initial value to the value on 3650 days after. In the figure, the reference character 1 is the orbit projected on the ground over one day from the reference time, the reference character 2 is the orbit projected on the ground over one day from 1095 day after to 1096 days after, the reference character 3 is the orbit projected on the ground over one day from 2190 day after to 2191 days after, the reference character 4 is the orbit projected on the ground over one day from 3650 day after to 3651 days after.

The orbit projected on the ground is shifting toward the west side with time until 2190 days after and then shifting toward the east side with time until 3650 days after.

The orbit projected on the ground is slanting with time until 2190 days after and the north side end becomes sharp.

The arrival range of the orbit projected on the ground in the latitudinal direction is narrowed with time.

With regard to the shifting toward the west side, the orbit projected on the ground can be moved to the sky over Japan by moving back the orbit projected on the ground toward the east side by performing orbit correction to adjust the true anomaly so as to correspond to the right ascension of north-bound node. This orbit correction is the same method as the longitude control of the orbit of a stationary satellite. Therefore, this control can be performed by jetting the gas jet of the artificial satellite at three positions of the perigee, the apogee and the perigee in the last. At that time, the semi-major axis and the eccentricity as well as the true anomaly may be corrected. By the control of the correction of the eccentricity, the sharpened north side end of the orbit projected on the ground described in the above second problem can be corrected to be returned to the original form.

The shortening of the arrival range in the latitudinal direction described in the above third problem is caused by reduction in the orbit inclination angle, and can be corrected by the method similar to the latitude control of the orbit of a stationary satellite. In detail, the propellant is jetted by the gas jet unit in the direction normal to the orbital plane when the artificial satellite passes through the equatorial plane on the orbit.

The above two kinds of control may be periodically, for example, every 30 days or ever 60 days, performed. By the periodical control, the semi-major axis, the eccentricity and the orbit inclination angle can be controlled to the nominal values or the values near the values at setting the orbital element.

A problem is the phenomenon described in the second that the orbit projected on the ground is slanting with time. This phenomenon is caused by change in the argument of perigee, and not observed in the orbit of a stationary satellite.

As shown in Table 1, according to the result of the computer simulation described above, the argument of perigee changes by approximately 90 degrees from the initial value of 270 degrees to the value nearly 10 years after of 357.4 degrees. In a case where the change in the argument of perigee is not allowed and the gas jet unit for controlling the argument of perigee is jetted similarly to the orbit control described above, the control is performed by jetting the gas jet unit in the direction parallel to the orbital plane at the time when the artificial satellite passes just before the ascension node or just after the descending node through the equatorial plane on the orbit, but a large amount of the propellant is consumed. Table 2 shows a simulation result on an amount of acceleration for the orbit control required when the periodic orbit control id performed in a case where four artificial satellites are arranged on four orbits each separated by 90 degrees in the right ascension of north-bound node. This is an amount of acceleration required in one year.

TABLE 2

| Kind of Control | Satellite 1 | Satellite 2 | Satellite 3 | Satellite 4 | Remarks |
|---|---|---|---|---|---|
| Control of True Anomaly, Semimajor Axis, Eccentricity | 94.11 | 25.25 | 75.76 | 42.12 | Control Frequency = 60 days |
| Control of argument of perigee | 74.59 | 146.56 | 1.03 | 105.82 | Control Frequency = 60 days |
| Control of Orbit Inclination angle | 5.88 | 21.10 | 17.98 | 34.24 | Control Frequency = 60 days |
| Total | 174.58 | 192.91 | 94.77 | 182.18 | |

(unit: m/s)

It can be understood from Table 2 that the acceleration amount required for control of the argument of perigee becomes approximately ¾ of the total acceleration amount for the orbit control at the maximum though it depends on positions of the orbit arrangement. Since an amount of propellant consumed by the gas jet unit to jet for the orbit control is inevitably increased, devices mountable on the artificial satellite must be reduced, or on-orbit lifetime of the artificial satellite must be shortened, in the worst case.

Therefore, in the present invention, change in the argument of perigee is allowed in advance, and the value is set with a certain allowance in the setting process of the argument of perigee.

If change of 90 degrees can be allowed in the above example, and when the initial value of the argument of perigee is set to, for example, 235 degrees, it can be predicted that the argument of perigee at the mission lifetime of 10 years after will become nearly 325 degrees. If the nominal value at that time is assumed to be 270 degrees, the argument of perigee can be maintained to a value in a range of the nominal value ±45 degrees without control, and the orbit projecting on the ground and accordingly the visibility of the artificial satellite can be maintained.

By setting the orbital elements on the premise that the argument of perigee is not controlled, the amount of propellant to be mounted on the artificial satellite can be substantially reduced.

In a case where change of 90 degrees can not be allowed, there is a method that when the mission lifetime is 10 years, the argument of perigee is controlled at the time, for example, 5 years after starting of the mission to return the argument of perigee to the initial value. In the example described in Table 1, the argument of perigee about 5 years after is nearly 312 degrees, and changes by nearly 42 degrees from the initial value of 270 degrees. At that time, if the initial value is set to 249 degrees, the argument of perigee is estimated to be changed to nearly 291 degrees at the time 5 years after. If the nominal value at that time is assumed to be 270 degrees, the argument of perigee can be maintained to a value in a range of the nominal value ±21 degrees without control, and the orbit projecting on the ground and accordingly the visibility of the artificial satellite can be maintained. Further, it can be also considered that the mission lifetime can be lengthened by again returning the argument of perigee to the initial value 5 years after.

Although the time correcting the argument of perigee is 5 years after starting the mission in the above example, the correction time may be set to the time 1 year after, 3 years after and so on depending on the allowance of the argument of perigee.

Further, there is a control method that in a case of the mission lifetime of 10 years, an initial value is set depending on an allowable width of the argument of perigee, and the argument of the perigee is returned to the initial value at the time when it reaches the limit value of the allowable width of the argument of perigee. For example, in the example of Table 1, since the argument of perigee at about 6 years after is nearly 321 degrees and changes by nearly 51 degrees from the initial value, there can be considered a control method that the initial value of the argument of perigee is set to 255 degrees, and the argument of perigee is returned to the initial value 6 years after in order to maintain the argument of perigee within a range of the nominal value of 270 degrees ±25 degrees. At that time, during the remaining mission lifetime of 4 years, the argument of perigee changes by a value corresponding to 4 years from the initial value.

A detailed example will be described below.

Description has been made in the beginning of the item (1) referring to FIG. 35 and FIG. 36 on the preferable orbital elements for a case where broadcast and communication service to a mobile object in Japan is performed using a plurality of artificial satellites. From FIG. 36, a combination of an orbit inclination angle and an eccentricity giving maximum coincidentally visible duration time from the 13 cities can be obtained for each orbit inclination angle. In detail, when the orbit inclination angle is 40 degrees, the maximum coincidentally visible duration time becomes longest at the eccentricity of 0.16.

Figure 39:
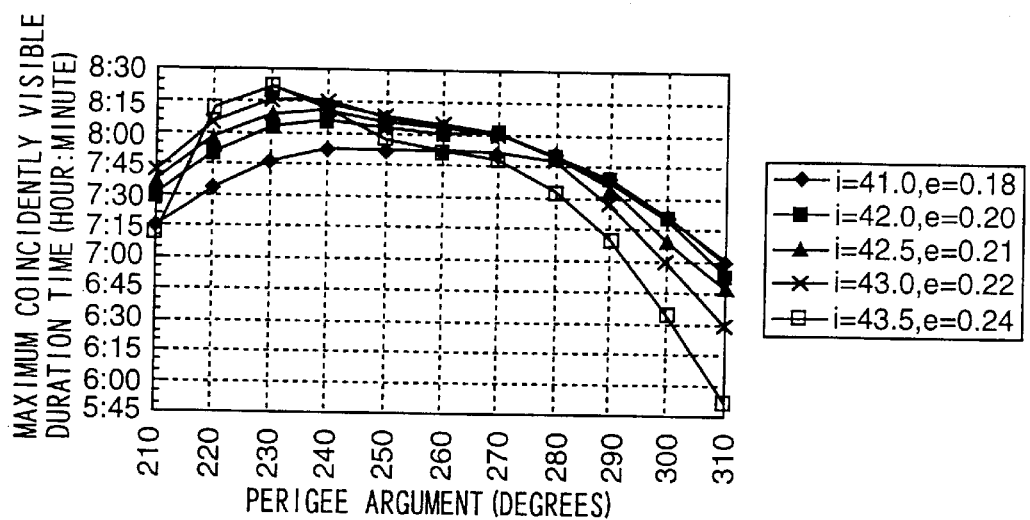
FIG. 39 is a graph showing change of maximum coincidentally visible duration time depending on combination of eccentricity and orbital inclination angle when argument of perigee is changed under various combinations of the eccentricity giving the longest maximum coincidentally visible duration time in each orbital inclination angle and the orbital inclination angle in FIG. 35 and FIG. 36.
Figure 40:
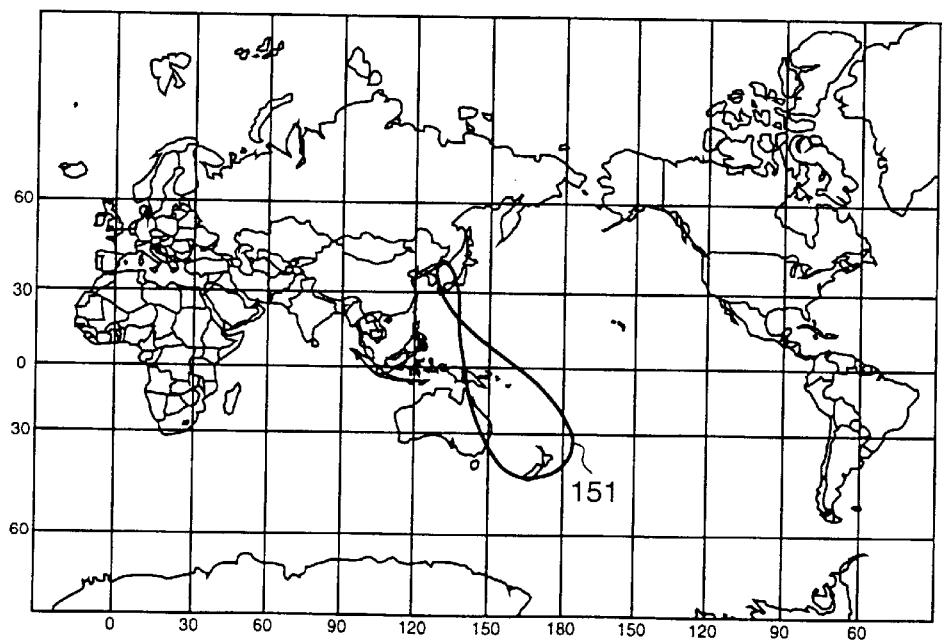
FIG. 40 is a diagram showing an artificial satellite orbit projected on a map of the world on which an artificial satellite travels with a 24-hour orbital period, an orbital inclination angle of 42.5 degrees, an eccentricity of 0.21 and an argument of perigee of 210 degrees, the orbit map of the world is of isometric projection with respect to latitude and longitudinal measures.
Figure 41:
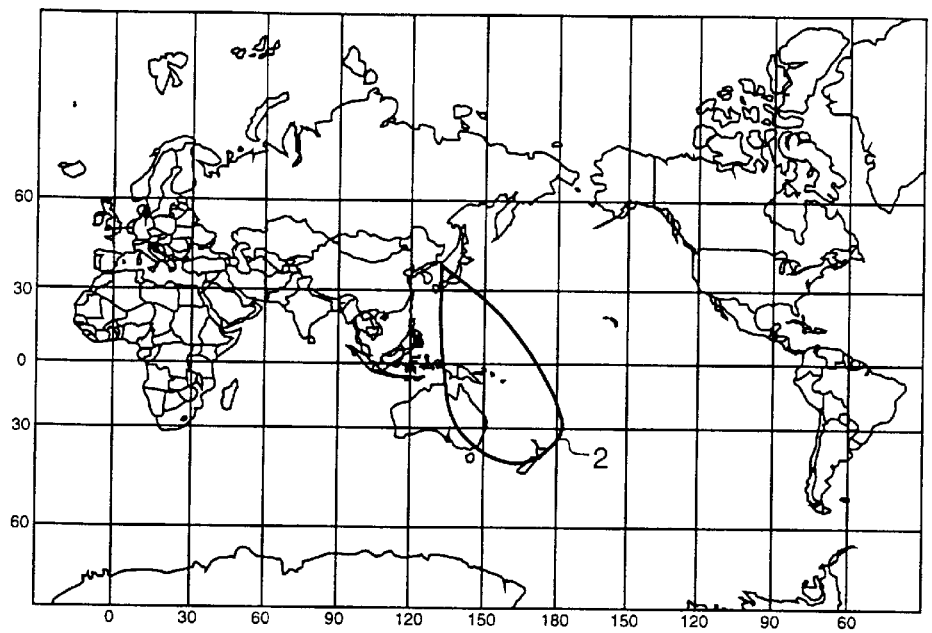
FIG. 41 is a diagram showing an artificial satellite orbit projected on a map of the world on which an artificial satellite travels with a 24-hour orbital period, an orbital inclination angle of 42.5 degrees, an eccentricity of 0.21 and an argument of perigee of 230 degrees, the orbit map of the world is of isometric projection with respect to latitude and longitudinal measures.
Figure 42:
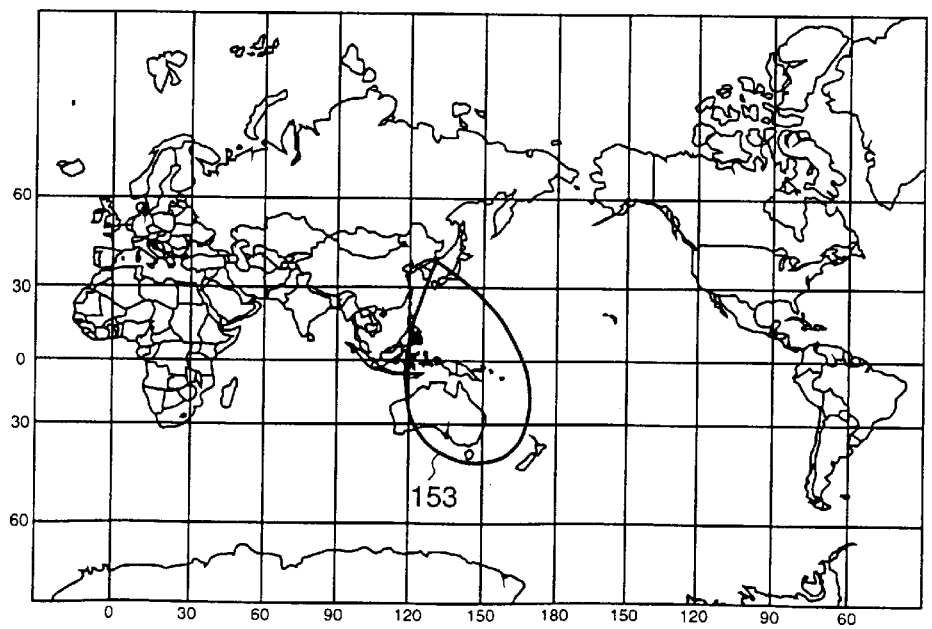
FIG. 42 is a diagram showing an artificial satellite orbit projected on a map of the world on which an artificial satellite travels with a 24-hour orbital period, an orbital inclination angle of 42.5 degrees, an eccentricity of 0.21 and an argument of perigee of 250 degrees, the orbit map of the world is of isometric projection with respect to latitude and longitudinal measures.
Figure 43:
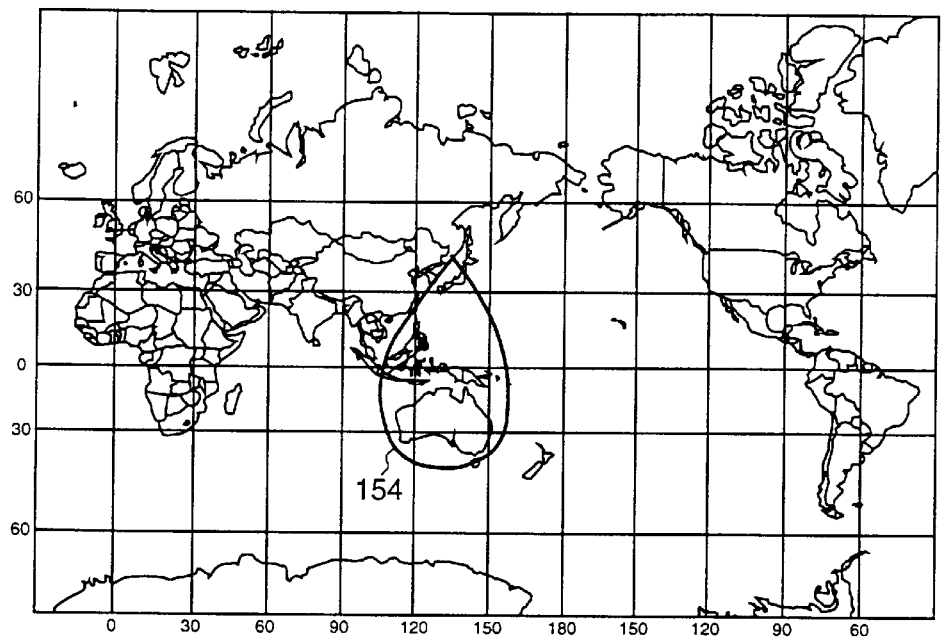
FIG. 43 is a diagram showing an artificial satellite orbit projected on a map of the world on which an artificial satellite travels with a 24-hour orbital period, an orbital inclination angle of 42.5 degrees, an eccentricity of 0.21 and an argument of perigee of 270 degrees, the orbit map of the world is of isometric projection with respect to latitude and longitudinal measures.
Figure 44:
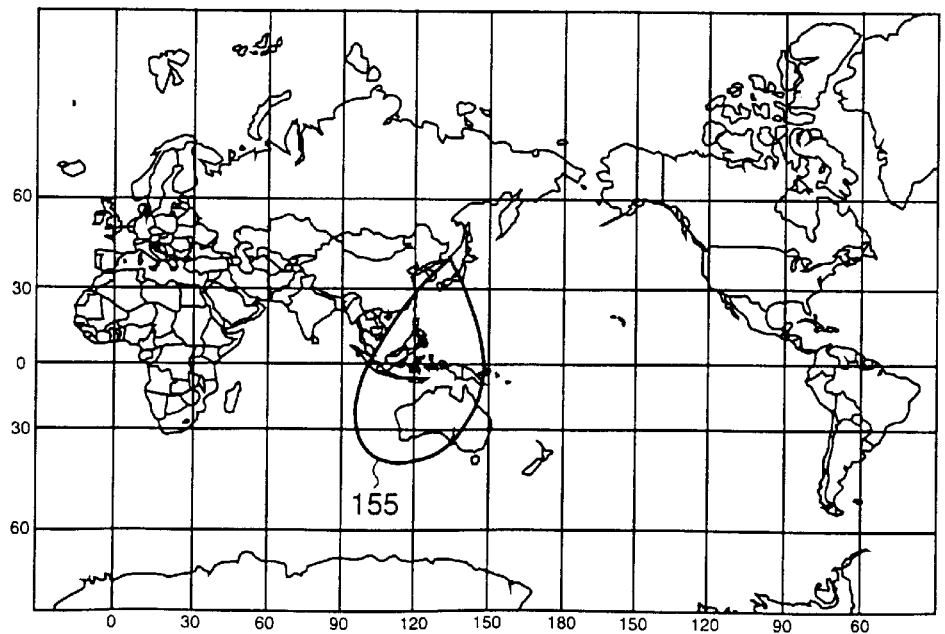
FIG. 44 is a diagram showing an artificial satellite orbit projected on a map of the world on which an artificial satellite travels with a 24-hour orbital period, an orbital inclination angle of 42.5 degrees, an eccentricity of 0.21 and an argument of perigee of 290 degrees, the orbit map of the world is of isometric projection with respect to latitude and longitudinal measures.
Figure 45:
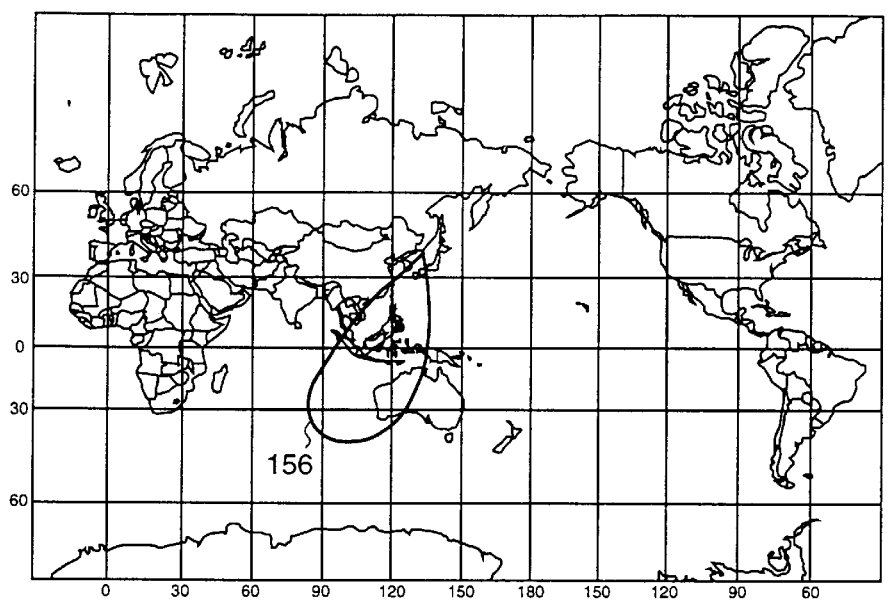
FIG. 45 is a diagram showing an artificial satellite orbit projected on a map of the world on which an artificial satellite travels with a 24-hour orbital period, an orbital inclination angle of 42.5 degrees, an eccentricity of 0.21 and an argument of perigee of 310 degrees, the orbit map of the world is of isometric projection with respect to latitude and longitudinal measures.

When such a combination is expressed by (40 degrees, 0.16), combinations (40 degrees, 0.18), (42 degrees, 0.20), (42.5 degrees, 0.21), (43 degrees, 0.22) and (43.5 degrees, 0.24) are obtained. When the argument of perigee is changed to these combinations, the artificial satellite becomes visible with the elevation angle larger than 70 degrees coincidentally from the above-mentioned 13 cities. FIG. 39 shows how the coincidentally visible duration time changes.

In the case of the combination of, for instance, (42.5 degrees, 0.21), the maximum coincidentally visible duration time is longer than 8 hours when the argument of perigee is within a range from nearly 223 degrees to 270 degrees, and the maximum coincidentally visible duration time monotonously decreases when the argument of perigee is larger than 270 degrees. It can be understood that good service can be provided for long time also in the cases of the other combinations when the lower limit of the argument of perigee is set to a value from 220 degrees to 230 degrees and the upper limit of the argument of perigee is set to a value of 270 degrees. However, in a case where 24-hour service is provided using three artificial satellites, the setting width is selected from a range of argument of perigee in which the maximum coincidentally visible duration time is longer than 8 hours. In a case where 24-hour service is provided using four artificial satellites, the setting width is selected from a range of argument of perigee in which the maximum coincidentally visible duration time is longer than 6 hours. Therefore, in this case, there is no need to set the lower limit of the argument of perigee to a value from 220 degrees to 230 degrees.

As references, in the case of the combination (42.5 degrees, 0.21), FIG. 40, FIG. 41, FIG. 42, FIG. 43, FIG. 44 and FIG. 45 show orbits projected on the ground giving the maximum coincidentally visible duration time when the argument of perigee is 210 degrees, 230 degrees, 250 degrees, 270 degrees, 290 degrees and 310 degrees, respectively.

Figure 46:
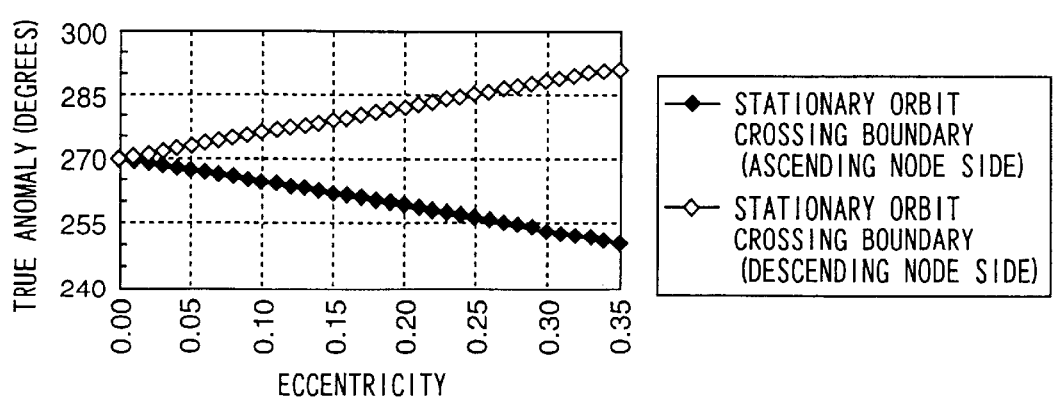
FIG. 46 is a graph showing argument of perigee in a case where an elliptical orbit of a 24-hour orbital period intersects with a stationary orbit for each eccentricity of the elliptical orbit.
Figure 47:
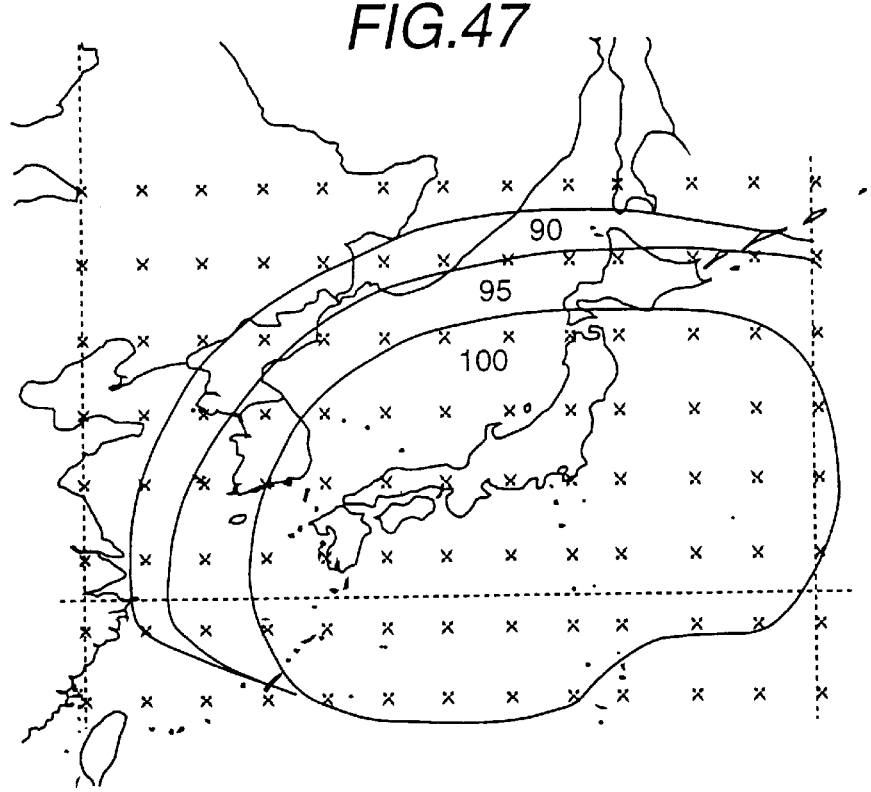
FIG. 47 is a chart showing a simulation result expressed by contour lines of time ratio (%) in which any one of the artificial satellites is visible at an elevation angle of above 70 degrees when the argument of perigee is 220 degrees in the case where service is provided 24 hours per day using three artificial satellites in the combination (42.5 degrees, 0.21).
Figure 48:
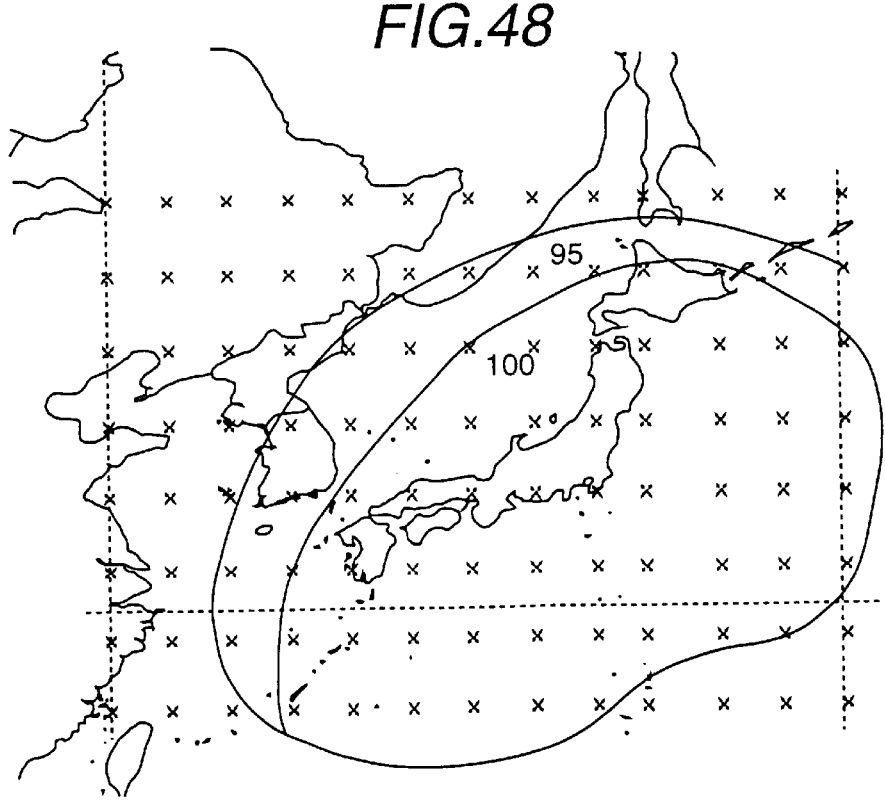
FIG. 48 is a chart showing a simulation result expressed by contour lines of time ratio (%) in which any one of the artificial satellites is visible at an elevation angle of above 70 degrees when the argument of perigee is 230 degrees in the case where service is provided 24 hours per day using three artificial satellites in the combination (42.5 degrees, 0.21).
Figure 49:
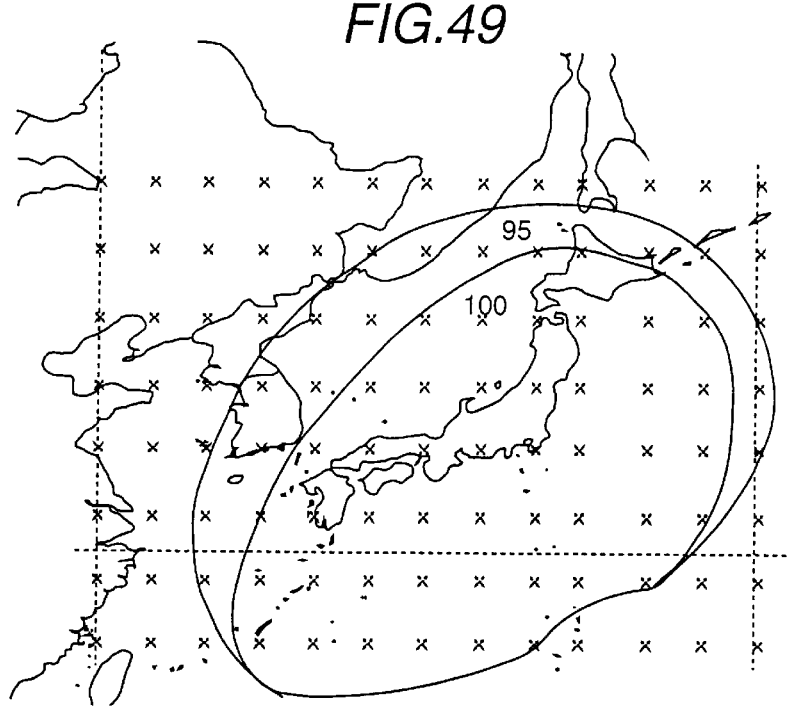
FIG. 49 is a chart showing a simulation result expressed by contour lines of time ratio (%) in which any one of the artificial satellites is visible at an elevation angle of above 70 degrees when the argument of perigee is 250 degrees in the case where service is provided 24 hours per day using three artificial satellites in the combination (42.5 degrees, 0.21).
Figure 50:
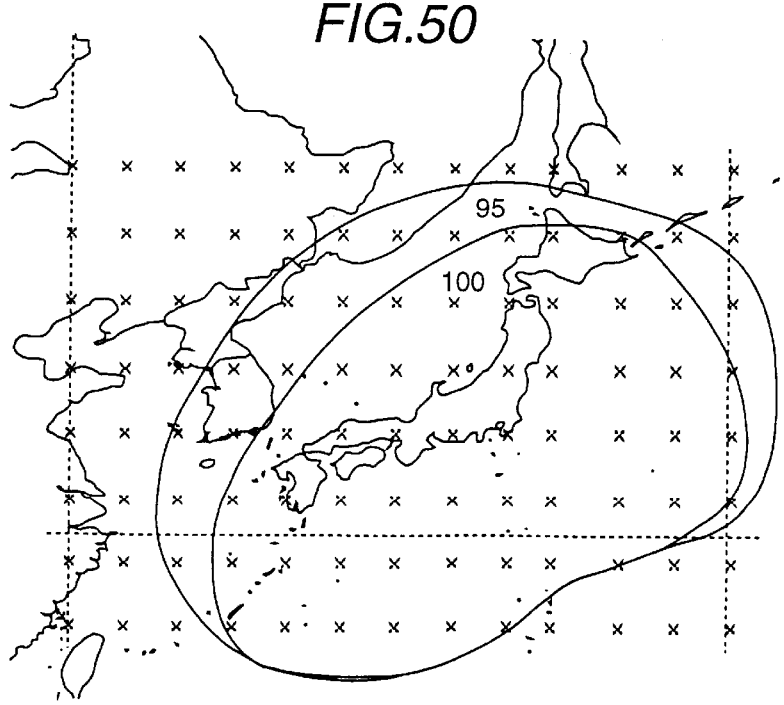
FIG. 50 is a chart showing a simulation result expressed by contour lines of time ratio (%) in which any one of the artificial satellites is visible at an elevation angle of above 70 degrees when the argument of perigee is 270 degrees in the case where service is provided 24 hours per day using three artificial satellites in the combination (42.5 degrees, 0.21).
Figure 51:
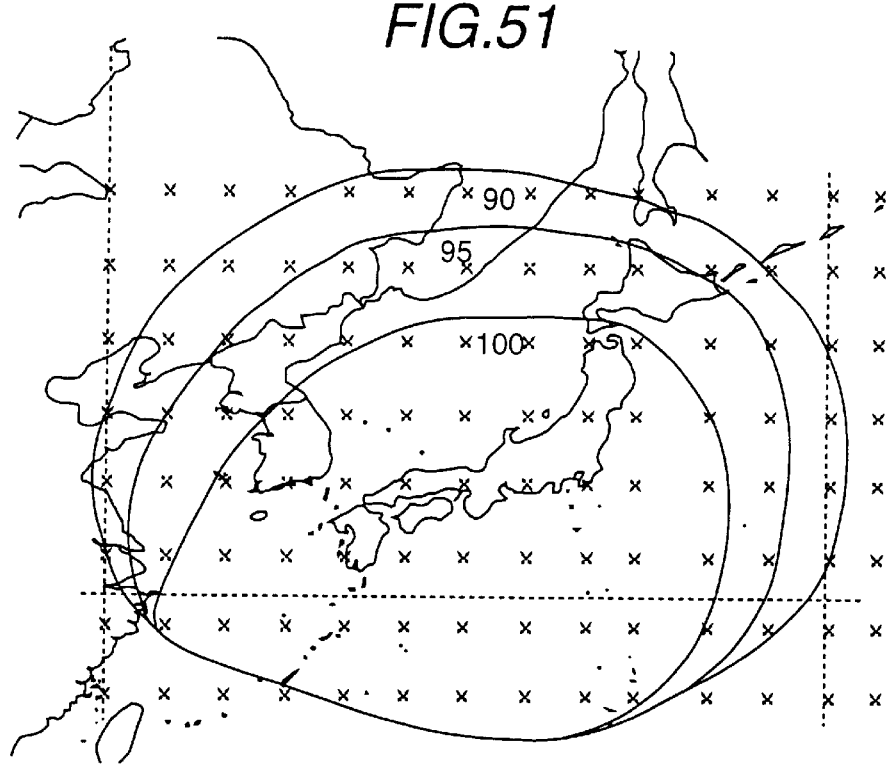
FIG. 51 is a chart showing a simulation result expressed by contour lines of time ratio (%) in which any one of the artificial satellites is visible at an elevation angle of above 70 degrees when the argument of perigee is 290 degrees in the case where service is provided 24 hours per day using three artificial satellites in the combination (42.5 degrees, 0.21).
Figure 52:
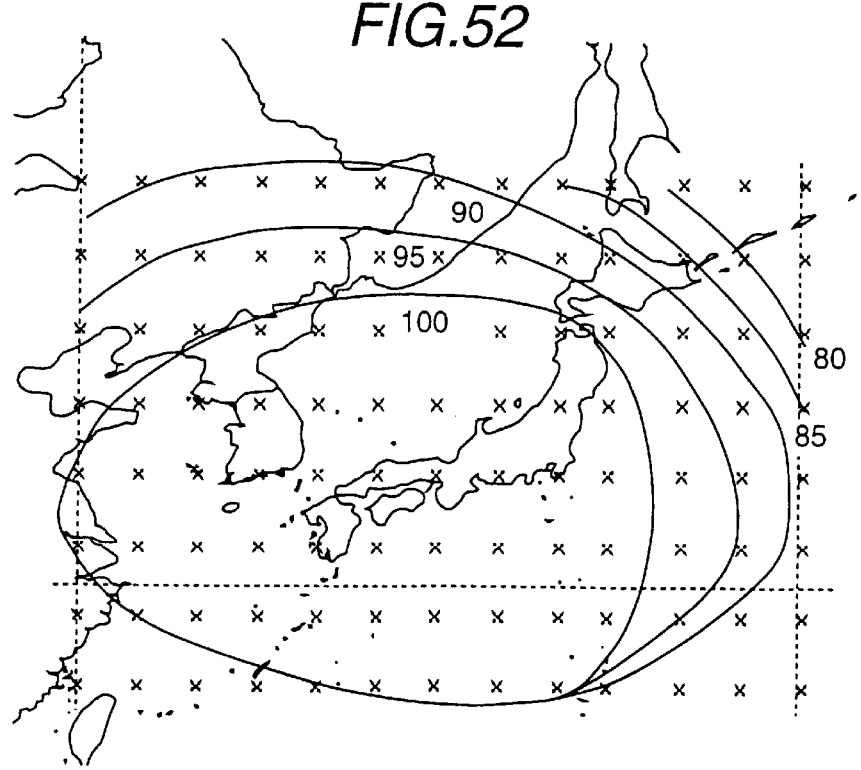
FIG. 52 is a chart showing a simulation result expressed by contour lines of time ratio (%) in which any one of the artificial satellites is visible at an elevation angle of above 70 degrees when the argument of perigee is 310 degrees in the case where service is provided 24 hours per day using three artificial satellites in the combination (42.5 degrees, 0.21).
Figure 53:
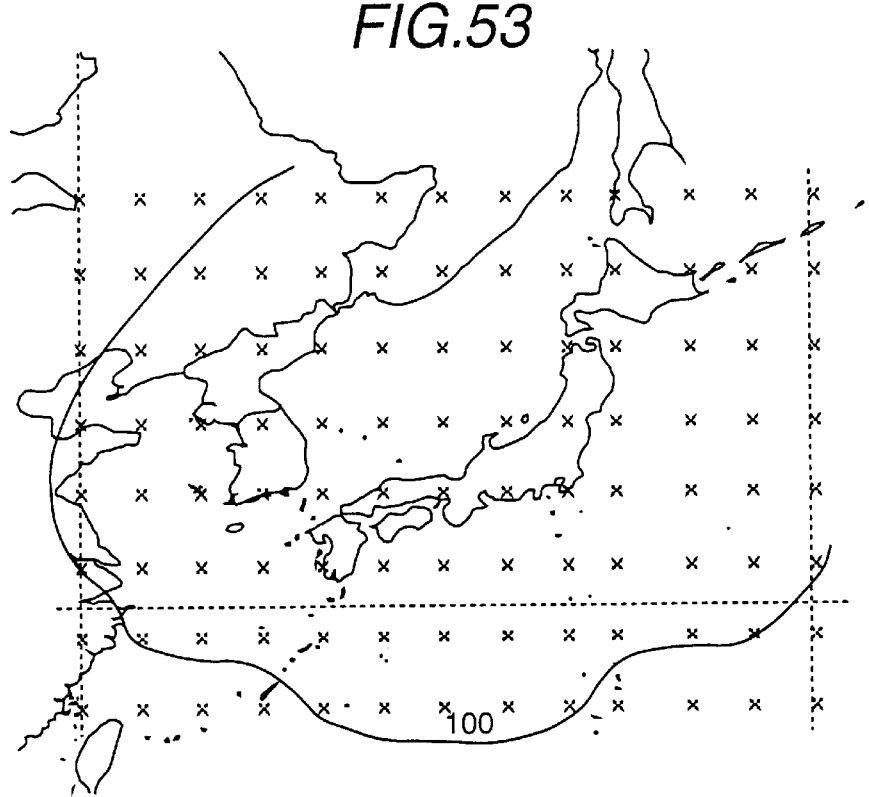
FIG. 53 is a chart showing a simulation result expressed by contour lines of time ratio (%) in which any one of the artificial satellites is visible at an elevation angle of above 70 degrees when the argument of perigee is 220 degrees in the case where service is provided 24 hours per day using four artificial satellites in the combination (42.5 degrees, 0.21).
Figure 54:
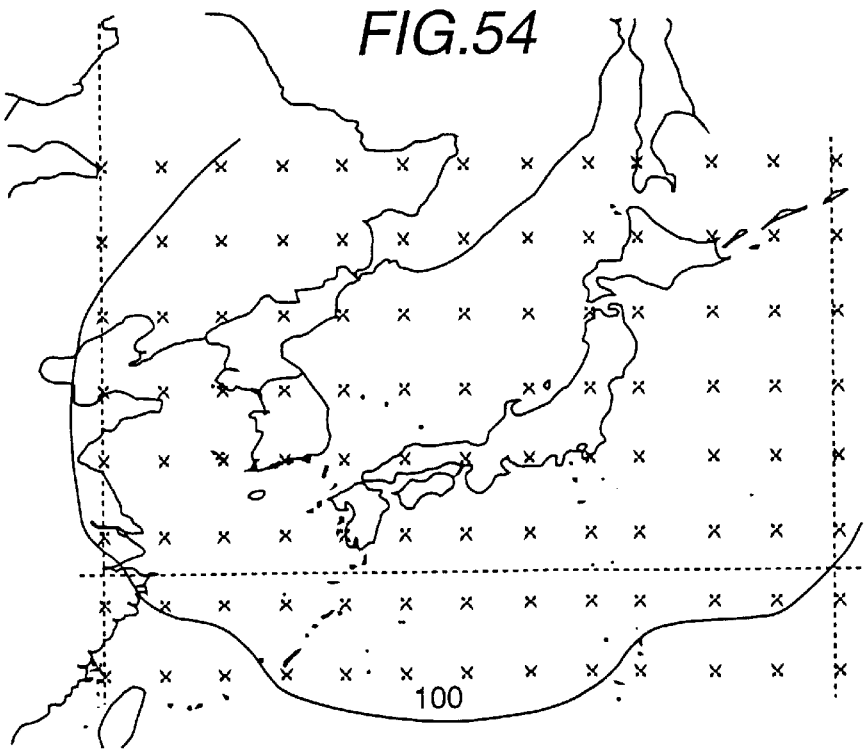
FIG. 54 is a chart showing a simulation result expressed by contour lines of time ratio (%) in which any one of the artificial satellites is visible at an elevation angle of above 70 degrees when the argument of perigee is 230 degrees in the case where service is provided 24 hours per day using four artificial satellites in the combination (42.5 degrees, 0.21).
Figure 55:
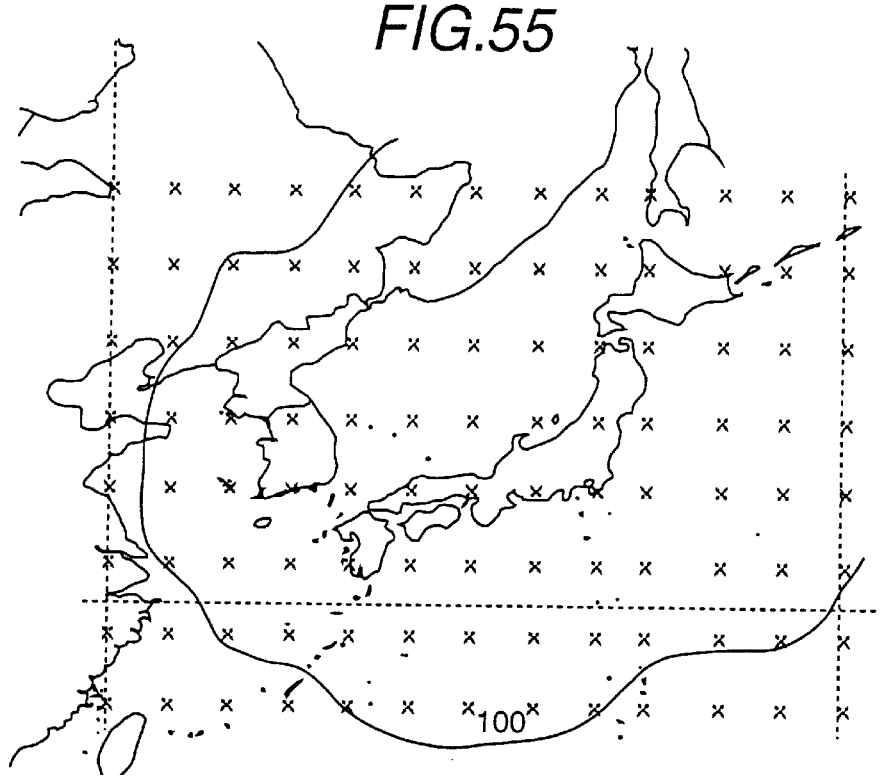
FIG. 55 is a chart showing a simulation result expressed by contour lines of time ratio (%) in which any one of the artificial satellites is visible at an elevation angle of above 70 degrees when the argument of perigee is 250 degrees in the case where service is provided 24 hours per day using four artificial satellites in the combination (42.5 degrees, 0.21).
Figure 56:
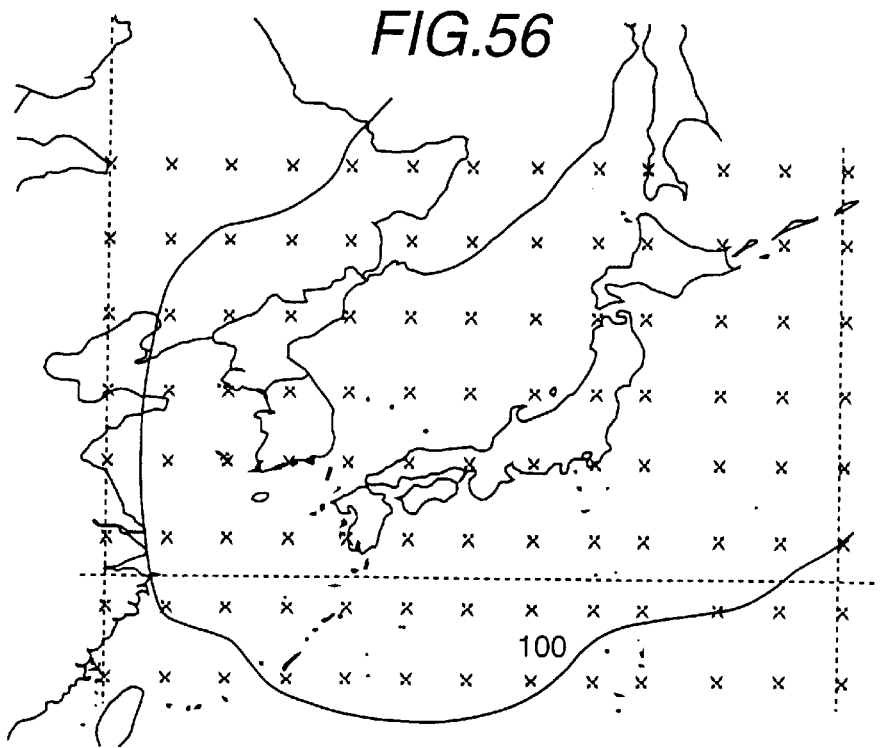
FIG. 56 is a chart showing a simulation result expressed by contour lines of time ratio (%) in which any one of the artificial satellites is visible at an elevation angle of above 70 degrees when the argument of perigee is 270 degrees in the case where service is provided 24 hours per day using four artificial satellites in the combination (42.5 degrees, 0.21).
Figure 57:
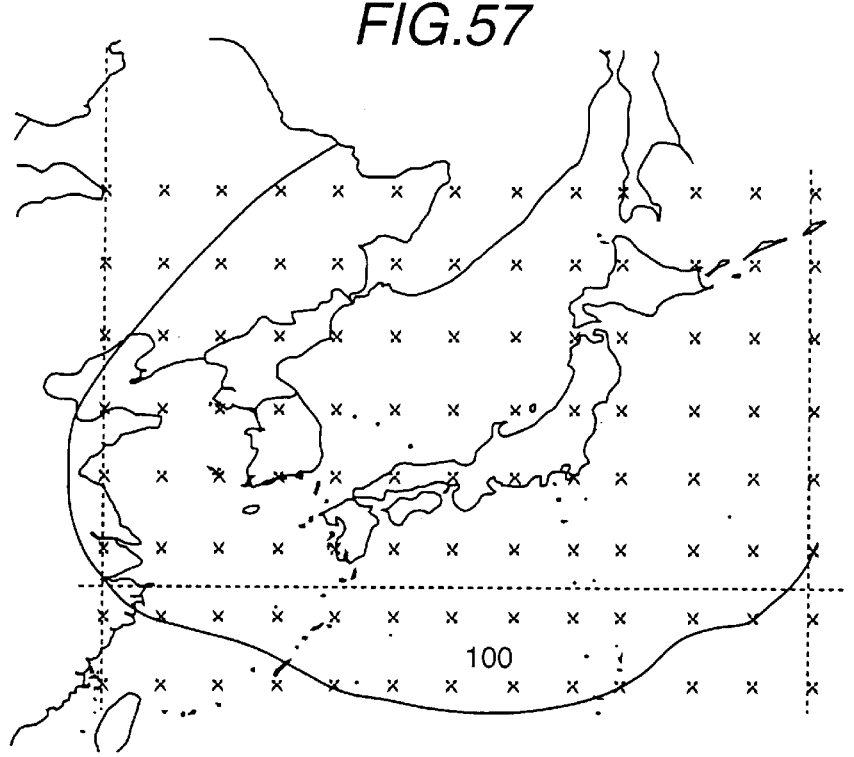
FIG. 57 is a chart showing a simulation result expressed by contour lines of time ratio (%) in which any one of the artificial satellites is visible at an elevation angle of above 70 degrees when the argument of perigee is 290 degrees in the case where service is provided 24 hours per day using four artificial satellites in the combination (42.5 degrees, 0.21).
Figure 58:
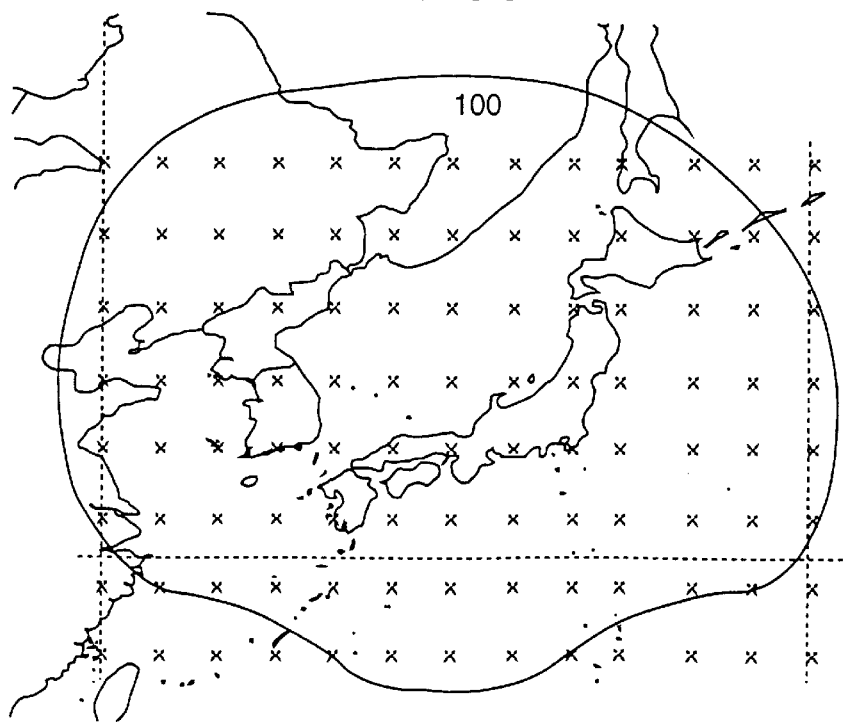
FIG. 58 is a chart showing a simulation result expressed by contour lines of time ratio (%) in which any one of the artificial satellites is visible at an elevation angle of above 70 degrees when the argument of perigee is 310 degrees in the case where service is provided 24 hours per day using four artificial satellites in the combination (42.5 degrees, 0.21).

What should be noted here is that an intersect point of the orbit of the artificial satellite with a stationary satellite orbit may appear at a certain argument of perigee because the orbit of the artificial satellite rotates within the orbital plane due to change in the argument of perigee. FIG. 46 is a graph showing argument of perigee in a case where the orbit of a 24-hour orbital period intersects with a stationary orbit for each eccentricity. As shown in FIG. 46, when the perigee exists in the sky of the southern hemisphere, there are two cases where the orbit in the ascending node side intersects with the stationary satellite orbit and where the orbit in the descending node side intersects with the stationary satellite orbit. Similarly, when the perigee exists in the sky of the northern hemisphere, there are two cases. In the case where the combination of argument of perigee is (42.5 degrees, 0.21), the orbit intersects with the stationary satellite orbit at the argument of perigees of 257.9 degrees and 282.1 degrees since the eccentricity is 0.21, as shown in FIG. 46. In actual operation of the artificial satellite, the argument of perigee is changed by performing orbit control just before intersecting with the stationary satellite orbit so as to prevent the orbit of the artificial satellite from intersecting with the stationary satellite orbit.

As references, in the case where service is provided 24 hours per day using three artificial satellites in the combination (42.5 degrees, 0.21), FIG. 47 to FIG. 52 show examples of simulation results expressed by contour lines of time ratio (%) in which any one of the artificial satellites is visible at an elevation angle of above 70 degrees when the argument of perigee is 220 degrees, 230 degrees, 250 degrees, 270 degrees, 290 degrees and 310 degrees, respectively. Similarly, in the case where service is provided 24 hours per day using four artificial satellites in the combination (42.5 degrees, 0.21), FIG. 53 to FIG. 58 show examples of simulation results expressed by contour lines of time ratio (%) in which any one of the artificial satellites is visible at an elevation angle of above 70 degrees when the argument of perigee is 210 degrees, 230 degrees, 250 degrees, 270 degrees, 290 degrees and 310 degrees, respectively. The area surrounded by the line "100" indicates an area where the time ratio is 100%, and the area surrounded by the line "90" indicates an area where the time ratio is 90%. By setting the argument of perigee to a value with the allowance as described above, it is possible to moderate the requirement of the orbit control of the artificial satellite as described above, and to provide satellite communication and broadcast service with a high elevation angle to the almost area in the territory of Japan.

Figure 59:
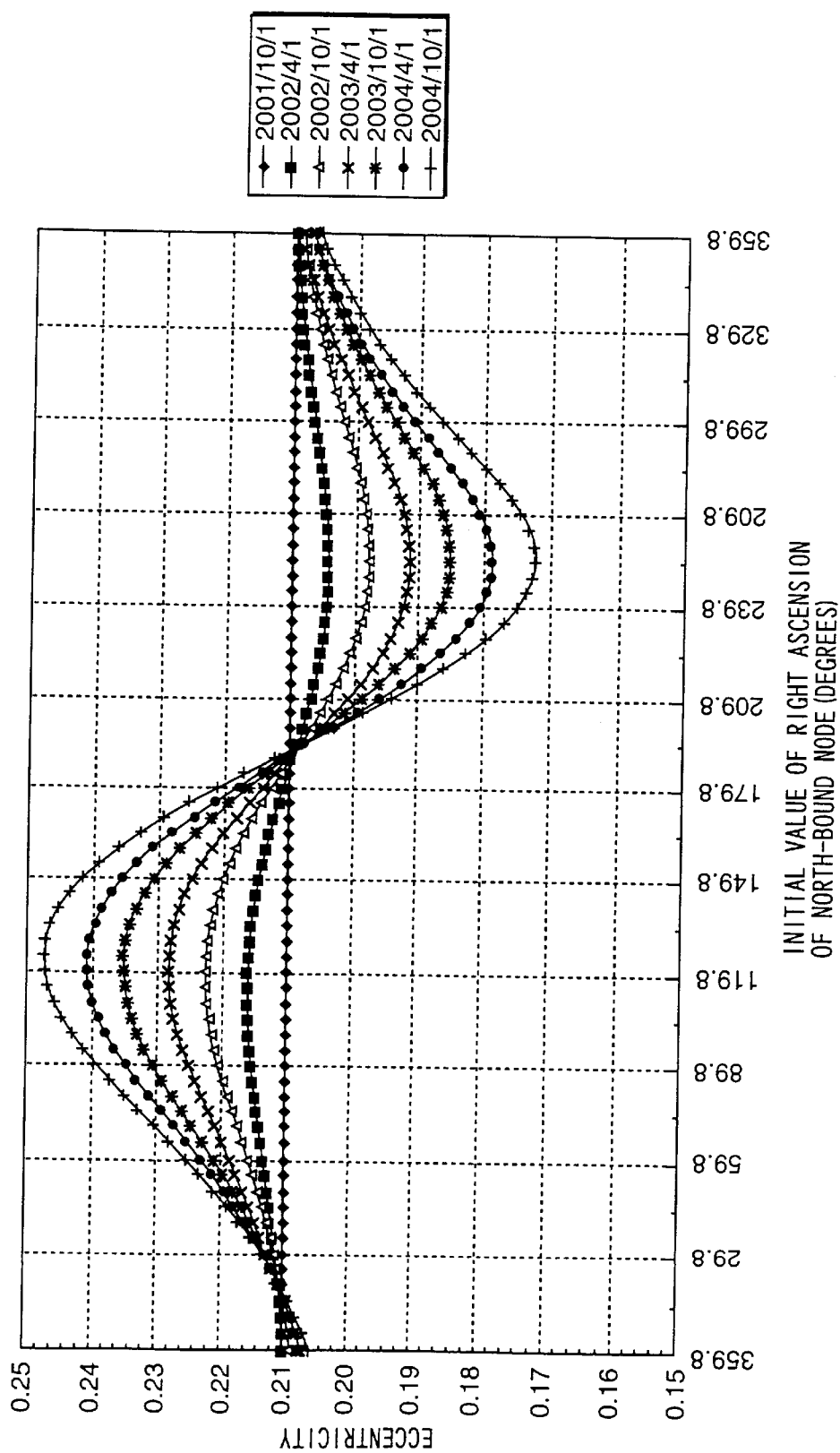
FIG. 59 is a graph showing change in eccentricity obtained by simulation of long-term orbit prediction over three years when orbit control is completely performed in a case of the combination (42.5 degrees, 0.21) taking the time 0:00:000 (UTC) on Oct. 1, 2001 as the reference time.
Figure 60:
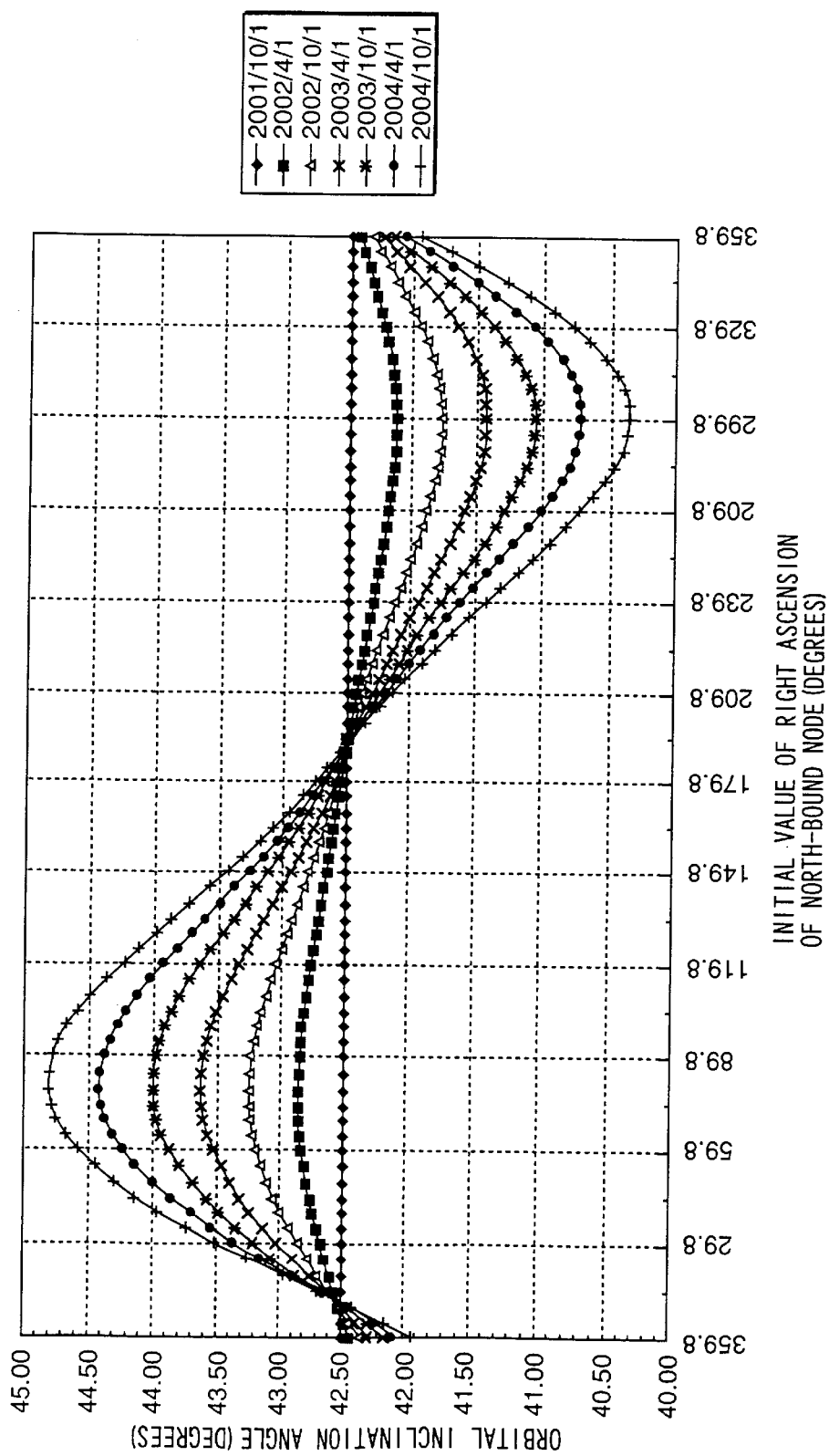
FIG. 60 is a graph showing change in orbit inclination angle obtained by simulation of long-term orbit prediction over three years when orbit control is completely performed in a case of the combination (42.5 degrees, 0.21) taking the time 0:00:000 (UTC) on Oct. 1, 2001 as the reference time.
Figure 61:
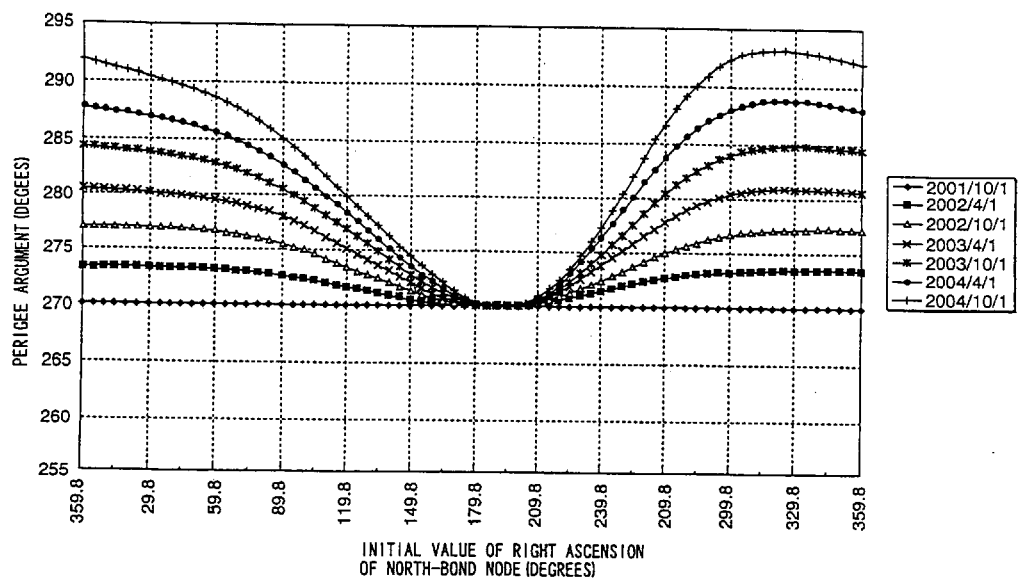
FIG. 61 is a graph showing change in argument of perigee obtained by simulation of long-term orbit prediction over three years when orbit control is completely performed in a case of the combination (42.5 degrees, 0.21) taking the time 0:00:000 (UTC) on Oct. 1, 2001 as the reference time.
Figure 62:
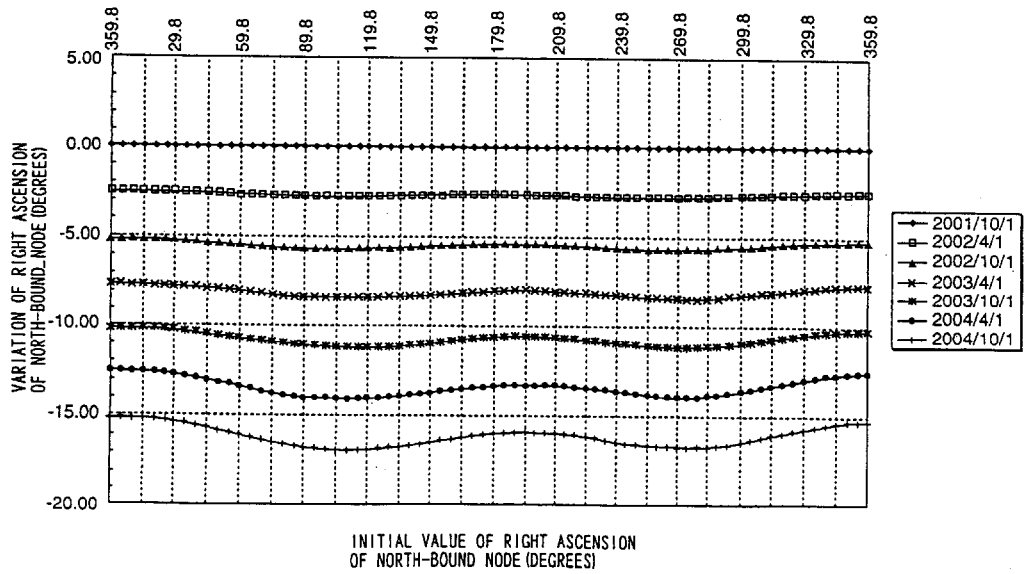
FIG. 62 is a graph showing change in right ascension of north-bound node obtained by simulation of long-term orbit prediction over three years when orbit control is completely performed in a case of the combination (42.5 degrees, 0.21) taking the time 0:00:000 (UTC) on Oct. 1, 2001 as the reference time.

FIG. 59 to FIG. 62 show a simulation result of long-term orbit prediction over three years when orbit control is completely performed in a case of the combination (42.5 degrees, 0.21) taking the time 0:00:000 (UTC) on Oct. 1, 2001 as the reference time. The initial values of the orbital elements are an orbital period of 24 hours, an orbit inclination angle of 42.5 degrees, an eccentricity of 0.21 and an argument of perigee of 270 degrees. FIG. 59 shows the long-term change in the eccentricity. FIG. 60 shows the long-term change in the orbit inclination angle. FIG. 61 shows the long-term change in the argument of perigee. FIG. 62 shows the long-term change in the right ascension of north-bound node. The abscissa in the figures expresses initial value of right ascension of north-bound node. It can be understood that the changes in the orbital elements depend on the initial value of the right ascension of north-bound node. Since the change in the argument of perigee depends on the initial value of the right ascension of north-bound node, an initial value of the argument of perigee may be set in taking the change in the initial value of the right ascension of north-bound node into consideration. For example, when the initial value of the right ascension of north-bound node is around 190 degrees, change in the argument of perigee is hardly observed over a long time. Therefore, by setting the initial value of the right ascension of north-bound node one of the artificial satellites to 190 degrees, the orbit control can be simplified.

(b) Method of Arranging Orbits for a Plurality of Artificial Satellites

Figure 2:
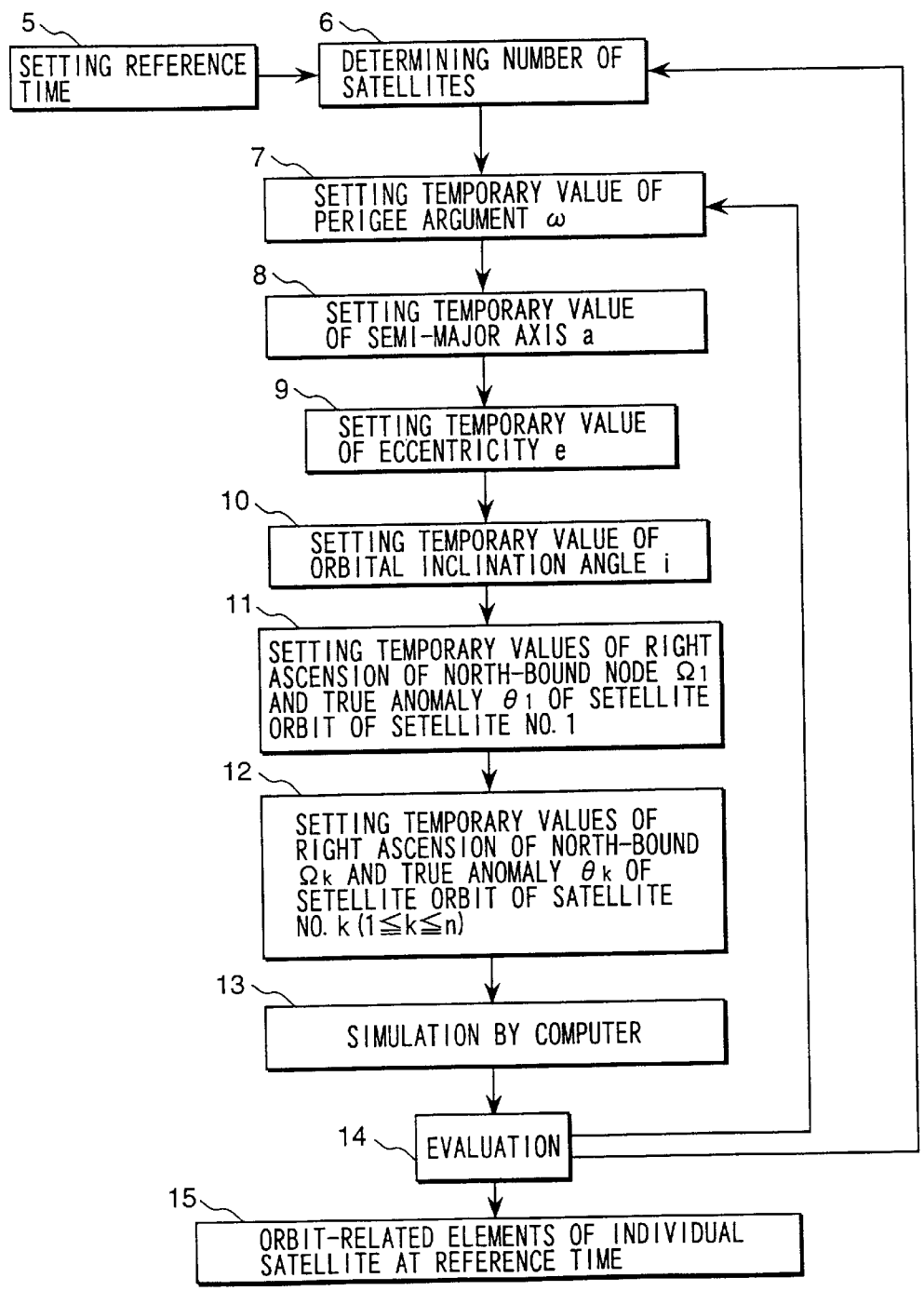
FIG. 2 is a flowchart showing a method of setting six orbital elements in accordance with the present invention.

Here, a method of setting the orbital elements in accordance with the present invention will be successively described. FIG. 2 is a flow chart showing the setting method.

In a case where service is performed concentratingly and continuously to a specified area using a plurality of artificial satellites, orbits projecting on the ground just below the individual satellites must agree with one another. In order to satisfy this condition, the semi-major axis, the eccentricity, the orbit inclination angle and the argument of perigee out of the orbital elements are nearly equal among the orbits. Therefore, in the following processes, the semi-major axis, the eccentricity, the orbit inclination angle and the argument of perigee are commonly set as the orbital elements for all of the artificial satellites, and the right ascension of north-bound node at a certain reference time and the argument of perigee are individually set for each artificial satellites.

(i) Setting of a Reference Time (Reference Character 5)

A reference time (epoch) for defining the six orbital element of the artificial satellite is set.

(ii) Setting of Number n of the Artificial Satellites (Reference Character 6)

Number n (n is a positive integer) of the artificial satellites is set.

(iii) Setting of a Temporary Value of the Argument of Perigee ω (Reference Character 7)

An arbitrary argument of perigee ω is given as a temporary value.

In a case where the service target area is a specified area in the northern hemisphere, if it is preferable for performing communication and broadcast service that the apogee of the artificial satellite orbit is placed in the sky above the specified area, it is often advantageous that the nominal value of the argument of perigee is set to 270 degrees. If it is preferable for observing a central celestial body of the artificial satellite traveling around that the perigee of the artificial satellite orbit is placed in the sky above the specified area, it is often advantageous that the nominal value of the argument of perigee is set to 90 degrees. In a case where the service target area is a specified area in the southern hemisphere, on the contrary, in the former case, it is often advantageous that the nominal value of the argument of perigee is set to 90 degrees. In the latter case, it is often advantageous that the nominal value of the argument of perigee is set to 270 degrees.

Further, as having been described in the item (a), the set value of the argument of perigee may be set with the allowance.

(iv) Setting of a Temporary Value of the Semi-major Axis a (Reference Character 8)

In a case where service is performed concentratingly and continuously to a specified area using a plurality of artificial satellites, orbits projecting on the ground just below the individual satellites must agree with one another. Further, each of the artificial satellites must travel in the sky above the same point on the ground every day. That is, the orbit projected on the ground must be fixed for a long time irrespectively of elapsing of time. In order to satisfy this requirement, the artificial satellite must travel around a central celestial body integer times while the central celestial body of the artificial satellite traveling around rotates one turn. When the central celestial body is the earth, a range of number m of traveling-around times satisfies the relation $1 \leq m \leq 16$ (m is an integer), and the present invention can be applied to a system using a plurality of artificial satellites traveling on an orbit having an orbital period shown in Table 3.

By the number m of traveling-around times, in a case where the central celestial body is the earth, an orbital period p (unit: hour) of the artificial satellite can be calculated by the following equation.

$$p = 23.93/m$$

By the orbital period p, an orbit semi-major axis a of the artificial satellite can be determined as shown in Table 3. In setting the orbital elements to be described below, a candidate is selected from the semi-major axes described in Table 3. However, at the selection, in a case where the central celestial body is the earth, service can not be continuously supplied to the specified area over 24 (hours/day) unless at least the following relation is satisfied.

$$p \times n \geq 23.93$$

TABLE 3

| No. | Number of Traveling-around times per day | Orbital Period (hour) | Semi-major Axis (km) |
|---|---|---|---|
| 1 | 1 | 23.93 | 42,164 |
| 2 | 2 | 11.97 | 26,562 |
| 3 | 3 | 7.98 | 20,270 |
| 4 | 4 | 5.98 | 16,733 |
| 5 | 5 | 4.79 | 14,420 |
| 6 | 6 | 3.99 | 12,770 |
| 7 | 7 | 3.42 | 11,522 |
| 8 | 8 | 2.99 | 10,541 |
| 9 | 9 | 2.66 | 9,745 |
| 10 | 10 | 2.39 | 9,084 |
| 11 | 11 | 2.18 | 8,525 |
| 12 | 12 | 1.99 | 8,044 |
| 13 | 13 | 1.84 | 7,626 |
| 14 | 14 | 1.71 | 7,259 |
| 15 | 15 | 1.60 | 6,932 |
| 16 | 16 | 1.50 | 6,640 |

Setting of a Temporary Value of the Eccentricity e (Reference Character 9)

An arbitrary eccentricity e is given as a temporary value.

For example, a service duration time required for one of artificial satellites in the specified area is let be Ts (unit: second). Letting time length required the artificial satellite travels from the perigee to a point starting the service of the orbit on which the artificial satellite travels be Ti, an eccentric anomaly at the point starting the service be Ei (unit: radian), and the true anomaly be θi (unit: radian), the following equations can be obtained.

$$Ti = (Ei - e\sin Ei) \times p/(2 \times \pi)$$

$$\cos Ei = (e + \cos \theta i)/1 + e\cos \theta i)$$

Therefor, assuming that the point stopping the service on the orbit is placed at a point symmetric to the point starting the service with respect to the major axis of the orbit, the following relation can be obtaied.

$$Ts \leq p - Ti \times 2$$

$$\therefore (p - Ti \times 2) - Ts \geq 0$$

Since it is necessary to take rotation of the celestial body of the artificial satellite traveling around into consideration, an eccentricity satisfying the above relation is given as an initial value in taking a combination of the eccentric anomaly Ei at the point starting the service and the eccentricity e into consideration. At considering the combination, it is convenience to take it into consideration that the minimum value of the eccentric anomaly is $\pi/2$ and the maximum value is $\pi$.

(vi) Setting of a Temporary Value of the Orbit Inclination Angle (Reference Character 10)

An arbitrary orbit inclination angle i is given as a temporary value.

In that time, it is convenience that initially the maximum value and the minimum value of longitudes of the specified service target area are obtained, and then the average value is given as the initial value of the orbit inclination angle.

(vii) Setting of a Temporary Value of the True Anomaly

When the satellite having satellite number 1 is at the perigee, the true anomaly θk (unit: radian) for satellite number k ($1 \leq k \leq n$, k is an integer) is given by the following equation. Since the eccentric anomaly corresponds to the true anomaly one-to-one, the eccentricity anomaly is initially calculated and then the true anomaly is calculated.

$$-23.93 \times (k-1)/n \times 3600 = (Ek - e\sin Ek) \times P/(2 \times \pi) \cos \theta I = (e - \cos Ei)/(e \times \cos Ei - 1)$$

By the combination of the right ascension of north-bound node Ωk and the true anomaly θk described above, the orbits projected on the ground of the plurality of artificial satellites agree with one another, and the n number of satellites from satellite number 1 to satellite number n sequentially draw the single orbit projected on the ground. That is, the n number of satellites from satellite number 1 to satellite number n repetitively travel in the sky above the specified area.

(viii) Setting of Temporary Values of the Right Ascension of North-bound Node Ω1 and the True Anomaly θ1 of the Artificial Satellite of Satellite Number 1 (Reference Character 11)

In order to perform service to the specified area, the individual artificial satellites must travel in the sky above the specified area. Therefore, the right ascension of north-bound node Ω1 and the true anomaly θ1 of the artificial satellite of satellite number 1 at the reference time are set so as to travel in the sky above the specified area. At that time, the right ascension of north-bound node Ω1 can be easily set by performing simulation using a computer by setting the true anomaly θ1=0 (degree).

(ix) Setting of Temporary Values of the Right Ascension of North-bound Node Ωk and the True Anomaly θk of the Artificial Satellite of Satellite Number k (Reference Character 12)

By the right ascension of north-bound node θ1 and the true anomaly θ1 set for the artificial satellite of satellite number 1, the right ascension of north-bound node Ωk and the true anomaly θk of the artificial satellite of satellite number k at the reference time is sequentially calculated from k=2 to k=n. In detail, when the right ascension of north-bound node Ω1 (unit: radian) of the orbit of the artificial satellite of satellite number 1 is taken as the reference, the right ascension of north-bound node Ωk (unit: radian) of the orbit of the artificial satellite of satellite number k ($1 \leq k \leq n$) is given by the following equation.

$$\Omega k = \Omega 1 + (k-1)/n \times 360$$

This equation is for arranging the plurality of artificial satellites on the orbital plane spaced in an equal angle.

(x) Evaluation (Reference Character 14)

It is evaluated whether or not requirements are satisfied by the group of artificial satellites traveling on the orbit determined by the orbital elements given above. For example, the requirements with regard to contents of the service in the specified area are as follows.

Time duration in which one artificial satellite can continuously perform the service to the specified area.

Time duration in which one artificial satellite is visible in the sky in a high elevation angle when it is seen from the specified area.

Distance between the artificial satellite and the specified area, and change with time of the distance.

Delay time of the electromagnetic wave propagation.

Doppler shift of the electromagnetic wave, and line design.

Spatial resolution when the specific area is observed.

The requirements with regard to control of the orbit of artificial satellite are as follows.

Long-term change of each of the orbital elements of each orbit.

Control amount of each of the orbital elements of each orbit, and an amount of propellant necessary for the control.

The evaluation can be easily performed by performing computer simulation using the above-set orbital elements as input values. Items and requirement necessary for the evaluation are set usually before examining the orbit arrangement.

(xi) Repeating of Process of Setting the Orbital Elements

When the requirements are not satisfied in the above evaluation, the processes from the step (iii) to the step (x) are repeated. The processes from the step (i) to the step (x) are repeated, if necessary. In a case where the temporary value needs not to be reviewed, the corresponding item needs not to be reviewed. Therein, the order of the above-described processes may be arbitrarily changed depending on necessity.

In the case where the orbital elements are set through the above-described method, the artificial satellites from the artificial satellite of satellite number 1 to the artificial satellite of satellite number n sequentially appear in the sky above the specified target area to be supplied with the service by the group of artificial satellites. Further, if the right ascension of north-bound node set in the step (ix) is determined using the following equation $$\Omega k = \Omega 1 - (k-1)/n \times 360 \ (1 \leq k \leq n, \ k \text{ is an integer}),$$

and the eccentric anomaly set in the step (vii) is determined using the following equation $$23.93 \times (k-1)/n \times 3600 = (Ek - e \times \sin Ek) \times P/(2 \times \pi),$$

the similar result can be obtained. In this case, the artificial satellites from the artificial satellite of satellite number n to the artificial satellite of satellite number 1 sequentially appear in the sky above the specified target area to be supplied with the service by the group of artificial satellites.

(xii) In a Case Where the Requirements are Satisfied in the Above Evaluation, the Final Orbital Elements of Each of the Artificial Satellites at the Reference Time are Obtained (2) Examples of the Values of the Orbital Elements and the Orbit Arrangement Set by the Above-described Algorithm Examples of the values of the orbital elements and the orbit arrangement set by the above-described algorithm will be described below.

As to be described later, an orbit of an artificial satellite is always changed by the effects of the gravitational field of the earth and the attractive forces of the moon and the sun, and generally orbit-controlled with an allowable range to a certain degree. Therefore, each value of the orbital elements indicates a target nominal value after orbit-controlled.

In the following tables, $\Omega 1$ and $\theta 1$ are the right ascension of north-bound node and the true anomaly of the artificial satellite of satellite number 1 set corresponding to the reference time.

Table 4 and Table 5 show examples of the orbital elements and the orbit arrangement for a satellite communication and broadcast network by three artificial satellites traveling on an orbit of 24-hour orbital period. The eccentricity and the orbit inclination angle may be a combination within the range shown in FIG. 26 and FIG. 27. The argument of perigee may be smaller than 180 degrees.

The example of the orbit arrangement covers the whole territory of Japan as the target service area.

TABLE 4

| Item | Value | | |
|---|---|---|---|
| Satellite No. | 1 | 2 | 3 |
| Orbital Period (hour) | 24 | | |
| Semimajor Axis (km) | approx. 42,164 | | |
| Eccentricity | not larger than 0.24 | | |
| Orbit Inclination Angle (degrees) | larger than 37 degrees and smaller than 44 degrees | | |
| Argument of Perigee (degrees) | larger than 180 degrees and smaller than 360 degrees | | |
| Right Ascension of North-Bound node (degrees) | $\Omega 1$ | $\Omega 1 + 120$ | $\Omega 1 + 240$ |
| True Anomaly (degrees) | $\theta 1$ | an angle ⅓ of orbital period behind $\theta 1$ | an angle ⅓ of orbital period ahead of $\theta 1$ |

TABLE 5

| Item | Value | | |
|---|---|---|---|
| Satellite No. | 1 | 2 | 3 |
| Orbital Period (hour) | 24 | | |
| Semimajor Axis (km) | approx. 42,164 | | |
| Eccentricity | not larger than 0.24 | | |
| Orbit Inclination Angle (degrees) | larger than 40 degrees and smaller than 44 degrees | | |
| Argument of Perigee (degrees) | larger than 180 degrees and smaller than 360 degrees | | |
| Right Ascension of North-Bound node (degrees) | $\Omega 1$ | $\Omega 1 + 120$ | $\Omega 1 + 240$ |
| True Anomaly (degrees) | $\theta 1$ | an angle ⅓ of orbital period behind $\theta 1$ | an angle ⅓ of orbital period ahead of $\theta 1$ |

The artificial satellite using either of the above orbital elements becomes visible in an elevation angle above 70 degrees coincidentally from all the cities from Nemuro to Naha over 8 hours at the maximum to 6 hours at the minimum. The longest duration time of 8 hours can be obtained when the orbit inclination angle is approximately 42.5 degrees and the eccentricity is approximately 0.21. Therefore, by the group of artificial satellites using the above-mentioned orbital element, it can be realized that at least one or more satellites become visible in a high elevation angle coincidentally from all the cities from Nemuro to Naha over 24 hours per day.

Figure 5:
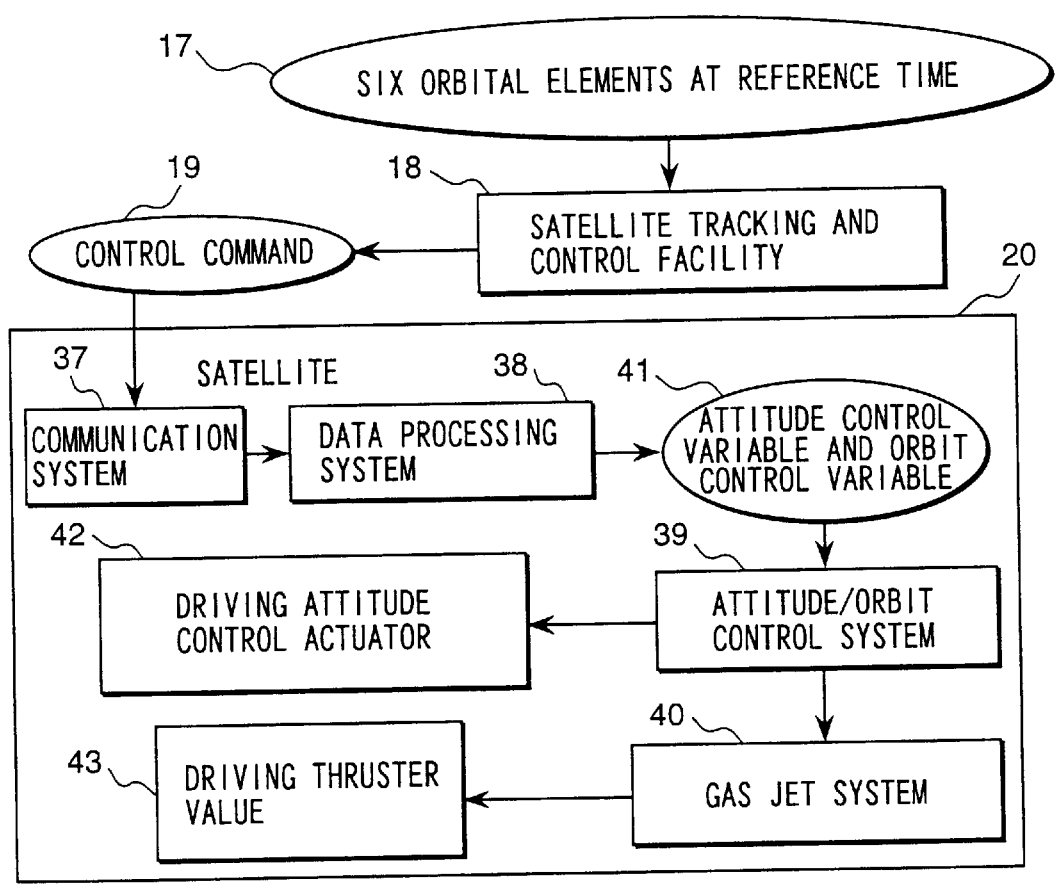
FIG. 5 is an explanatory diagram showing flows of processing and information performed in an artificial satellite to control the orbit of the artificial satellite.
Figure 6:
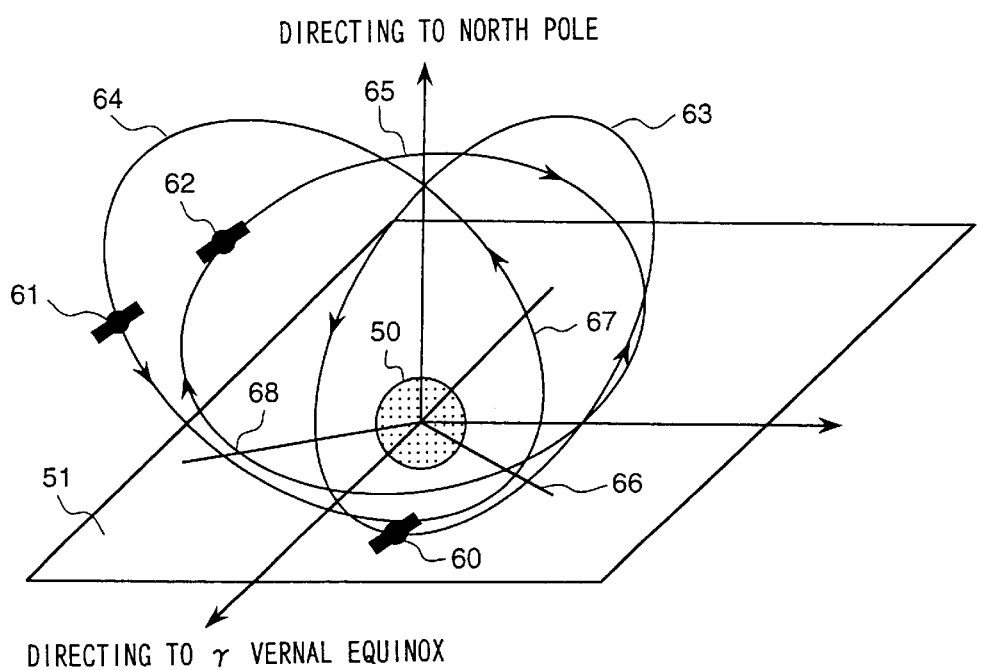
FIG. 6 is an explanatory diagram showing orbits around the earth with respect to an example of orbit configuration using three artificial satellites obtained by an algorithm in accordance with the present invention.

In this orbit arrangement example, there are three orbital planes as shown in FIG. 6, and each of the artificial satellite 60, the artificial satellite 61 and the artificial satellite 62 is arranged one on each of the orbits. The artificial satellite 60, the artificial satellite 61 and the artificial satellite 62 travel with one turn in approximately 24 hours on the orbit 63, the orbit 64 and the orbit 65, respectively. Each of the artificial satellite 60, the artificial satellite 61 and the artificial satellite 62 travels on each of the orbits with an orbital period of 24 hours, and each of the orbits is formed so that the argument of perigee is within the range of larger than 180 degrees and smaller than 360 degrees; and the eccentricity is not larger than 0.24 and the orbital inclination angle is larger than 37 degrees and smaller than 44 degrees, or the eccentricity is larger than 0.24 and smaller than 0.35 and the orbital inclination angle is larger than 40 degrees and smaller than 44 degrees. The right ascensions of north-bound node of the three artificial satellites are separated by 120 degrees as shown in FIG. 6, and set so that the apogee of each of the orbits appears an appropriate position in the sky above the territory of Japan. As the positional relationship of each of the artificial satellites in each of the orbits, when the artificial satellite 60 is at the perigee on the corresponding orbit 63, the artificial satellite 61 is at a position having a true anomaly lagging behind by one-third of the orbital period on the corresponding orbit 64; and the artificial satellite 62 is at a position having a true anomaly leading ahead by one-third of the orbital period on the corresponding orbit 65. This orbit arrangement is obtained by the algorithm shown the outline in FIG. 2 and the algorithm of the setting method of the argument of perigee, and is realized by the control method shown in FIG. 3, FIG. 4 and FIG. 5.

By this orbit arrangement, any one of the artificial satellite 60, the artificial satellite 61 and the artificial satellite 62 is always visible in an elevation angle above 70 degrees from the territory of Japan from Hokkaido to Okinawa. Since each of the artificial satellite 60, the artificial satellite 61 and the artificial satellite 62 has the period of nearly 24 hours, the time when the artificial satellite becomes visible in the elevation angle above 70 degrees and the time when the artificial satellite becomes invisible are periodical and regular. In this case, in the territory of Japan, the artificial satellite 60, the artificial satellite 61 and the artificial satellite 62 alternatively appear in the elevation angle above 70 degrees with one cycle per day, and each of the artificial satellites stays and is visible in a direction in the elevation angle above 70 degrees for 8 hours at the maximum and 6 hours at the minimum. This cycle is repeated every day with 24 hour cycle.

Therefore, by using the artificial satellites typically shown by the artificial satellite 90 in FIG. 8 to FIG. 34 showing examples of systems employing the orbit arrangement for satellite communication or satellite broadcast, it is possible to construct a satellite communication system or a satellite broadcast system which seldom cause communication interruption by shielding objects or interfering objects.

Table 6 and Table 7 show examples of the orbital elements and the orbit arrangement for a satellite communication and broadcast network by four artificial satellites traveling on an orbit of 24-hour orbital period. The eccentricity and the orbit inclination angle may be a combination within the range shown in FIG. 35 and FIG. 36. The argument of perigee may be smaller than 180 degrees.

TABLE 6

| Item | Value | | | |
|---|---|---|---|---|
| Satellite No. | 1 | 2 | 3 | 4 |
| Orbital Period (hour) | 24 | | | |
| Semimajor Axis (km) | approx. 42,164 | | | |
| Eccentricity | not larger than 0.24 | | | |
| Orbit Inclination Angle (degrees) | larger than 37 degrees and smaller than 44 degrees | | | |
| Argument of Perigee (degrees) | larger than 180 degrees and smaller than 360 degrees | | | |
| Right Ascension of North-Bound node (degrees) | Ω1 | Ω1 + 90 | Ω1 + 180 | Ω1 + 270 |
| True Anomaly (degrees) | θ1 | an angle ¼ of orbital period behind θ1 | θ1 + 180 | an angle ¼ of orbital period ahead of θ1 |

TABLE 7

| Item | Value | | | |
|---|---|---|---|---|
| Satellite No. | 1 | 2 | 3 | 4 |
| Orbital Period (hour) | 24 | | | |
| Semimajor Axis (km) | approx. 42,164 | | | |
| Eccentricity | larger than 0.24 and smaller then 0.35 | | | |
| Orbit Inclination Angle (degrees) | larger than 40 degrees and smaller than 44 degrees | | | |
| Argument of Perigee (degrees) | larger than 180 degrees and smaller than 360 degrees | | | |
| Right Ascension of North-Bound node (degrees) | Ω1 | Ω1 + 90 | Ω1 + 180 | Ω1 + 270 |
| True Anomaly (degrees) | θ1 | an angle ¼ of orbital period behind θ1 | θ1 + 180 | an angle ¼ of orbital period ahead of θ1 |

The artificial satellite using either of the above orbital elements becomes visible in an elevation angle above 70 degrees coincidentally from all the cities from Nemuro to Naha over 8 hours at the maximum to 6 hours at the minimum. The longest duration time of 8 hours can be obtained when the orbit inclination angle is approximately 42.5 degrees and the eccentricity is approximately 0.21. Therefore, by the group of artificial satellites using the above-mentioned orbital element, it can be realized that at least one or more satellites become visible in a high elevation angle coincidentally from all the cities from Nemuro to Naha over 24 hours per day.

Figure 7:
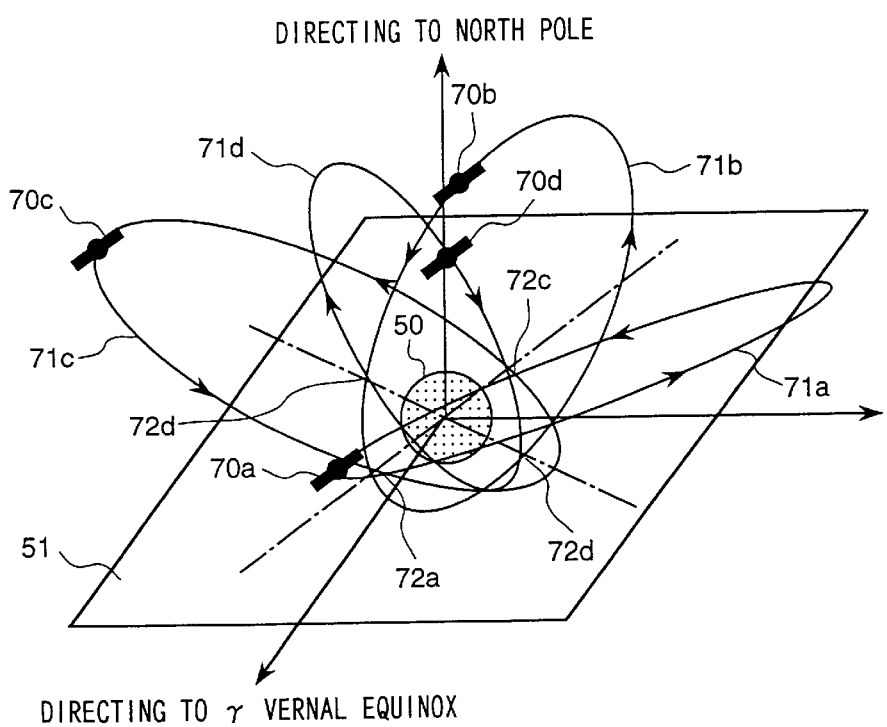
FIG. 7 is an explanatory diagram showing orbits around the earth with respect to Example 2 of orbit configuration obtained by an algorithm in accordance with the present invention.

In this orbit arrangement example, there are four orbital planes as shown in FIG. 7, and each of the artificial satellite 70a, the artificial satellite 70b, the artificial satellite 70c and the artificial satellite 70d is arranged one on each of the orbit planes. The artificial satellite 70a travels on the orbit 71a with one turn in approximately 24 hours, the artificial satellite 70b on the orbit 71b, the artificial satellite 70c on the orbit 71c and the artificial satellite 70d on the orbit 71d. Each of the artificial satellite 70a, the artificial satellite 70b, the artificial satellite 70c and the artificial satellite 70d travels on each of the orbits with an orbital period of 24 hours, and each of the orbits is formed so that the argument of perigee is within the range of larger than 180 degrees and smaller than 360 degrees; and the eccentricity is not larger than 0.24 and the orbital inclination angle is larger than 37 degrees and smaller than 44 degrees, or the eccentricity is larger than 0.24 and smaller than 0.35 and the orbital inclination angle is larger than 40 degrees and smaller than 44 degrees. The right ascensions of north-bound node of the four artificial satellites are separated by 90 degrees as shown in FIG. 7, and set so that the apogee of each of the orbits appears an appropriate position in the sky above the territory of Japan. As the positional relationship of each of the artificial satellites in each of the orbits, when the artificial satellite 70a is at the perigee on the corresponding orbit 71a, the artificial satellite 70b is at a position having a true anomaly lagging behind by one-fourth of the orbital period on the corresponding orbit 71b; the artificial satellite 70c is at an apogee on the corresponding orbit 71c; and the artificial satellite 70d is at a position having a true anomaly leading ahead by one-fourth of the orbital period on the corresponding orbit 71d.

By this orbit arrangement, any one of the artificial satellite 70a, the artificial satellite 70b, the artificial satellite 70c and the artificial satellite 70d is always visible in an elevation angle above 70 degrees from the territory of Japan from Hokkaido to Okinawa. Since each of the artificial satellite 70a, the artificial satellite 70b, the artificial satellite 70c and the artificial satellite 70d has the period of nearly 24 hours, the time when the artificial satellite becomes visible in the elevation angle above 70 degrees and the time when the artificial satellite becomes invisible are periodical and regular. This orbit arrangement is obtained by the algorithm shown the outline in FIG. 2 and the algorithm of the setting method of the argument of perigee, and is realized by the control method shown in FIG. 3, FIG. 4 and FIG. 5.

In this case, in the four islands of Hokkaido, Honshuu, Shikoku and Kyuushuu and Okinawa, the artificial satellite 70a, the artificial satellite 70b, the artificial satellite 70c and the artificial satellite 70d alternatively appear in the elevation angle above 70 degrees once a day, and each of the artificial satellites stays and is visible in a zenith direction above 70 degrees for 8 hours at the maximum and 6 hours at the minimum. In addition, there is some time when a plurality of the artificial satellites are visible in a zenith direction above 70 degrees at a time. This cycle is repeated every day with 24 hour cycle.

Therefore, by using the artificial satellites typically shown by the artificial satellite 90 in FIG. 8 to FIG. 34 showing examples of systems employing the orbit arrangement for satellite communication or satellite broadcast, it is possible to construct a satellite communication system or a satellite broadcast system which seldom cause communication interruption by shielding objects or interfering objects.

(3) Means for Realizing and Controlling the Set Orbital Elements and the Set Orbit Arrangement The orbits of the artificial satellites having the orbital elements set such a manner are controlled and realized as follows.

Figure 3:
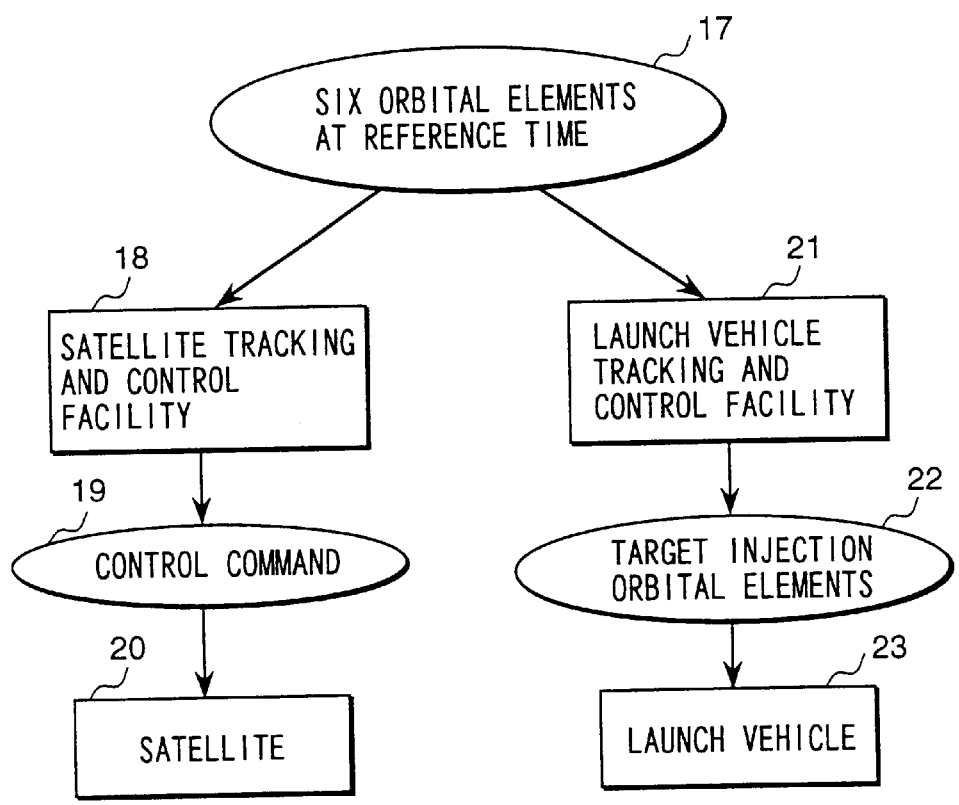
FIG. 3 is an explanatory diagram showing flow of information for controlling an orbit of an artificial satellite to the six orbital elements set by an algorithm in accordance with the present invention.

As shown in FIG. 3, at launching the artificial satellite 20, information of the previously set six orbital elements 17 at the reference time is input to a launch vehicle tracking and control facility 21 from which information of target injection orbit elements 22 is transmitted to the launch vehicle. The launch vehicle 23 is injected into a target orbit automatically based on the information or by control from the launch vehicle tracking and control facility 21.

After the artificial satellite is injected into the orbit, the information of the six orbital elements at reference time is periodically input to an artificial satellite tracking and control facility 18 to transmit information of a control command 19 to the artificial satellite 20, and the artificial satellite 20 is controlled to the six orbital elements at target orbital time by a control system mounted on the artificial satellite 20.

This method of orbit control is based on a commonly used method, and the detail is as follows.

The six orbital elements 17 (the semi-major axis 11, the argument of perigee 12, the eccentricity 13, the orbit inclination angle 14, the right ascension of north-bound node 15 and the true anomaly 16) at reference time obtained by the above-mentioned algorithm are input to the launch vehicle tracking and control facility 21 as the target injection orbit elements, as shown in FIG. 3. This information is transmitted from the launch vehicle tracking and control facility 21 to the launch vehicle 23 to inject the artificial satellite 20 into the target orbital elements. When the launch vehicle 23 mounting the artificial satellite 20 is about to deviate from the target orbit in the stage of launching, the launch vehicle 23 may automatically correct the orbit, or the launch vehicle tracking and control facility 21 may transmit an orbit correction command to the launch vehicle 23 to guide the launch vehicle.

Even after reaching the target injection orbital elements 22 by the launch vehicle 23, the orbital elements are affected with perturbation by the effects of the gravitation field of the earth, the gravitational forces of the sun and the moon and the solar window, and the orbital elements are always changed in short period and long period as time is elapsing. In this case, the artificial satellite 20 is required to be controlled.

Figure 4:
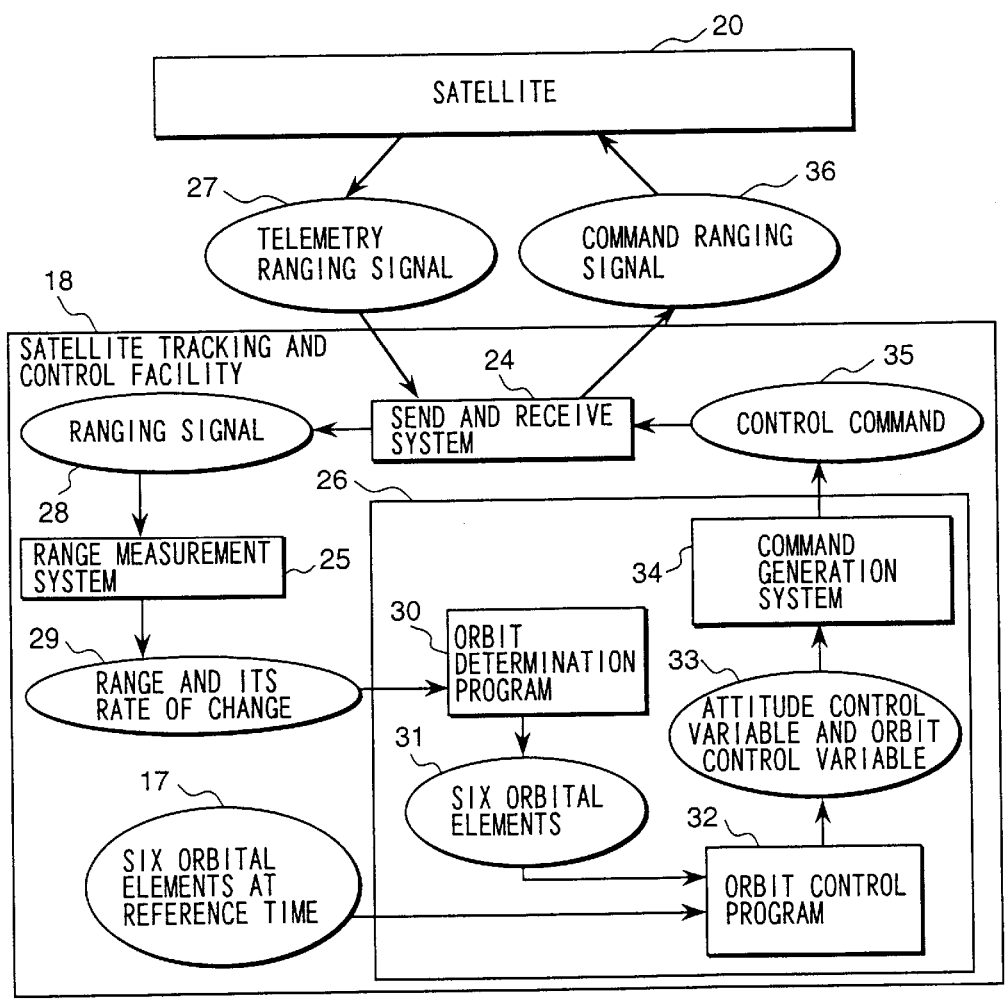
FIG. 4 is an explanatory diagram showing flows of work and information performed in an artificial satellite tracking and controlling facility to control the orbit of the artificial satellite.

As shown in FIG. 4, in general, the six orbital elements 31 of the orbit on which the artificial satellite 20 is now traveling are determined by that a send and receive system 24 of the artificial satellite tracking and control facility 18 receives telemetry and ranging signals 27 sent by the artificial satellite 20, and extracts the ranging signal 28 to send it to a range measurement system 25, and then a computer system 26 executes calculation from the measured range and the rate of change of the range 29 as final inputs using an orbit determining program in the computer system 26. The computer system 26 calculates a necessary attitude control variable and an orbital control variable 33 by comparing the obtained six orbital elements 31 with the target six orbital elements at reference time using an orbit control program 32 in the computer system 26. Thereby, it is determined when and how long and which thruster of the gas jet unit mounted on the artificial satellite should be jetted. The results are converted into a control command 35 using a command generating program 34 in the computer system 26 to be sent to the artificial satellite 20 through the send and receive system 24 of the artificial satellite tracking and control facility 18.

As shown in FIG. 5, the control command transmitted to the artificial satellite 20 is received by a communication system 37 mounted on the artificial satellite 20, and then transmitted to a data processing system 38, and the transmitted command is deciphered there. Information of an attitude control variable and an orbit control variable 41 is appropriately processed in an attitude and orbit control system 39 mounted on the artificial satellite from the deciphered command, and finally the artificial satellite 20 is injected and controlled to the orbit shown by the above-mentioned six orbital elements at reference time by being changed in the attitude by operating an attitude control actuator drive 42 depending on necessary, and further by jetting the gas jet unit 40 of the artificial satellite mounting propelling system according to the command. In a case where the artificial satellite 20 mounts a GPS satellite receiver, the artificial satellite 20 may be constructed so that the artificial satellite 20 itself stores the six orbital elements at reference time 17 preferable at that time point in advance, and autonomously controls the orbit using the stored six orbital elements at reference time 17.

As described above, the orbit elements 17 determined by the aforementioned algorithm are controlled and realized.

Further, in the case where the plurality of artificial satellites are arranged on the orbits, it is necessary to appropriately control the individual orbits of the artificial satellites so that each of the orbits of the artificial satellites maintains a preferable harmonious relationship of the orbit arrangement.

Description will be made below on systems to which a group of artificial satellites traveling on the orbits obtained by the aforementioned algorithm in accordance with the present invention is applied.

(4) Systems to which a Group of Artificial Satellites Traveling on the Orbits in Accordance with the Present Invention is Applied (4-1) System Example 1

An example of system 1 is a satellite broadcast system.

Figure 8:
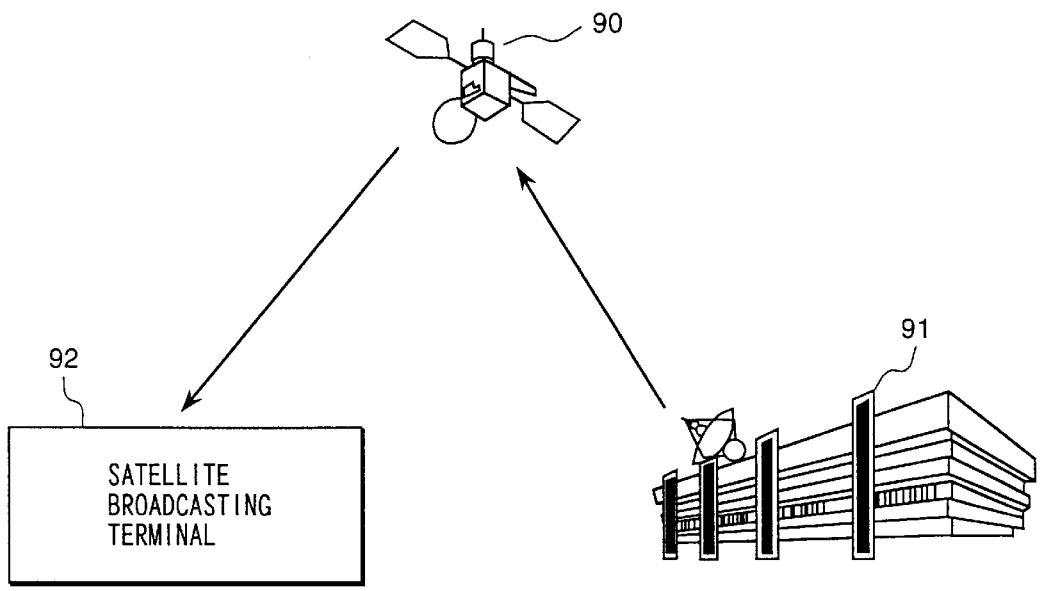
FIG. 8 is an explanatory view showing an example of a satellite broadcast system to which the present invention is applied.

FIG. 8 shows the embodiment of the satellite broadcast system in accordance with the present invention.

As shown in FIG. 8, the satellite broadcast system is composed of a group of artificial satellites 90 having subsystems suitable for the elliptical orbit of the present invention such as an attitude control system, an electric source system, a communication system, a heat control system and the like; a base station 91 for sending satellite broadcast through the group of artificial satellites 90; and a satellite broadcast terminal 92 for receiving the satellite broadcast through the group of satellites 90.

Figure 9:
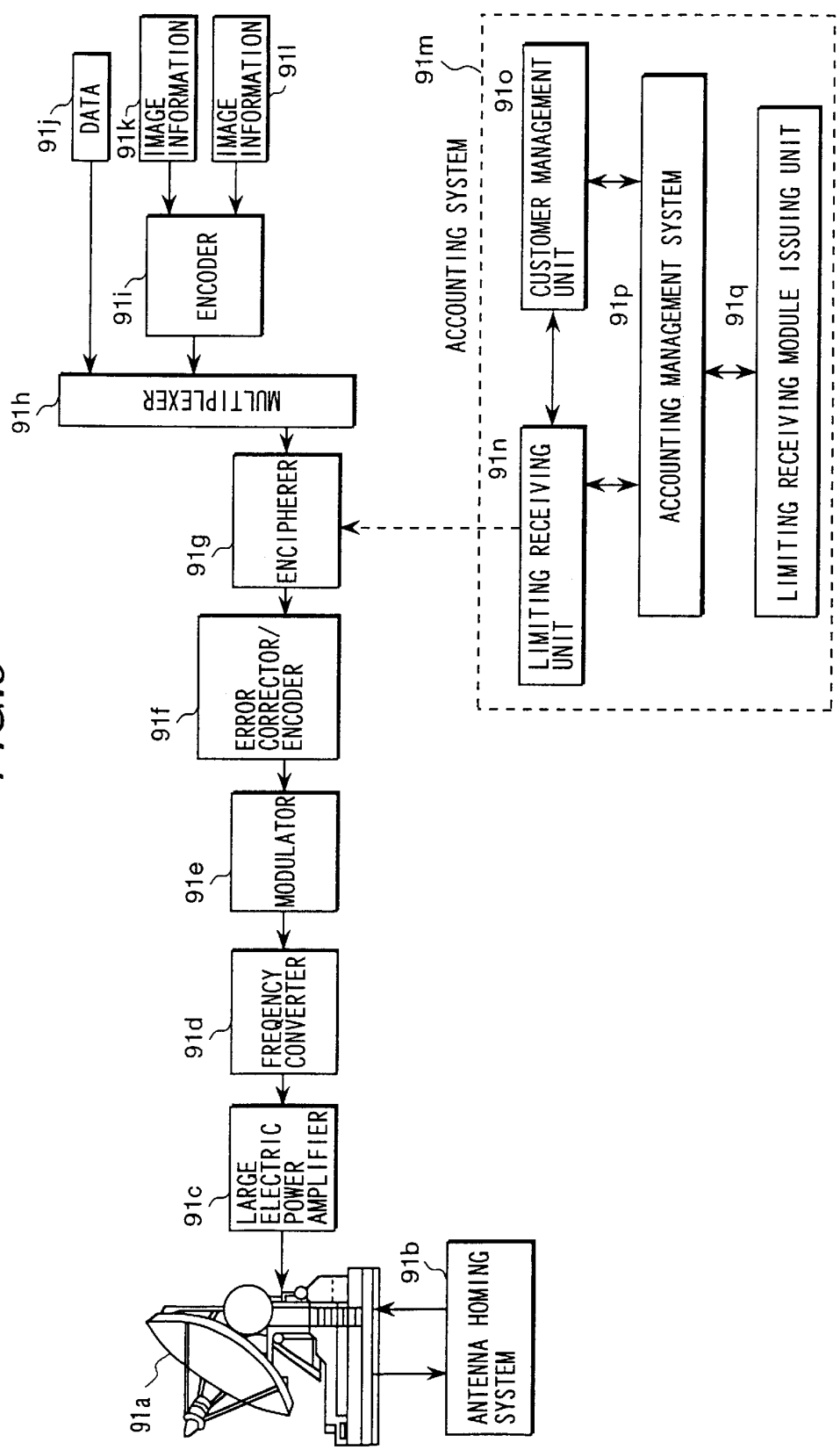
FIG. 9 is an explanatory diagram showing an example of a base station of a satellite broadcast system to which the present invention is applied.

As shown in FIG. 9, the base station 91 is composed of an antenna 91a, an antenna homing system 91b, a large electric power amplifier 91c, a frequency converter 91d, a modulator 91e, an error correction encoder 91f, an encipherer 91g, a multiplexer 91h, an encoder 91i.

Image information 91k and voice information 91l are highly efficiently encoded by the encoder 91i, and other image information and other voice information and data 91j are maltiplexed by the multiplexer 91h. Further, they are enciphered by the encipher 91g, added with error correction code by the error correction encoder 91f, further modulated by the modulator 91e so as to be suitable for wireless communication, converted into a carrier wave by the frequency converter 91d, amplified by the large electric power amplifier 91c, and then sent from the antenna 91a homing the group of artificial satellites 90 using the antenna homing system 91b.

Figure 10:
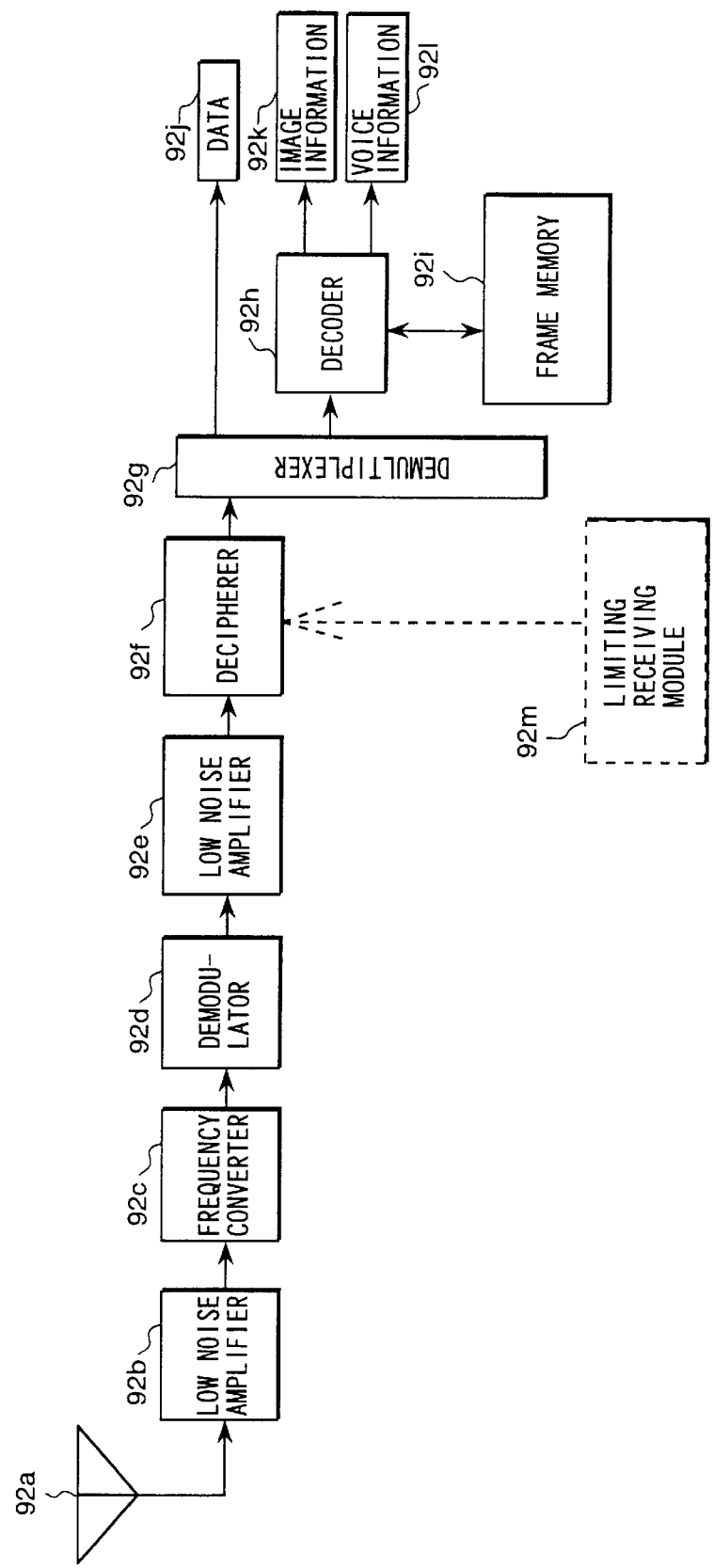
FIG. 10 is an explanatory diagram showing an example of a satellite broadcast terminal of a satellite broadcast system to which the present invention is applied.

On the other hand, as shown in FIG. 10, the satellite broadcast terminal 92 is composed of an antenna 92a, a low noise amplifier 92b, a frequency converter 92c, a demodulator 92d, an error corrector 92e, a decipherer 92f, a demultiplexer 92g, a decoder 92h, a frame memory 91i.

An electromagnetic wave sent from the group of artificial satellites 90 is received by the antenna 92a, amplified by the low noise amplifier 92b, converted to an intermediate frequency by the frequency converter 92c, and demodulated to a digital signal by the demodulator 92d. Further, the digital signal is corrected by the error corrector 92e if there is an error, the ciphered information is deciphered by the decipherer 92f, and a requested broadcast is selected by the demultiplexer 92g. Further, the signal is returned to image information 92k and voice information 92l by the decoder 92h. The decoder 92h has a frame memory 92i and can complement lack of data thereby.

According to the present invention, even when the satellite broadcast terminal 92 uses a directional antenna, there is an advantage in that it is sufficient to simply direct it to the zenith direction and it is completely unnecessary for a user to search a direction (north, south, east or west direction) of the group of satellites.

Further, in the case of broadcast from a stationary satellite, the satellite broadcast terminal antenna for a mobile object needs to be symmetric in direction and sensitive in 45-degree direction. However, in the case of the present invention, since it is sufficient that the antenna has a directionality only in the zenith direction, there is an advantage in that the antenna is easily manufactured and gain of the antenna can be increased twice or more. By making use of this advantage, the output power from the satellite may be reduced ½, or may be transmit twice as much as information (broadcast) if the output power is kept as it is.

Furthermore, since the group of artificial satellites 90 are always located in a high elevation angle, the electromagnetic wave from the group of artificial satellites 90 can be directly received regardless of an environmental condition of the mobile object such as a place opened only in the zenith direction in a street lined with large buildings. Therefore, it is possible to provide a high-quality receiving environment without reflected waves from the buildings, and accordingly there is an advantage in that it is possible to transmit more information (broadcast) than in a case of broadcast from a stationary satellite even if the same frequency band is used. The effects described above can be said to the systems to be described below.

Referring to FIG. 9 and FIG. 10, description will be made below on an example where an accounting system is added, and broadcast is provided to limited customers with fee.

As shown in FIG. 9, an accounting system 91m of the base station 91 is composed of a limiting receiving unit 91n, a customer management unit 91o, an accounting management system 91p and a limiting receiving module issuing unit 91q.

The satellite broadcast terminal 92 comprises a limiting receiving module 92m, as shown in FIG. 10.

Customer information (receiving status of viewing fee, viewing request information, address, name and so on) is managed by the customer management unit 91o, and the accounting management system 91p controls cipher for each customer by controlling the encipherer 91g through the limiting receiving unit 91n according to the customer information. Further, the accounting management system 91p issues a limiting receiving module (an IC card, as an example) using the limiting receiving module issuing unit 91q according to the customer information in the customer management system 91p. Although it is not described here, customer information on receipt of fee from a financial institution is input to the accounting management system 91p to update the customer information using the customer management unit 91o.

A user can view a requested broadcast by inserting the above-mentioned limiting receiving module 92m obtained as a consideration for the payment into the decipherer 92f of the satellite broadcast terminal 92.

Thereby, by using a means for enciphering a broadcast program in the base station 91 and by using a means for deciphering it in the satellite broadcast terminal 92, it is possible to broadcast only to the limited satellite broadcast terminal and to charge for the service.

Figure 11:
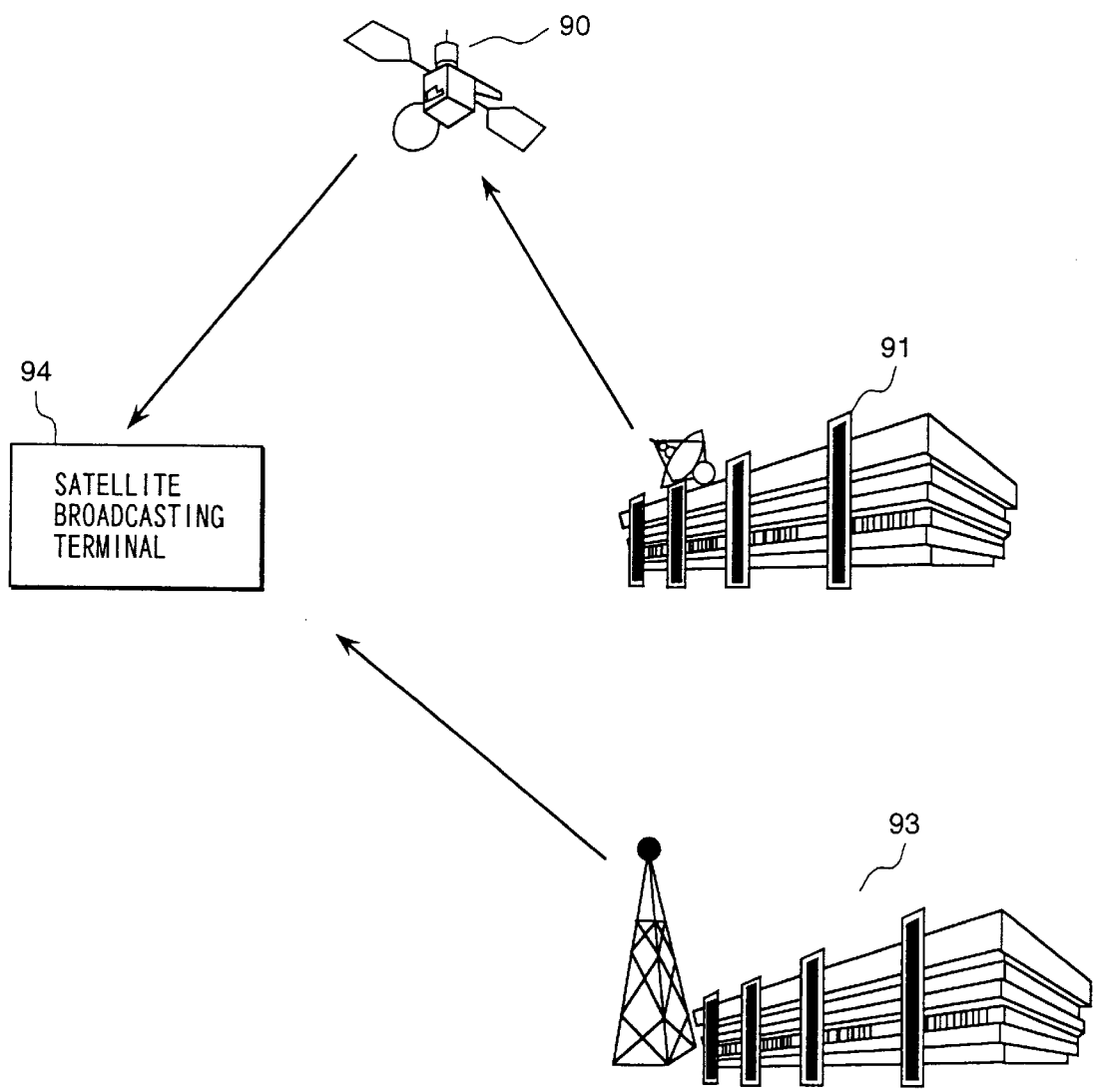
FIG. 11 is an explanatory view showing an example of a satellite broadcast system capable of also receiving ground broadcast to which the present invention is applied.

FIG. 11 shows another embodiment of satellite broadcast system.

As shown in FIG. 11, the satellite broadcast system is composed of a group of artificial satellites 90 having subsystems suitable for the elliptical orbit of the present invention such as an attitude control system, an electric source system, a communication system, a heat control system and the like; a base station 91 for sending satellite broadcast through the group of artificial satellites 90; a ground broadcast station 93; and a satellite broadcast terminal 94 having a means for receiving the satellite broadcast through the group of satellites 90 and a means for receiving ground broadcast.

Figure 12:
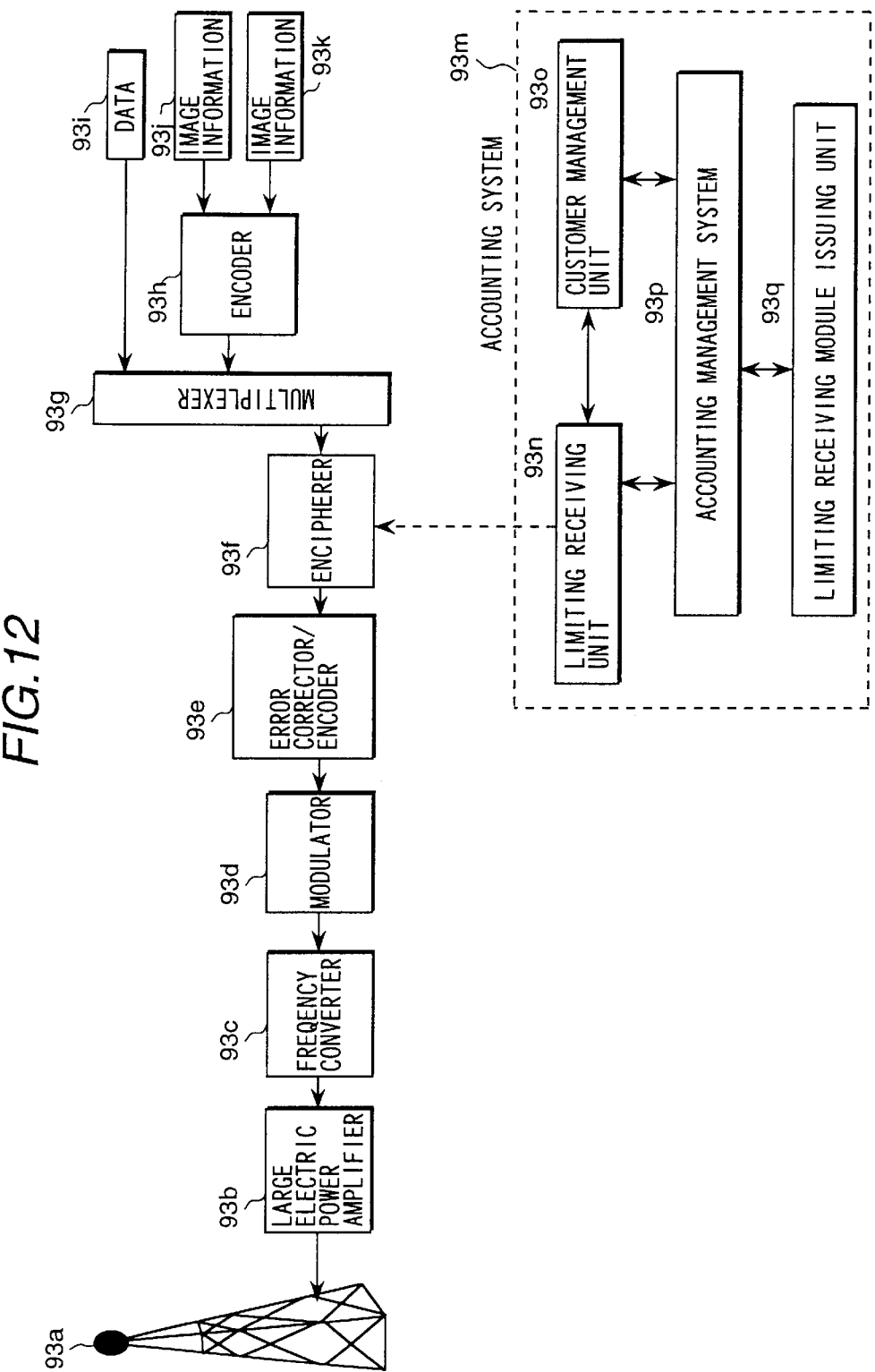
FIG. 12 is an explanatory diagram showing an example of a ground broadcast station of a satellite broadcast system to which the present invention is applied.

As shown in FIG. 12, the ground broadcast station 93 is composed of an antenna 93a, a large electric power amplifier 93b, a frequency converter 93c, a modulator 93d, an error correction encoder 93e, an encipherer 93f, a multiplexer 93g, an encoder 93h.

Image information 93j and voice information 93k are highly efficiently encoded by the encoder 93h, and other image information and other voice information and data 93i are maltiplexed by the multiplexer 93g. Further, they are enciphered by the encipher 93f, added with error correction code by the error correction encoder 93e, further modulated by the modulator 93d so as to be suitable for wireless communication, converted into a carrier wave by the frequency converter 93c, amplified by the large electric power amplifier 93b, and then sent from the antenna 93a.

Figure 13:
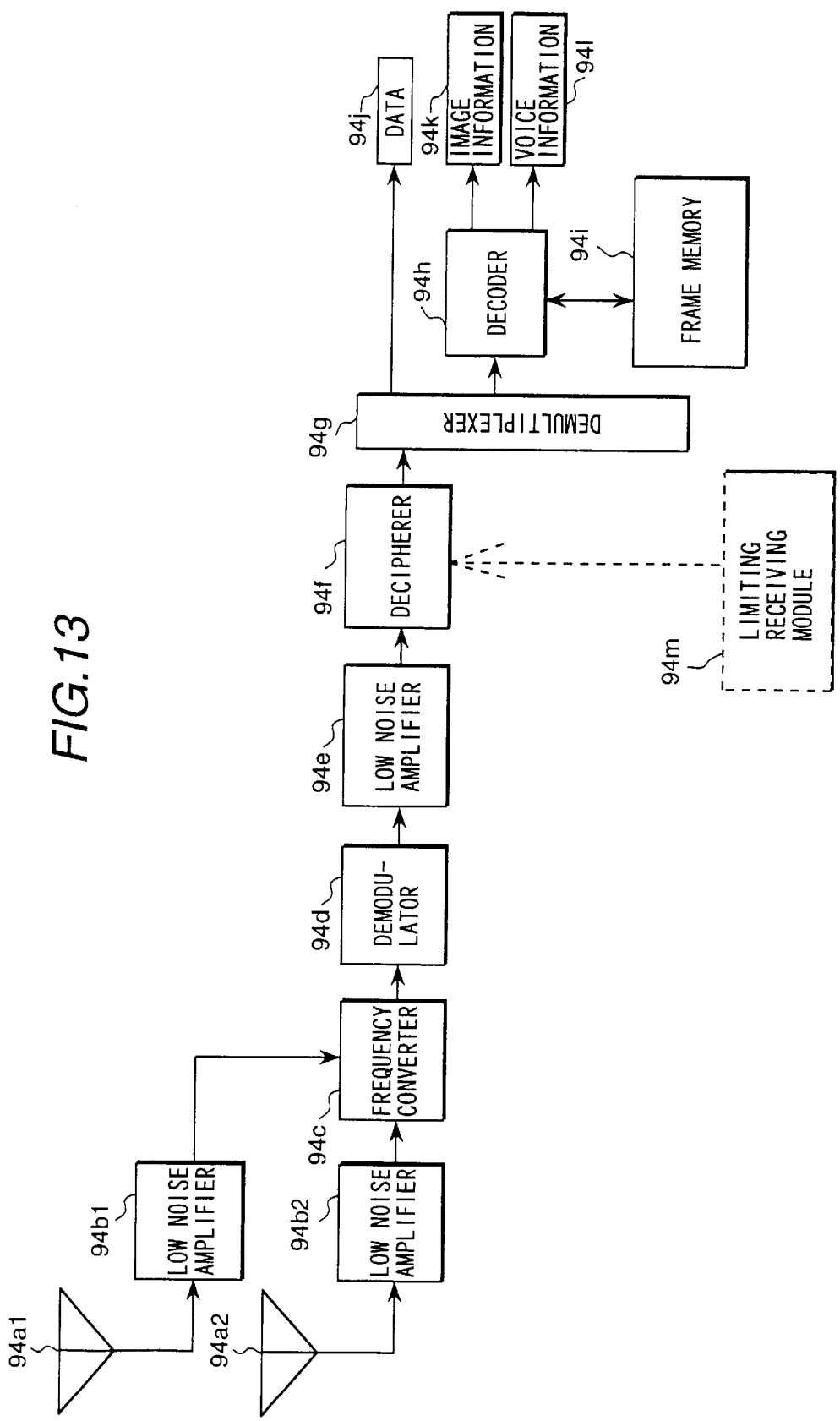
FIG. 13 is an explanatory diagram showing another example of a satellite broadcast terminal of a satellite broadcast system to which the present invention is applied.

On the other hand, as shown in FIG. 13, the satellite broadcast terminal 94 is composed of an antenna 94a1 for receiving ground broadcast and a low noise amplifier 94a2, an antenna 94b1 for receiving a electromagnetic wave from the group of artificial satellites 90 and a low noise amplifier 94b2, a frequency converter 94c for broadcast from the ground station and the satellite, a demodulator 94d, an error corrector 94e, a decipherer 94f, a demultiplexer 94g, a decoder 94h, a frame memory 94i.

An electromagnetic wave sent from the ground broadcast station 93 is received by the antenna 94a1, amplified by the low noise amplifier 94b1, and on the other hand, an electromagnetic wave sent from the group of artificial satellites 90 is received by the antenna 94a2, amplified by the low noise amplifier 94b2, and each of the signals are converted to an intermediate frequency by the frequency converter 94c, and demodulated to a digital signal by the demodulator 94d. Further, the digital signal is corrected by the error corrector 94e if there is an error, the ciphered information is deciphered by the decipherer 94f, and a requested broadcast is selected by the demultiplexer 94g. Further, the signal is returned to image information 94k and voice information 94l by the decoder 94h. The decoder 94h has a frame memory 94i and can complement lack of data thereby.

Since the satellite broadcast terminal 94 can receive the ground broadcast as well as the satellite broadcast, the satellite broadcast terminal 94 has an advantage in that a user can select a desired broadcast program at will. In addition, there is an advantage in that if the user has the satellite broadcast terminal 94, he needs not to possess both of a satellite broadcast terminal and a ground broadcast terminal. Further, an antenna may be used both as the antennas 94a1 and 94a2.

Referring to FIG. 12 and FIG. 13, description will be made below on an example where an accounting system is added, and broadcast is provided to limited customers with fee.

As shown in FIG. 12, an accounting system 93m of the base station 93 is composed of a limiting receiving unit 93n, a customer management unit 93o, an accounting management system 93p and a limiting receiving module issuing unit 93q.

The satellite broadcast terminal 94 comprises a limiting receiving module 92m, as shown in FIG. 13.

Customer information (receiving status of viewing fee, viewing request information, address, name and so on) is managed by the customer management unit 93o, and the accounting management system 93p controls cipher for each customer by controlling the encipherer 93f through the limiting receiving unit 93n according to the customer information. Further, the accounting management system 93p issues a limiting receiving module (an IC card, as an example) using the limiting receiving module issuing unit 93q according to the customer information in the customer management system 93o. Although it is not described here, customer information on receipt of fee from a financial institution is input to the accounting management system 93p to update the customer information using the customer management unit 93o.

A user can view a requested broadcast by inserting the above-mentioned limiting receiving module 94m obtained as a consideration for the payment into the decipherer 94f of the satellite broadcast terminal 94.

Thereby, by using a means for enciphering a broadcast program in the base station 93 and by using a means for deciphering it in the satellite broadcast terminal 94, it is possible to broadcast only to the limited satellite broadcast terminal and to charge for the service.

Figure 14:
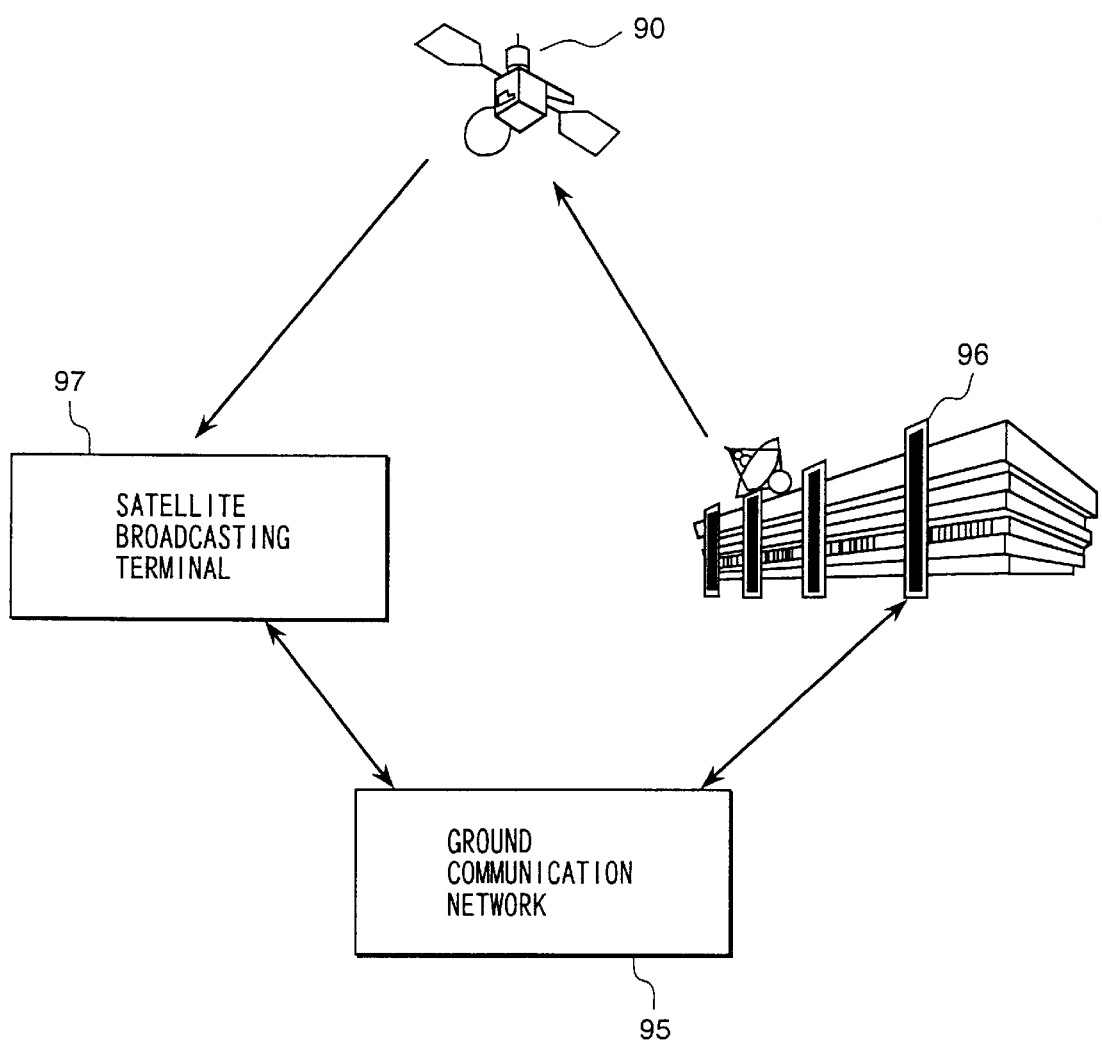
FIG. 14 is an explanatory view showing another example of a satellite broadcast system to which the present invention is applied.

FIG. 14 shows another embodiment of satellite broadcast system.

As shown in FIG. 14, the satellite broadcast system is composed of a group of artificial satellites 90 having subsystems suitable for the elliptical orbit of the present invention such as an attitude control system, an electric source system, a communication system, a heat control system and the like; a ground communication means 95 such as a public network, a cellular phone and the like; a base station 96 having a means for sending satellite broadcast through the group of artificial satellites 90 and the above-described ground communication means; and a satellite broadcast terminal 97 having a means for receiving the satellite broadcast through the group of satellites 90 and the above-described ground communication means.

Figure 15:
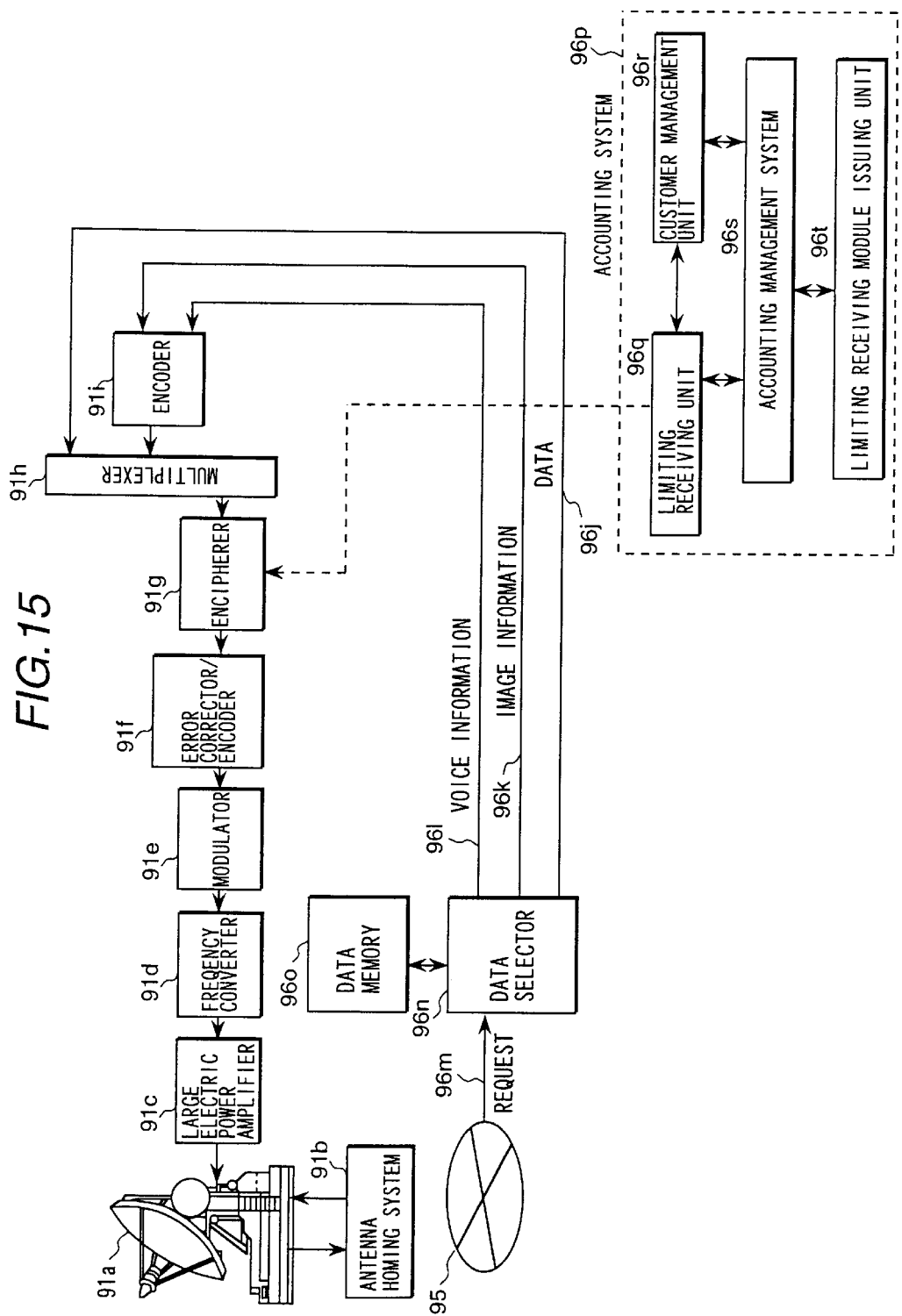
FIG. 15 is an explanatory diagram showing another example of a base station of a satellite broadcast system to which the present invention is applied.

As shown in FIG. 15, the base station 96 is composed of an antenna 96a, an antenna homing system 96b, a large electric power amplifier 96c, a frequency converter 96d, a modulator 96e, an error correction encoder 96f, an encipherer 96g, a multiplexer 96h, an encoder 96i, a data selector 96n, a data memory 96o and a ground communication network 95.

Request information 96m through the ground communication network 95 is input to the data selector 96n, and image information 96k and voice information 96l and data 96j are cited from the data memory 96o, if necessary. Further, the image information 96k and the voice information 96i are highly efficiently encoded, other image information and other voice information and data 96j are maltiplexed by the multiplexer 96h. Further, they are enciphered by the encipher 96g, added with error correction code by the error correction encoder 96f, further modulated by the modulator 96e so as to be suitable for wireless communication, converted into a carrier wave by the frequency converter 96d, amplified by the large electric power amplifier 96c, and then sent from the antenna 96a homing the group of artificial satellites 90 using the antenna homing system 96b.

Figure 16:
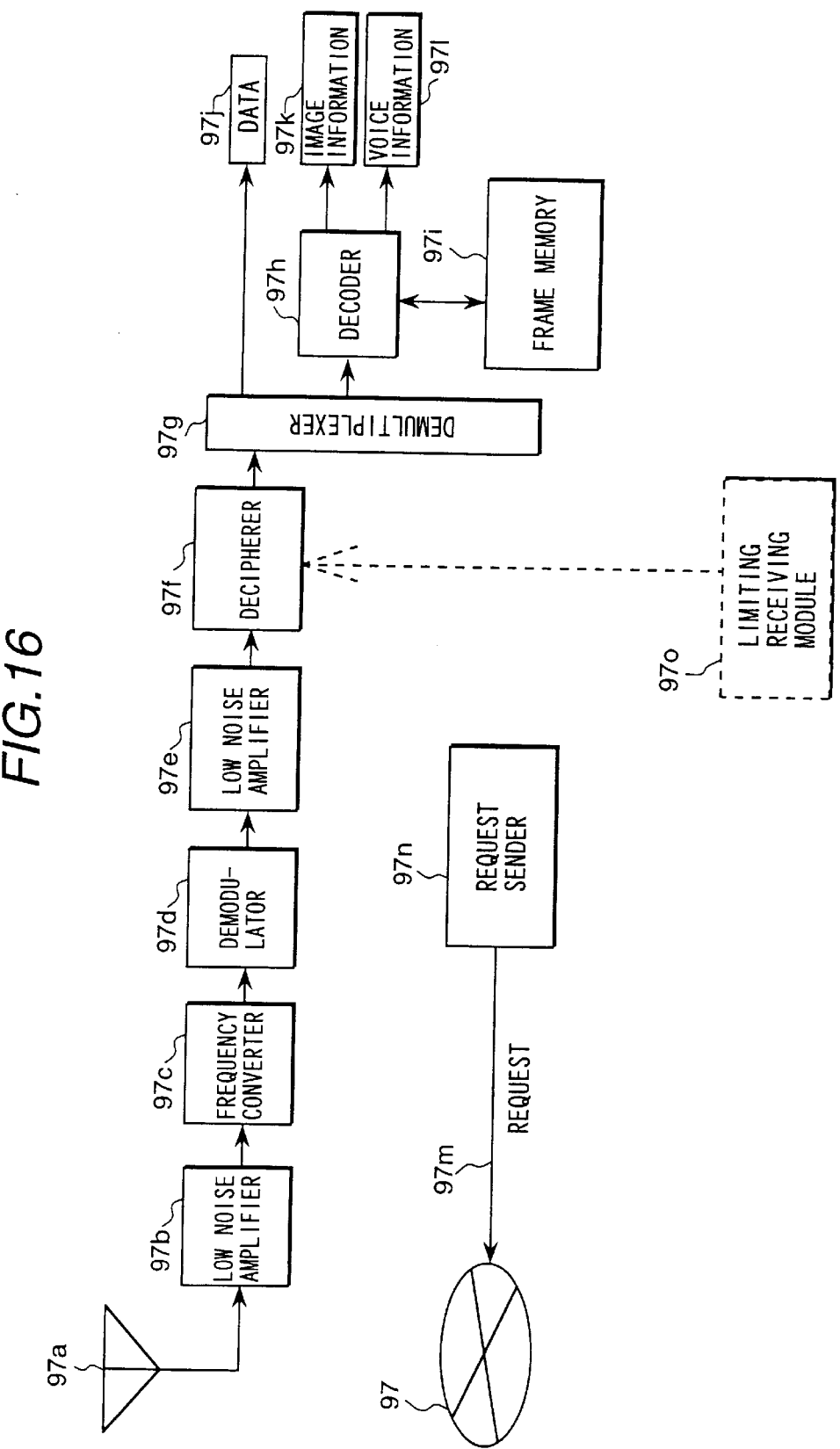
FIG. 16 is an explanatory diagram showing another example of a satellite broadcast terminal of a satellite broadcast system to which the present invention is applied.

On the other hand, as shown in FIG. 16, the satellite broadcast terminal 92 is composed of an antenna 97a, a low noise amplifier 97b, a frequency converter 97c, a demodulator 97d, an error corrector 97e, a decipherer 97f, a demultiplexer 97g, a decoder 97h, a frame memory 97i, a request sender 97n and the ground communication network 95.

A request 97m is sent to the base station 96 of FIG. 15 by the request sender 97n such as a PHS, a cellular phone or the like through the ground communication network 95. The base station 96 sends the requested information to the group of artificial satellites 90, and an electromagnetic wave sent from the group of artificial satellites 90 is received by the antenna 97a, amplified by the low noise amplifier 97b, converted to an intermediate frequency by the frequency converter 97c, and demodulated to a digital signal by the demodulator 97d. Further, the digital signal is corrected by the error corrector 97e if there is an error, the ciphered information is deciphered by the decipherer 97f, and a requested broadcast is selected by the demultiplexer 97g. Further, the signal is returned to image information 97k and voice information 97l by the decoder 97h. The decoder 97h has a frame memory 97i and can complement lack of data thereby.

Thereby, the satellite broadcast terminal 97 has an advantage in that an user can send a request to the base station 91 to broadcast desired information.

The satellite broadcast terminals 92, 94, 97 in the present invention may be mounted on a mobile objects such as a car, a train, a ship, an aircraft or the like, and further may be carried by a walker, a climber and so on. Furthermore, the satellite broadcast terminals may be used at a place not movable such as a home.

The contents of program to be broadcast are not limited in the present invention.

The programs to be broadcast are not only TV broadcast and voice broadcast, but also digital information.

There are various kinds of programs to be broadcast such as weather information, fishing information (water level, water temperature and so on), ITS information (traffic amount information, traffic speed information, traffic congestion place information, traffic congesting time information, driving environment information, stricken area information, traffic restriction information, optimum route information, information on required time in congesting time, parking lot status information, parking lot reservation information, destination information (weather, travel, sightseeing, meals, recreation information), various kinds of reservation information (public transportation, hotels, amusement facilities)), map information (map information, updated information and so on), car navigation information (car navigation information, updated information and so on), software program information (programs for car navigation, programs for game, OS and so on), voice data (including compressed data by MP3 or the like), and amusement information.

Further, as the programs to be broadcast, there are multimedia information such as the Internet and the like, and differential GPS information.

Further, as the programs to be broadcast, there is information limited to an area or on an area where a mobile object is moving such as time service information of a department store or a supermarket, exhibition information of an art gallery and a museum, information on presentation contents of a movie house or a show house, information on a criminal or a lingering person.

Referring to FIG. 15 and FIG. 16, description will be made below on an example where an accounting system is added, and broadcast is provided to limited customers with fee.

As shown in FIG. 15, an accounting system 96p of the base station 96 is composed of a limiting receiving unit 96q, a customer management unit 96r, an accounting management system 96s and a limiting receiving module issuing unit 96t.

The satellite broadcast terminal 97 comprises a limiting receiving module 97o, as shown in FIG. 16.

Customer information (receiving status of viewing fee, viewing request information, address, name and so on) is managed by the customer management unit 96r, and the accounting management system 96s controls cipher for each customer by controlling the encipherer 96g through the limiting receiving unit 96q according to the customer information. Further, the accounting management system 96s issues a limiting receiving module (an IC card, as an example) using the limiting receiving module issuing unit 96t according to the customer information in the customer management system 96r. Although it is not described here, customer information on receipt of fee from a financial institution is input to the accounting management system 96s to update the customer information using the customer management unit 96r.

A user can view a requested broadcast by inserting the above-mentioned limiting receiving module 97o obtained as a consideration for the payment into the decipherer 97f of the satellite broadcast terminal 97.

Thereby, by using a means for enciphering a broadcast program in the base station 96 and by using a means for deciphering it in the satellite broadcast terminal 97, it is possible to broadcast only to the limited satellite broadcast terminal and to charge for the service.

(4-2) System Example 2

An example of system 2 is a satellite broadcast system.

Figure 17:
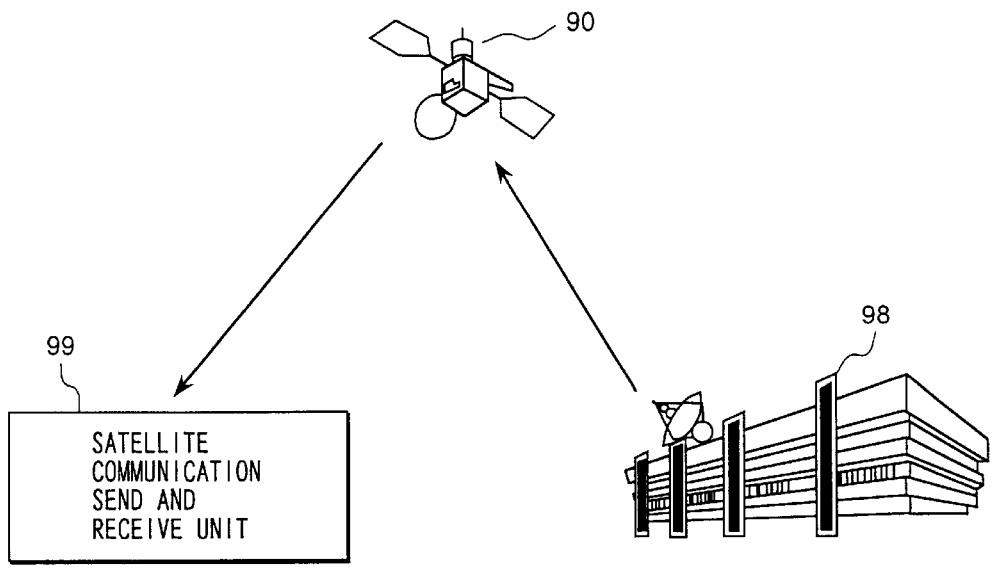
FIG. 17 is an explanatory view showing an example of a satellite communication system to which the present invention is applied.

FIG. 17 shows the embodiment of the satellite communication system in accordance with the present invention.

As shown in FIG. 17, the satellite communication system is composed of a group of artificial satellites 90 having subsystems suitable for the elliptical orbit of the present invention such as an attitude control system, an electric source system, a communication system, a heat control system and the like; a base station 98 and a satellite communication send and receive unit 99 for performing satellite communication through the group of artificial satellites 90.

Figure 18:
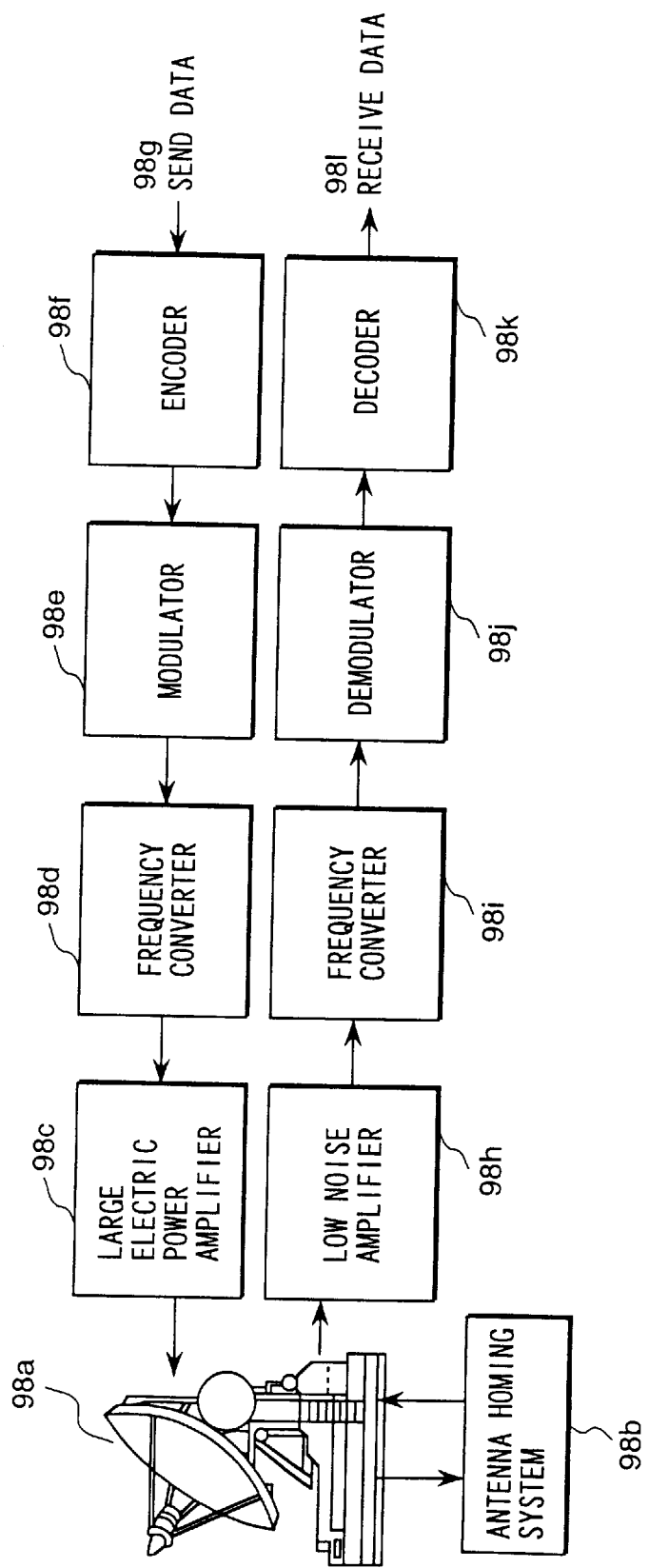
FIG. 18 is an explanatory diagram showing an example of a satellite communication system to which the present invention is applied.

As shown in FIG. 18, the base station 98 is composed of an antenna 98a, an antenna homing system 98b, a large electric power amplifier 98c, a frequency converter 98d, a modulator 98e, an encoder 98f, a low nose amplifier 98h, a frequency converter 98i, a demodulator 98j, and a decoder 98k.

Sent data 98g is encoded and enciphered and added with error correction code by the encoder 98f, and further modulated by the modulator 98e so as to be suitable for wireless communication, converted into a carrier wave by the frequency converter 98d, amplified by the large electric power amplifier 98c, and then sent from the antenna 98a homing the group of artificial satellites 90 using the antenna homing system 98b. On the other hand, an electromagnetic wave sent from the group of artificial satellites 90 is received by the antenna 98a, amplified by the low noise amplifier 98h, converted to an intermediate frequency by the frequency converter 98h, and decoded to a digital signal by the demodulator 98j. Further, by being error-corrected and deciphered and decoded by the decoder 98k, received data 98l can be obtained.

On the other hand, as shown in FIG. 19, the satellite communication send and receive unit 99 is composed of an antenna 99a, a large electric power amplifier 99b, a frequency converter 99c, a modulator 99d, an encoder 99e, a low noise amplifier 99g, a frequency converter 99h, a demodulator 99i, and a decoder 99j.

Sent data 99f is encoded and enciphered and added with error correction code by the encoder 99e, and further modulated by the modulator 99d so as to be suitable for wireless communication, converted into a carrier wave by the frequency converter 99c, amplified by the large electric power amplifier 99b, and then sent from the antenna 99a. On the other hand, an electromagnetic wave sent from the group of artificial satellites 90 is received by the antenna 99a, amplified by the low noise amplifier 99g, converted to an intermediate frequency by the frequency converter 99h, and decoded to a digital signal by the demodulator 99i. Further, by being error-corrected and deciphered and decoded by the decoder 99j, received data 99k can be obtained.

According to the present embodiment, since at least one artificial satellite of the group of artificial satellites is visible in a position near the zenith, the communication line can be easily maintained for a long time by using the satellite communication system even in an area where there are shielding objects shielding the field of view such as artificial buildings, trees, mountains and so on.

For example, by installing the base station 98 at a gateway communication station of public lines and by making the satellite communication send and receive unit 99 carried with a person, the satellite communication system can be used as a cellular phone.

For example, by installing the base station 98 at a hospital and by installing the satellite communication send and receive unit 99 in an ambulance, a patient taken to the hospital in the ambulance can be appropriately treated since appropriate first aid can be transmitted from a medical specialist in the hospital by sending image data with regard to the patient from the ambulance to the hospital. Thereby, it becomes possible to save life in such a case where if a patient have been treated with appropriate first aid, his live might have been saved.

For example, by installing the base station 98 at a broadcast station and by installing the satellite communication send and receive unit 99 in a broadcast car, the satellite communication system can be used for a TV program of mobile sport relay broadcasting such as a marathon race relay broadcasting or the like, and accordingly a high quality image can be transmitted in real time and a dynamic program can be provided.

For example, by installing the base station 98 at a fire station and by installing the satellite communication send and receive unit 99 in a fire engine, since a high quality image of a situation of a site under fire-fighting can be transmitted to the fire station from a place between tall buildings or in a narrow path in teal time, appropriate judgment can be made.

For example, by installing the base station 98 at a police station and by installing the satellite communication send and receive unit 99 in a squad car, since a high quality image of a criminal or a situation of a site under fire-fighting can be transmitted to the fire station from a place between tall buildings or in a narrow path in teal time, effective guard can be performed.

For example, by installing the base station 98 at a hospital having a medical specialist and by installing the satellite communication send and receive unit 99 in a mobile object and moving the mobile object to a clinic requiring an advice or diagnosis of the medical specialist in a distant place to communicate information on a patient, regional difference in medical service can be solved by transmitting information in real time even in a mountainous region.

For example, by installing the base station 98 at a stock center and by installing the satellite communication send and receive unit 99 in a vending machine, customer service can be improved since the inventory can be periodically or arbitrarily checked.

Further the satellite communication system can be applied to train control information communication, train maintenance communication, train signal control communication, vehicle operating status communication, ship information operating status communication, data acquisition system (float, buoy or the like), personal computer communication (electronic mail, Internet, on-line shopping and so on), parking lot vacant information supply/reservation system and so on.

Figure 20:
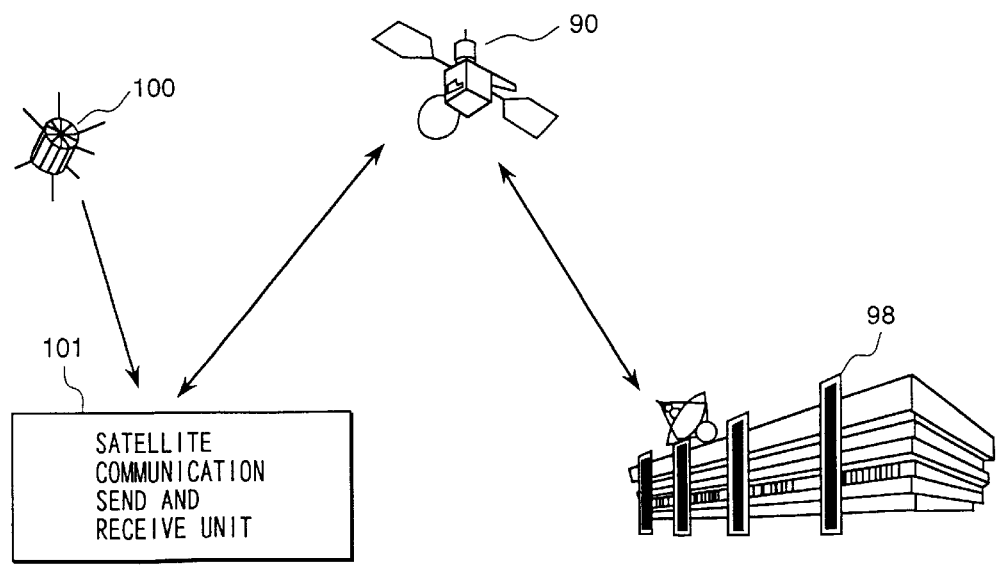
FIG. 20 is an explanatory view showing an example of a satellite communication system to which the present invention is applied.

FIG. 20 shows another embodiment of the satellite communication system in accordance with the present invention.

As shown in FIG. 20, the satellite communication system is composed of a group of artificial satellites 90 in accordance with the present invention; a base station 98 for performing satellite communication through the group of artificial satellites 90; a group of artificial satellites 100 composing a global position measuring system; and a satellite communication send and receive unit 101 having a function capable of measuring its own position using a positioning signal from the group of artificial satellites composing the global positioning system and a function capable of performing communication through the group of artificial satellites 90.

Figure 21:
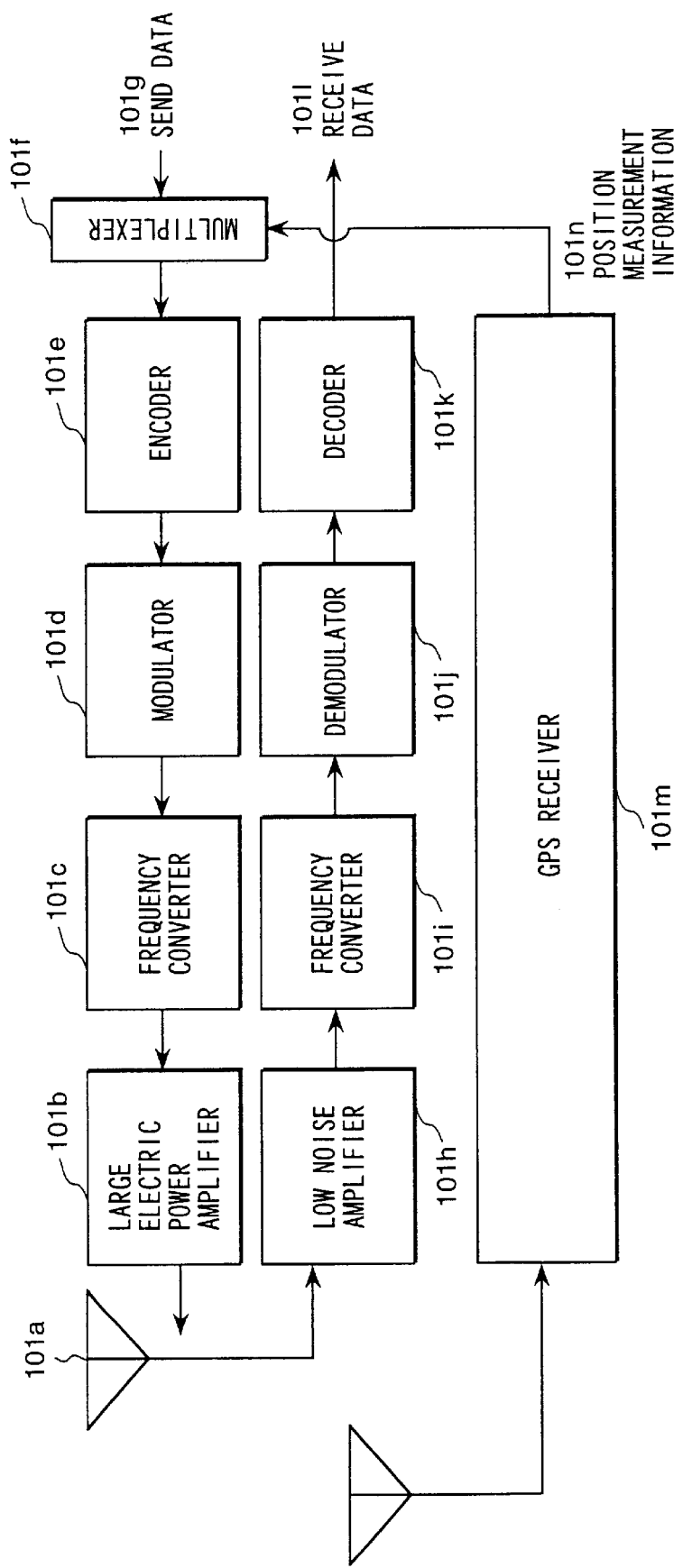
FIG. 21 is an explanatory diagram showing an example of a satellite communication system to which the present invention is applied.

As shown in FIG. 21, the satellite communication send and receive unit 101 is composed of an antenna 101a, a large electric power amplifier 101b, a frequency converter 101c, a modulator 101d, an encoder 101e, a multiplexer 101f, a low noise amplifier 101h, a frequency converter 101i, a demodulator 101k, and a GPS receiver 101m.

Sent data 101g is multiplexed with positioning information 101n output from the GPS receiver 101m by the multiplexer 101f, encoded and enciphered and added with error correction code by the encoder 101e, and further modulated by the modulator 101d so as to be suitable for wireless communication, converted into a carrier wave by the frequency converter 101c, amplified by the large electric power amplifier 101b, and then sent from the antenna 101a. On the other hand, an electromagnetic wave sent from the group of artificial satellites 90 is received by the antenna 101a, amplified by the low noise amplifier 101h, converted to an intermediate frequency by the frequency converter 101i, and decoded to a digital signal by the demodulator 101j. Further, by being error-corrected and deciphered and decoded by the decoder 101k, received data 101l can be obtained.

In this system, position information of the send and receive unit can be sent to the base station.

Further, with regard to timing to send positioning information, there are a demand method (sending is made at the time when a user requests) and a polling method (by receiving sending request of the center station, the send and receive unit automatically sends the information).

For example, by installing the base station 98 at a mountain search and rescue center such as a police station or a fire station and by making the satellite communication send and receive unit 101 carried with a mountaineer, rescue activity can be speedily and accurately performed if the mountaineer meets with a disaster because the center can be informed of a position of the mountaineer. Further, because of capability of bi-directional communication, the present invention has an advantage in that words of encouragement to the mountaineer met with a disaster and confirmation whether or not information is erroneous can be performed. Furthermore, the satellite communication send and receive unit may have only a send function in order to make light in weight and small in consuming electric power.

For example, by installing the base station 98 at a search and rescue center for the perils of the sea such as a police station or a fire station and by installing the satellite communication send and receive unit 101 in a ship, it is possible to perform an error check, to speedily and accurately perform rescue activity because the center and the Maritime Safety Agency can be informed of a position of the wrecked ship if the ship meets with a shipwreck. Further, because of capability of bi-directional communication, the present invention has an advantage in that words of encouragement to the sailors met with the shipwreck and confirmation whether or not the information is erroneous can be performed. Furthermore, the satellite communication send and receive unit may have only a send function in order to make light in weight and small in consuming electric power.

For example, by installing the base station 98 at a police station and by making the satellite communication send and receive unit 101 carried with a person, rescue activity can be speedily and accurately performed if the person lingers around or loses his way because a position of the person can be detected by the police station. Further, because of capability of bi-directional communication, the present invention has an advantage in that words of encouragement to the mountaineer met with a disaster and confirmation whether or not information is erroneous can be performed. Furthermore, the satellite communication send and receive unit may have only a send function in order to make light in weight and small in consuming electric power.

For example, by installing the base station 98 at a police station and by installing the satellite communication send and receive unit 101 in a vehicle, search activity can be speedily and accurately performed if the vehicle is stolen because a position of the stolen vehicle can be detected by the police station.

For example, by installing the base station 98 at a physical distribution center and by installing the satellite communication send and receive unit 101 in a mobile object (a track, a train, a taxicab, a bus, a container), physical distribution management and mobile object arranging management can be speedily and accurately performed because a position of the mobile object can be instantaneously detected by the center.

Further, the satellite communication system can be applied to an optimum path guiding system, a request type navigation system, an animal behavior monitor (wild animal (behavior monitor), cattle (stray prevention, exercise amount detection), animals fed in a zoo (danger prevention) and so on).

Figure 22:
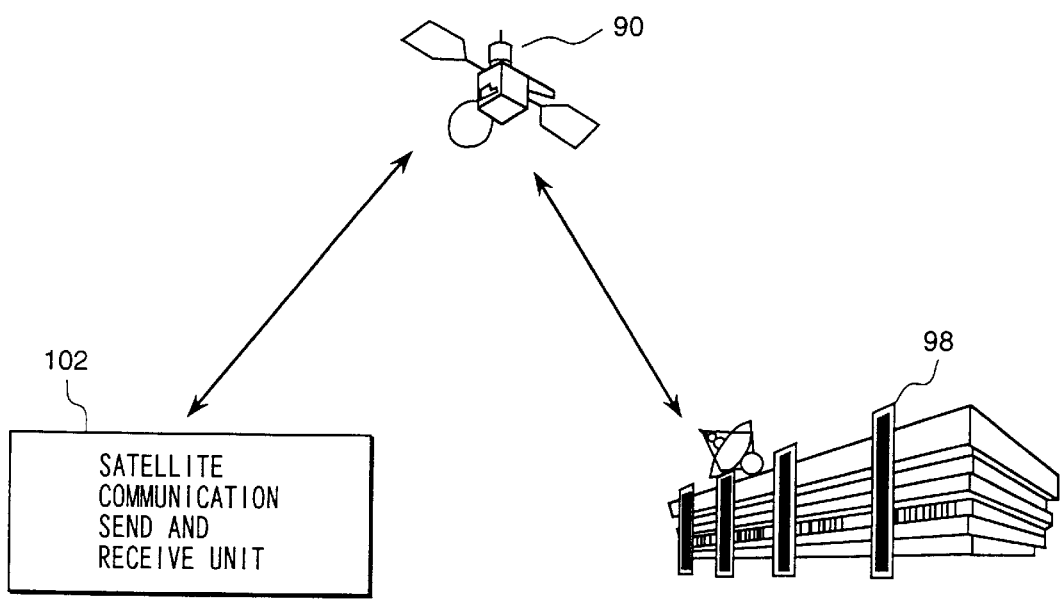
FIG. 22 is an explanatory view showing an example of a satellite communication system to which the present invention is applied.

FIG. 22 shows another embodiment of the satellite communication system in accordance with the present invention.

As shown in FIG. 22, the satellite communication system is composed of a group of artificial satellites 90 having subsystems suitable for the elliptical orbit of the present invention such as an attitude control system, an electric source system, a communication system, a heat control system and the like; a base station 98 for performing satellite communication through the group of artificial satellites 90; and a satellite communication send and receive unit 102 having a function to measure a consumed amount of at least one of electricity, city gas and city water and a function capable of communication through the group of satellites 90.

Figure 23:
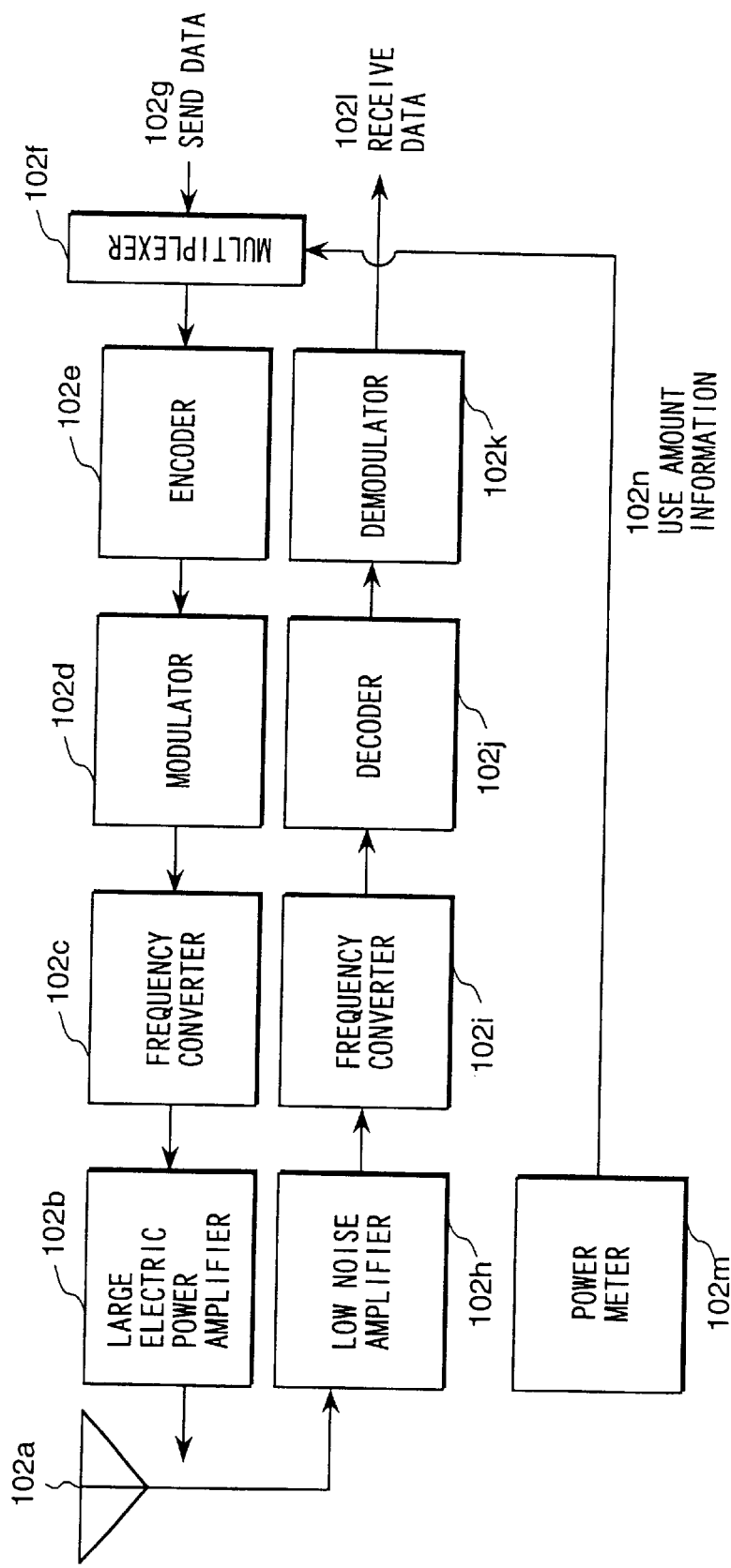
FIG. 23 is an explanatory diagram showing an example of a satellite communication system to which the present invention is applied.

In the case of measuring electricity consumed amount, the satellite communication send and receive unit 102 is composed of an antenna 102a, a large electric power amplifier 102b, a frequency converter 102c, a modulator 102d, an encoder 102e, a multiplexer 102f, a low noise amplifier 102h, a frequency converter 102i, a demodulator 102j, a decoder 102k, and an electric power meter 102m, as shown in FIG. 23.

Sent data 102g is multiplexed with consumed amount information 102n output from the electric power meter 102m by the multiplexer 102f, encoded and enciphered and added with error correction code by the encoder 102e, and further modulated by the modulator 102d so as to be suitable for wireless communication, converted into a carrier wave by the frequency converter 102c, amplified by the large electric power amplifier 102b, and then sent from the antenna 102a. On the other hand, an electromagnetic wave sent from the group of artificial satellites 90 is received by the antenna 102a, amplified by the low noise amplifier 102h, converted to an intermediate frequency by the frequency converter 102i, and decoded to a digital signal by the demodulator 102j. Further, by being error-corrected and deciphered and decoded by the decoder 102k, received data 102l can be obtained.

In this system, the amounts of consumed electricity measured by the satellite communication send and receive unit 102 can be totaled at the base station 98. Further, charges for public service such as electricity, city gas and city water have been totaled by visiting from house to house. However, by using the satellite traveling on the orbit in accordance with the present invention, the charges for public service can be totaled through the satellite because the satellite communication line can be easily ensured only by setting the satellite communication send and receive unit 102 even at a house surrounded by tall buildings or at a place in a mountainous region without communication means. Therefore, personnel expenses required for totaling the consumed amounts can be substantially reduced. By the effect of reducing the personnel expenses, it can be expected that the charges for public service are further reduced.

Figure 24:
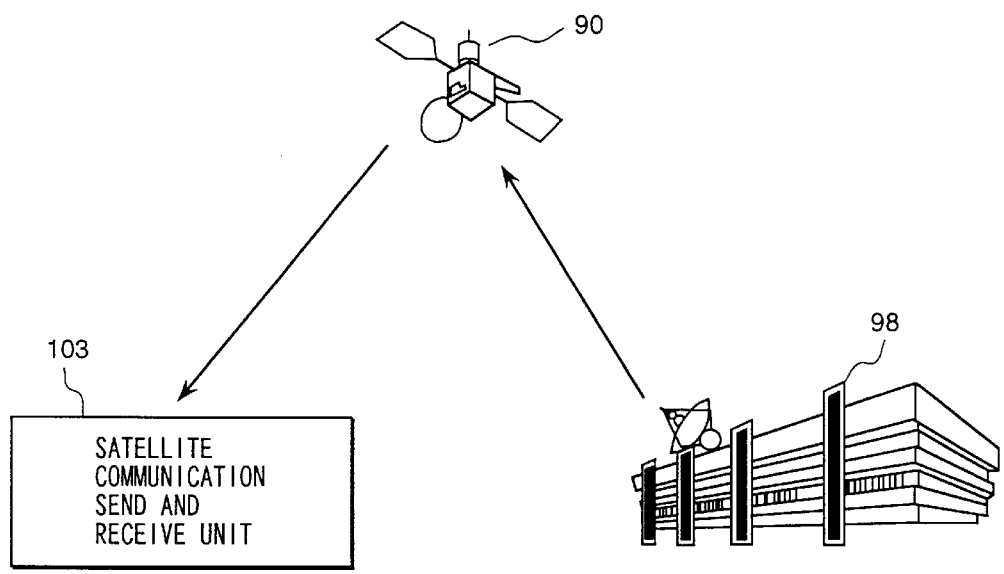
FIG. 24 is an explanatory view showing an example of a satellite communication system to which the present invention is applied.

FIG. 24 shows another embodiment of the satellite communication system.

As shown in FIG. 24, the satellite communication system is composed of a group of artificial satellites 90 having subsystems suitable for the elliptical orbit of the present invention such as an attitude control system, an electric source system, a communication system, a heat control system and the like; a base station 98 for performing satellite communication through the group of artificial satellites 90; and a satellite communication send and receive unit 103 having a function for collecting and relaying information if an information network and capable of performing communication through the group of artificial satellites 90.

Figure 25:
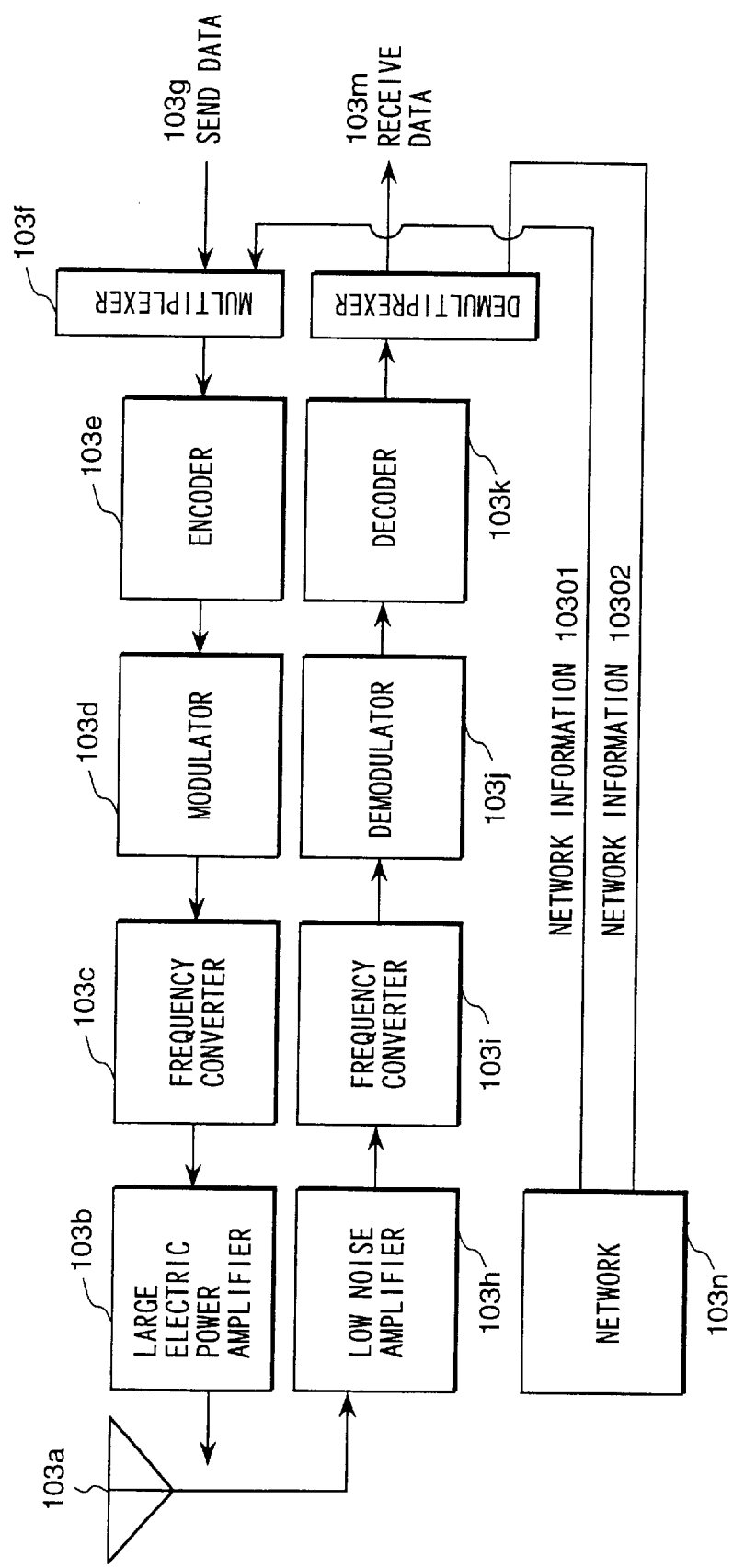
FIG. 25 is an explanatory diagram showing an example of a satellite communication system to which the present invention is applied.

As shown in FIG. 25, the satellite communication send and receive unit 103 is composed of an antenna 103a, a large electric power amplifier 103b, a frequency converter 103c, a modulator 103d, an encoder 103e, a multiplexer 103f, a low noise amplifier 103h, a frequency converter 103i, a demodulator 103j, a decoder 103k, a demultiplexer 103l and a network 103n.

Sent data 103g is multiplexed with consumed network information 103o1 output from the network 103n by the multiplexer 103f, encoded and enciphered and added with error correction code by the encoder 103e, and further modulated by the modulator 103d so as to be suitable for wireless communication, converted into a carrier wave by the frequency converter 103c, amplified by the large electric power amplifier 103b, and then sent from the antenna 103a. On the other hand, an electromagnetic wave sent from the group of artificial satellites 90 is received by the antenna 103a, amplified by the low noise amplifier 103h, converted to an intermediate frequency by the frequency converter 103i, and decoded to a digital signal by the demodulator 103j. Further, by being error-corrected and deciphered and decoded by the decoder 103k, received data 103m and network information 103o2 to be input to the network can be obtained.

In this system, network information, for example, in an office or in a home (security, utility status/use value and control of utility) can be communicated between the satellite communication send and receive unit 103 and the base station 98. Further, by using the satellite traveling on the orbit in accordance with the present invention, the satellite communication line can be easily ensured by an antenna unit installed in a house surrounded with tall buildings. Furthermore, in a case of security information, there is an advantage in that even if a telephone wire is cut, communicating (reporting) means can be independently ensured through the satellite.

Figure 26:
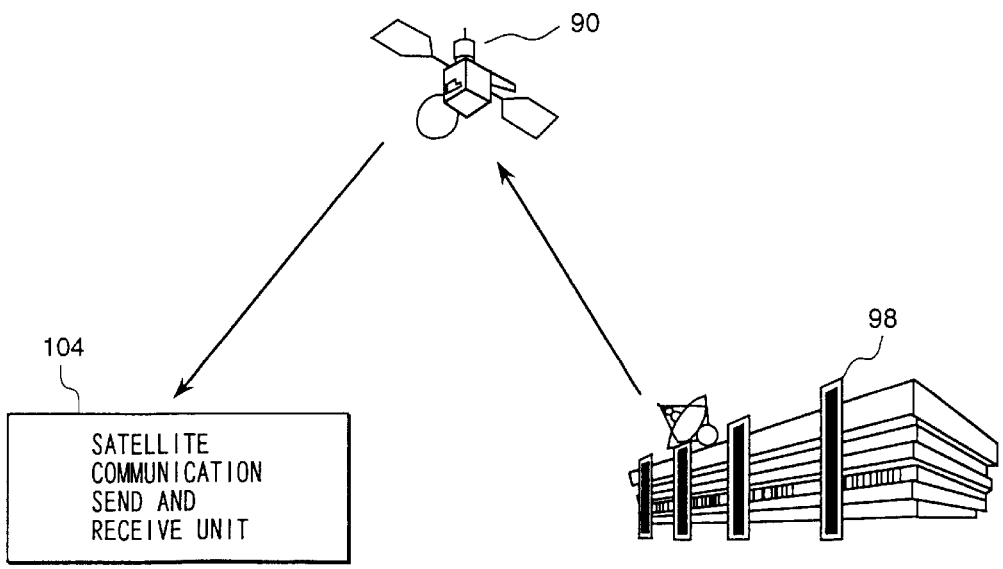
FIG. 26 is an explanatory view showing an example of a satellite communication system to which the present invention is applied.

FIG. 26 shows another embodiment of the satellite communication system.

As shown in FIG. 26, the satellite communication system is composed of a group of artificial satellites 90 having subsystems suitable for the elliptical orbit of the present invention such as an attitude control system, an electric source system, a communication system, a heat control system and the like; a base station 98 for performing satellite communication through the group of artificial satellites 90; and a satellite communication send and receive unit 104 having a function for monitoring an environment and capable of performing communication through the group of artificial satellites 90.

Figure 27:
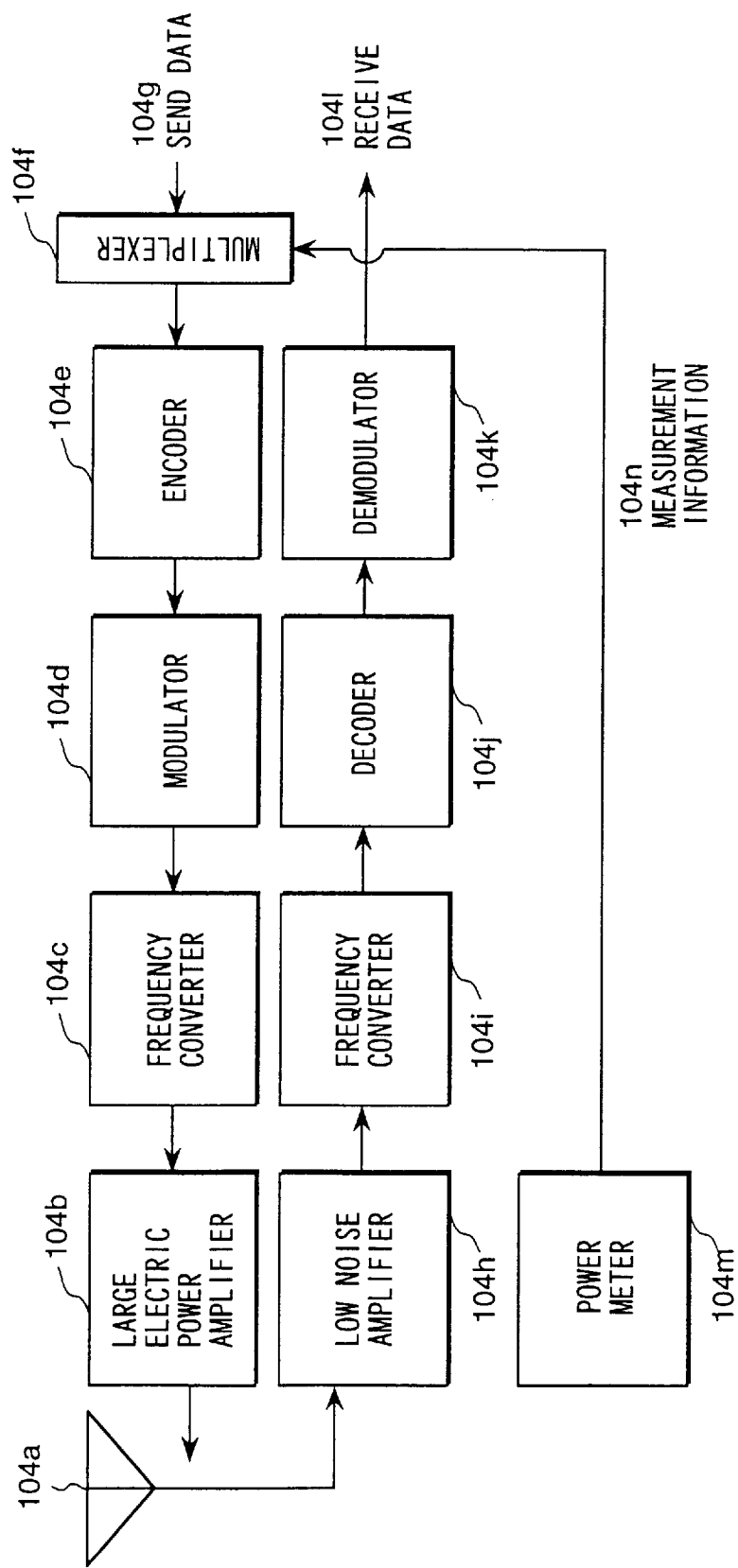
FIG. 27 is an explanatory diagram showing an example of a satellite communication system to which the present invention is applied.

As shown in FIG. 27, the satellite communication send and receive unit 104 is composed of an antenna 104*a*, a large electric power amplifier 104*b*, a frequency converter 104*c*, a modulator 104*d*, an encoder 104*e*, a multiplexer 104*f*, a low noise amplifier 104*h*, a frequency converter 104*i*, a demodulator 104*j*, a decoder 104*k* and a detector 104*m*. Sent data 104*g* is multiplexed with measured information 104*n* output from the detector 104*m* by the multiplexer 104*f*, encoded and enciphered and added with error correction code by the encoder 104*e*, and further modulated by the modulator 104*d* so as to be suitable for wireless communication, converted into a carrier wave by the frequency converter 104*c*, amplified by the large electric power amplifier 104*b*, and then sent from the antenna 104*a*. On the other hand, an electromagnetic wave sent from the group of artificial satellites 90 is received by the antenna 104*a*, amplified by the low noise amplifier 104*h*, converted to an intermediate frequency by the frequency converter 104*i*, and decoded to a digital signal by the demodulator 104*j*. Further, by being error-corrected and deciphered and decoded by the decoder 104*k*, received data 104*l* can be obtained.

By using the satellite traveling on the orbit in accordance with the present invention, communication can be easily performed at a place surrounded with tall buildings or at a place in a mountainous without any communication means. Therefore, since environmental data (weather information, water level (river, lake and so on), earthquake, volcano, carbon monoxide, nitrogen oxide, sulfur dioxide, dioxin and so on) over a wide area can be easily collected, for example, by installing the base station 98 at an environment center and placing the satellite communication send and receive units 104 having the function of monitoring environment at various regions, a speedy and appropriate measure devised to deal with a problem can be performed to protect inhabitants and environment in the district. Further, since there is little limitation in an installation place of the satellite communication send and receive unit 104, the expense necessary for collecting the environment data can be substantially reduced. Furthermore, with regard to timing to send environmental information, there are an urgent communication method (sending is made at the time when a value of environmental data exceeds a predetermined threshold value) and a polling method (by receiving sending request of the center station, the send and receive unit automatically sends the information).

Figure 28:
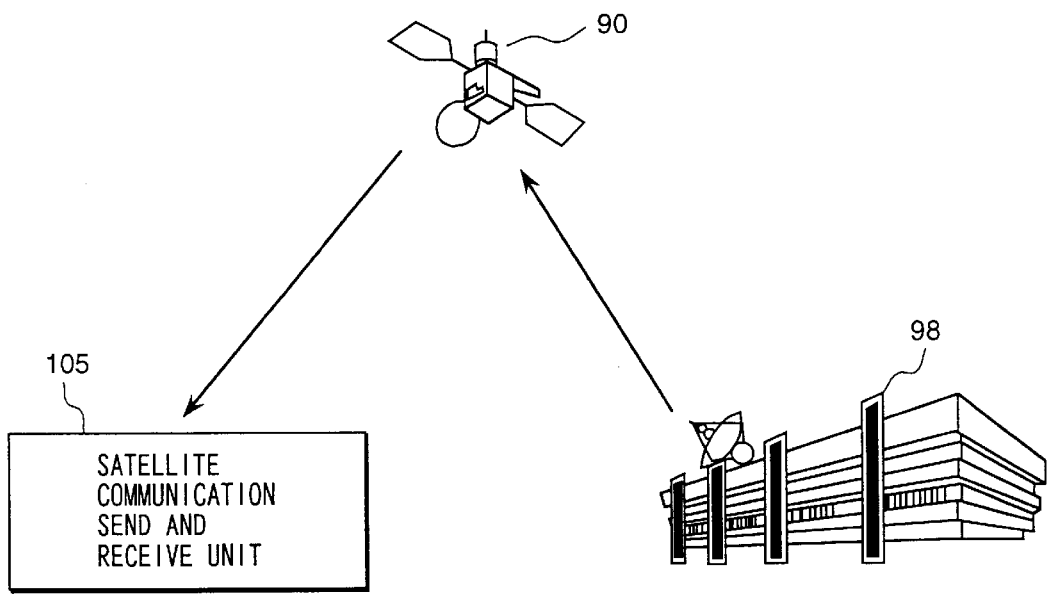
FIG. 28 is an explanatory view showing an example of a satellite communication system to which the present invention is applied.

FIG. 28 shows another embodiment of the satellite communication system.

As shown in FIG. 28, the satellite communication system is composed of a group of artificial satellites 90 having subsystems suitable for the elliptical orbit of the present invention such as an attitude control system, an electric source system, a communication system, a heat control system and the like; a base station 98 for performing satellite communication through the group of artificial satellites 90; and a satellite communication send and receive unit 105 having a function for detecting and monitoring an abnormality and capable of performing communication through the group of artificial satellites 90.

Figure 29:
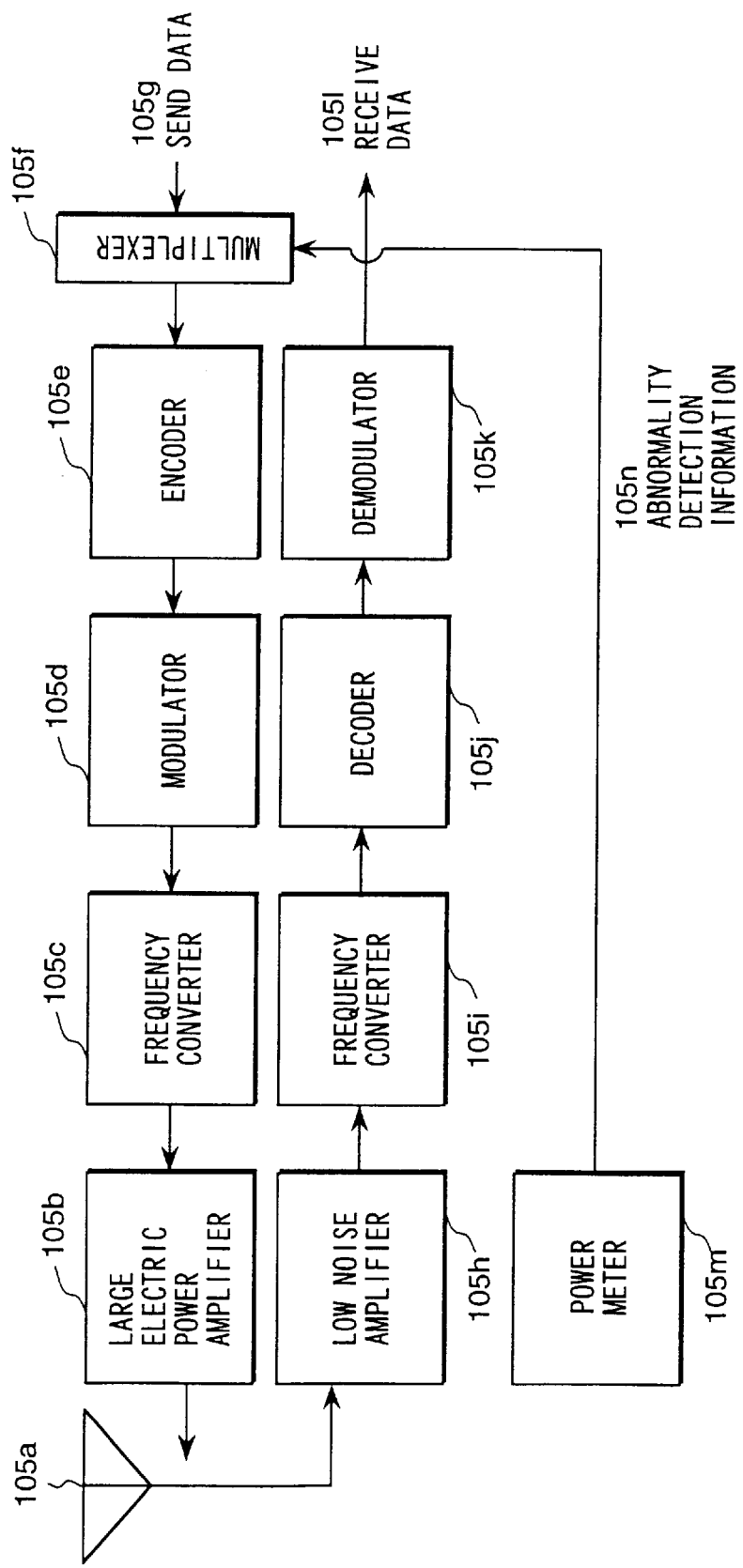
FIG. 29 is an explanatory diagram showing an example of a satellite communication system to which the present invention is applied.

As shown in FIG. 29, the satellite communication send and receive unit 105 is composed of an antenna 104*a*, a large electric power amplifier 105*b*, a frequency converter 105*c*, a modulator 105*d*, an encoder 105*e*, a multiplexer 105*f*, a low noise amplifier 105*h*, a frequency converter 105*i*, a demodulator 105*j*, a decoder 105*k* and a detector 105*m*.

Sent data 105*g* is multiplexed with abnormality detection information 105*n* output from the detector 105*m* by the multiplexer 105*f*, encoded and enciphered and added with error correction code by the encoder 105*e*, and further modulated by the modulator 105*d* so as to be suitable for wireless communication, converted into a carrier wave by the frequency converter 105*c*, amplified by the large electric power amplifier 105*b*, and then sent from the antenna 105*a*. On the other hand, an electromagnetic wave sent from the group of artificial satellites 90 is received by the antenna 105*a*, amplified by the low noise amplifier 105*h*, converted to an intermediate frequency by the frequency converter 105*i*, and decoded to a digital signal by the demodulator 105*j*. Further, by being error-corrected and deciphered and decoded by the decoder 105*k*, received data 105*l* can be obtained.

In this system, an emergency signal can be automatically generated when an abnormality occurs. For example, by installing the base station 98 in a fire station and placing the satellite communication send and receive unit 105 having a function for monitoring an abnormality of a vehicle such as a large impact or operation of an air bag in the vehicle, when a traffic accident occurs, the fire station and an insurance company can be automatically informed of occurrence of an abnormality and accordingly the rescue activity of the driver and the passengers can be speedy performed.

For example, by installing the base station 98 at the Maritime Safety Agency and by installing the satellite communication send and receive unit 105 having a function for monitoring an abnormality of a vehicle such as filling of water or an excessive impact in a ship, the Maritime Safety Agency can be automatically informed of a marine accident when it occurs and accordingly the crew and the passengers can be safely rescued.

Figure 30:
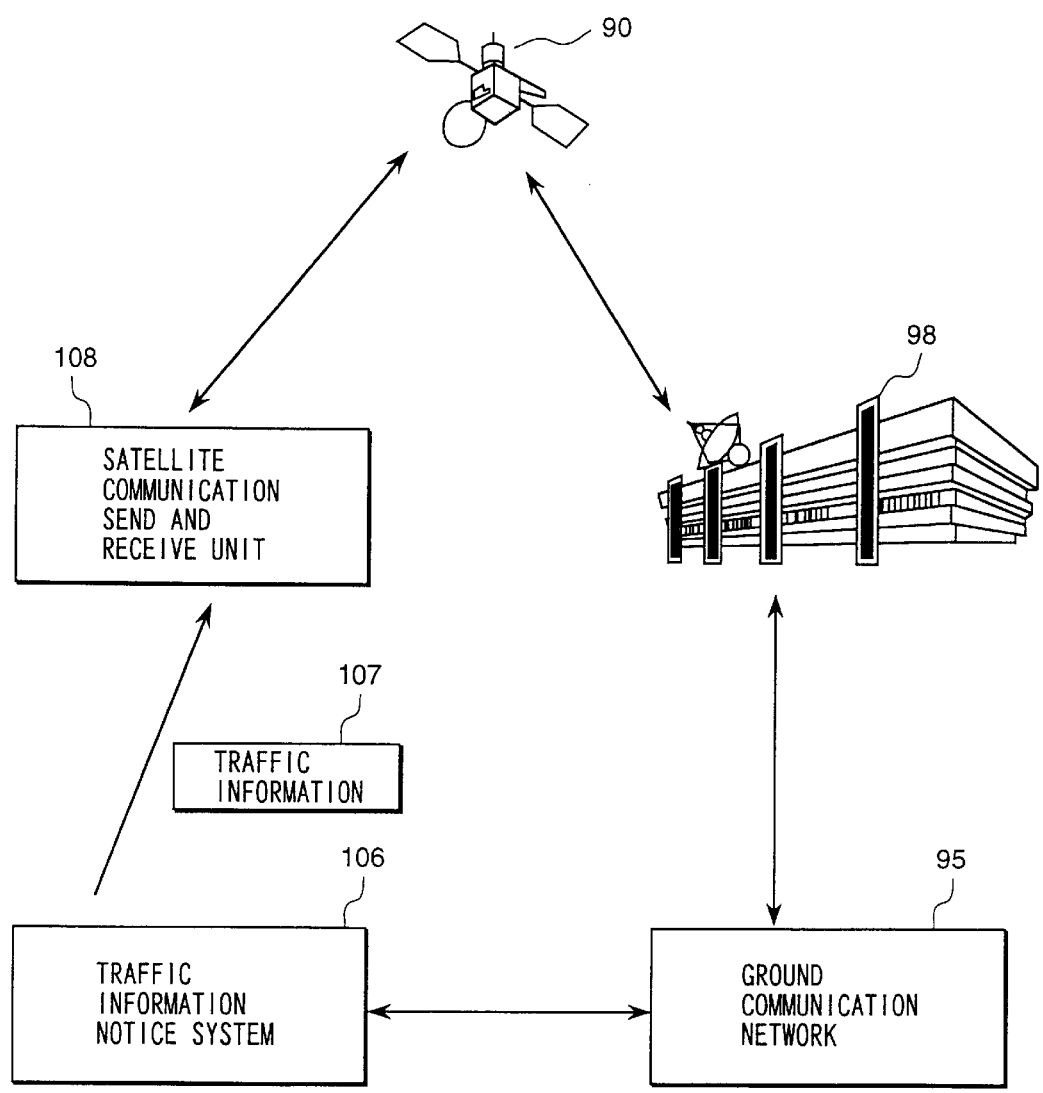
FIG. 30 is an explanatory view showing an example of a satellite communication system to which the present invention is applied.

FIG. 30 shows another embodiment of the satellite communication system.

As shown in FIG. 30, the satellite communication system is composed of a group of artificial satellites 90 having subsystems suitable for the elliptical orbit of the present invention such as an attitude control system, an electric source system, a communication system, a heat control system and the like; a base station 98 for performing satellite communication through the group of artificial satellites 90; a satellite communication send and receive unit 108 having a function for receiving traffic information 107 from a traffic information notice system 106 such as VICS and capable of performing communication through the group of artificial satellites 90; and a ground communication network 95 for transmitting a request from the satellite communication send and receive unit 108 through the base station 98 to the traffic information notice system 106.

As shown in FIG. 30, the base station 98 sends received data obtained from the satellite communication send and receive unit 108 to the traffic information notice system 106 through the ground communication network 95 as a user's request. Further, information from the traffic information notice system 106 is sent to the used as sent data.

Figure 31:
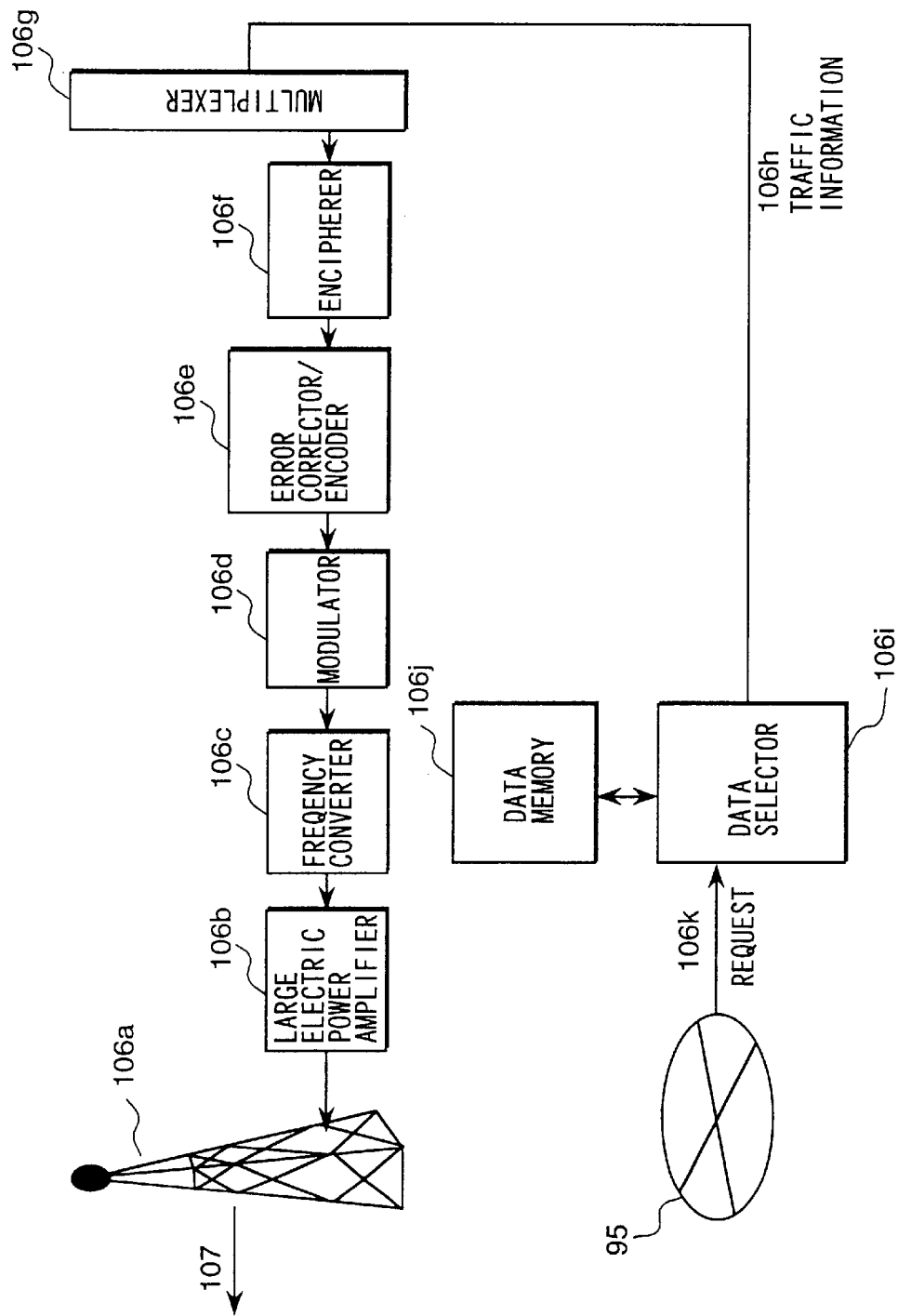
FIG. 31 is an explanatory diagram showing an example of a satellite communication system to which the present invention is applied.

As shown in FIG. 31, the traffic information notice system 106 is composed of an antenna 106*a*, a large electric power amplifier 106*b*, a frequency converter 106*c*, a modulator 106*d*, an error correction encoder 106*e*, an encipherer 106*f*, a multiplexer 106*g*, a data selector 106*i*, a data memory 106*j* and the ground communication network 95.

Request information 106*k* through the ground communication network 95 is input to the data selector 106*i*, and traffic information 106*h* is cited from the data memory 106*j*, if necessary. Further, the traffic information 106*h* is maltiplexed by the multiplexer 106g, enciphered by the encipherer 106f, added with error correction code by the error correction encoder 106e, further modulated by the modulator 106d so as to be suitable for wireless communication, converted into a carrier wave by the frequency converter 106c, amplified by the large electric power amplifier 106b, and then sent from the antenna 106a.

Figure 32:
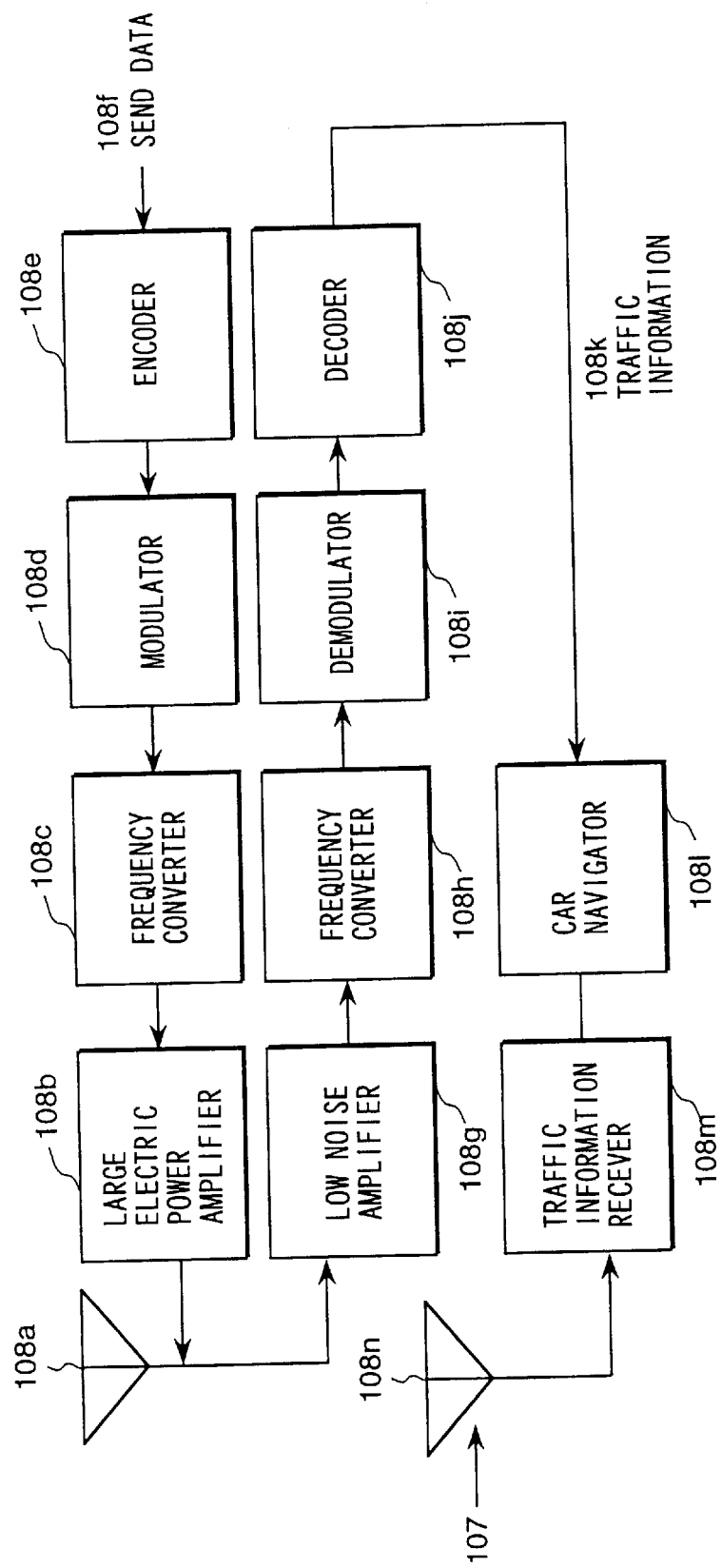
FIG. 32 is an explanatory diagram showing an example of a satellite communication system to which the present invention is applied.

On the other hand, as shown in FIG. 32, the satellite communication send and receive unit 108 is composed of an antenna 108a, a large electric power amplifier 108b, a frequency converter 108c, a demodulator 108d, an encoder 108e, a low noise amplifier 108g, a frequency converter 108h, a demodulator 108i, a decipherer 108j, a traffic information antenna 108n, a traffic information receiver 108m and a car navigator 108l.

A request 108f from the user is encoded and enciphered and added with error correction code by the encoder 108e, and further modulated by the modulator 108d so as to be suitable for wireless communication, converted into a carrier wave by the frequency converter 108c, amplified by the large electric power amplifier 108b, and then sent from the antenna 108a. On the other hand, an electromagnetic wave sent from the group of artificial satellites 90 is received by the antenna 108a, amplified by the low noise amplifier 108g, converted to an intermediate frequency by the frequency converter 108h, and decoded to a digital signal by the demodulator 108i. Further, by being error-corrected and deciphered and decoded by the decoder 108j, traffic information as received data 108k can be obtained and input to the car navigator 108l. Further, traffic information 107 is received by the traffic information antenna 108n, received and demodulated by the traffic information receiver 108m to be input to the car navigator 108l.

In this system, a driver can receive the traffic information 107 such as VICS or the like, but also request desired traffic information from the satellite communication send and receive unit 108 through the base station and the group of satellites 90, and can obtain the information both through the traffic information notice system 106 and through the group of satellites 90. Therefore, he can obtain detailed and timely traffic information.

The traffic information includes the following information.

That is, ITS information (traffic amount information, traffic speed information, traffic congestion place information, traffic congesting time information, driving environment information, stricken area information, traffic restriction information, optimum route information, information on required time in congesting time, parking lot status information, parking lot reservation information, destination information (weather, travel, sightseeing, meals, recreation information), various kinds of reservation information (public transportation, hotels, amusement facilities)), map information (map information, updated information and so on), car navigation information (car navigation information, updated information and so on), software program information (programs for car navigation, programs for game, OS and so on).

(4-3) System Example 3

The system example 3 is an inter-satellite communication system.

Figure 33:
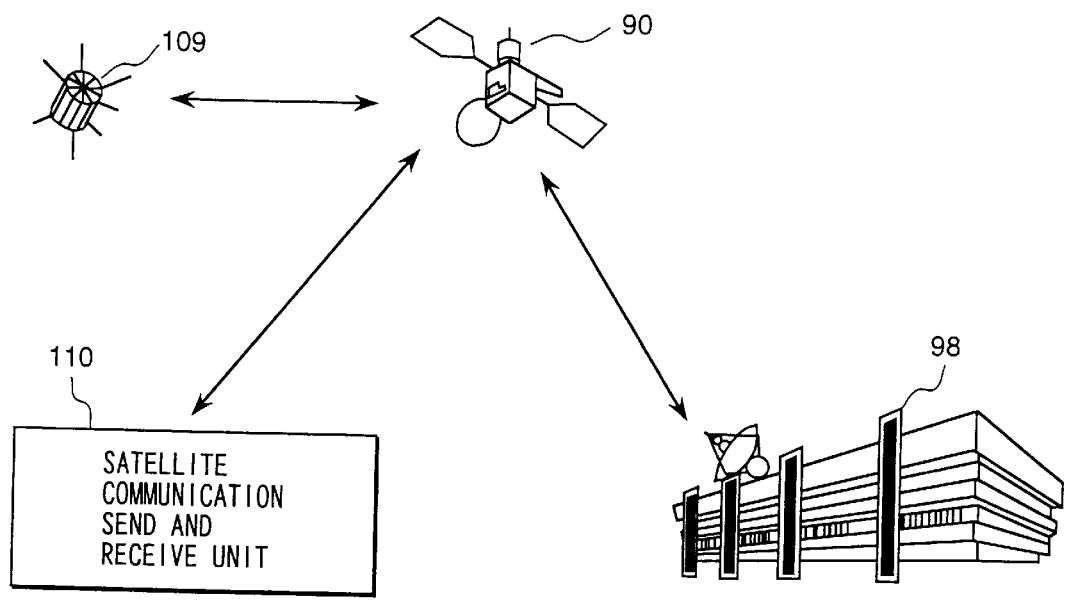
FIG. 33 is an explanatory view showing an example of a satellite-to-satellite communication system to which the present invention is applied.

FIG. 33 shows an embodiment of an inter-satellite communication system in accordance with the present invention.

As shown in FIG. 33, the inter-satellite communication system is composed of a group of artificial satellites 90 having subsystems suitable for the elliptical orbit of the present invention such as an attitude control system, an electric source system, a communication system, a heat control system and the like; a base station 98 for performing satellite communication through the group of artificial satellites 90; a satellite communication send and receive unit 110 and a group of artificial satellites 109, both of which are capable of performing communication through the group of artificial satellites 90.

In this system, in a case where the group of artificial satellites 109 are traveling in such a range that the group of artificial satellites 109 can not directly communicate with the satellite communication send and receive unit 110 or the base station 98 but can communicate with the group of artificial satellites 90, information of the group of artificial satellites 109 can be obtained through the group of artificial satellites 90. Therefore, this system can obtain information over a wider area from the group of artificial satellites 109.

As an example, in a case where the artificial satellite 109 mounts an earth survey unit, the base, station and the satellite communication send and receive unit 110 can receive the survey data, and can request desired survey data. Therefore, this system can obtain desired survey data over a wider area.

(4-4) System Example 4

The system example 4 is an earth survey system.

Figure 34:
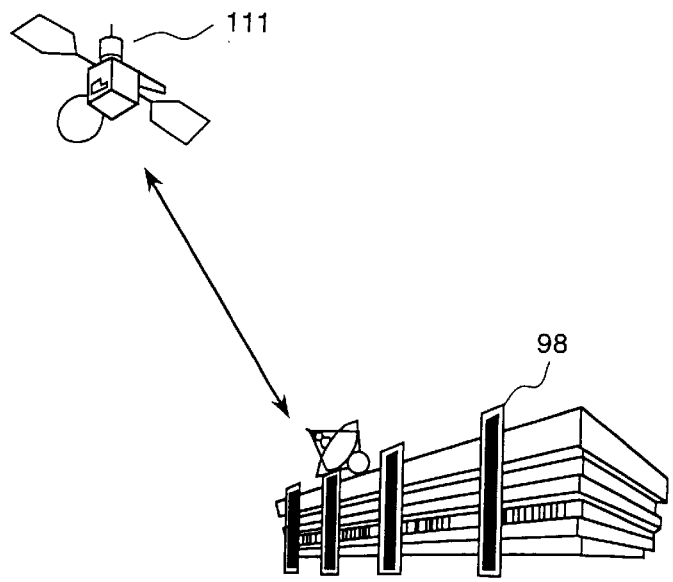
FIG. 34 is an explanatory view showing an example of an earth survey system to which the present invention is applied.

FIG. 34 shows an embodiment of an earth survey system in accordance with the present invention.

As shown in FIG. 34, the earth survey system is composed of a group of artificial satellites 111 having subsystems suitable for the elliptical orbit of the present invention such as an attitude control system, an electric source system, a communication system, a heat control system and the like; and a base station 98 for receiving a survey result sent from the group of artificial satellites 111.

In this system, since the group of artificial satellites 111 travel on the orbit in a high elevation angle to the ground, the earth survey information not affected by shielding objects can be collected by the base station 98.

Finally, service with artificial satellites in the United States will be explained briefly with reference to FIG. 63.

Figure 63:
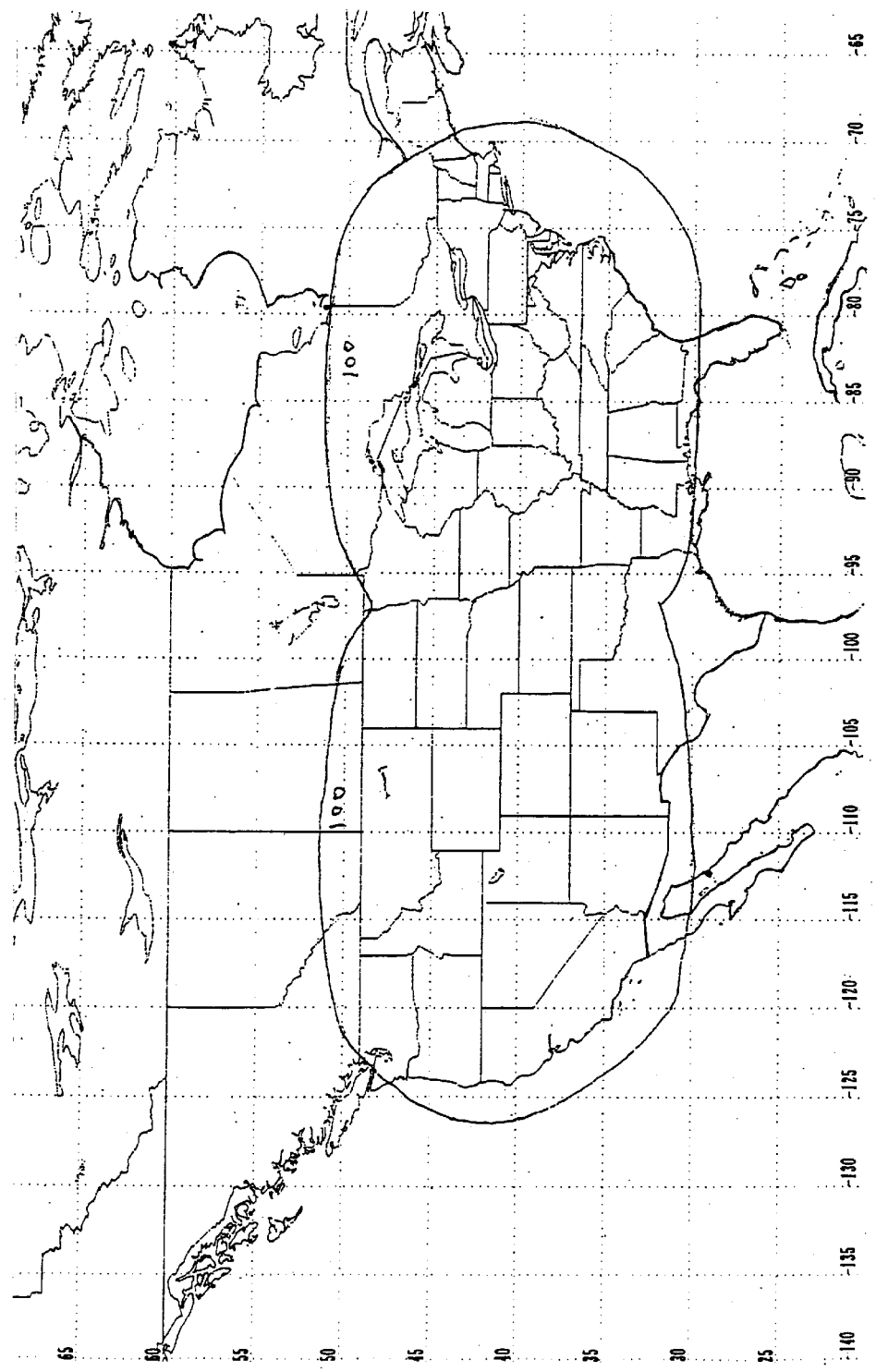
FIG. 63 is a simulation map illustrating service with artificial satellites in the United States.

What is shown in FIG. 63 in terms of contour lines is an example of simulation result of the service time ration (%) with which any artificial satellite located in an elevation angle of 70 degree or higher can be seen with an orbital inclination angle of 45 degrees, an eccentricity squared of 0.15 and an argument of perigee of 270 degrees, in case of attempting to provide a full-time, 24 hours a day, service with two sets of four artificial satellites, that is, totally eight satellites, in the United States.

As for the range of combined parameters for orbital inclination angle and eccentricity squared for two sets of four artificial satellites in the United States, the orbital inclination angle is between 40 degrees and 50 degrees and the eccentricity squared is between 0.15 and 0.25.

Effects obtained by the present invention are as follows.

(1) Effects with Regard to the Method of Setting an Argument of Perigee

According to the present invention, with regard to an elliptical orbit having orbital elements of an arbitrary orbit inclination angle, it is possible to set the orbital elements in taking into consideration change in the argument of perigee caused by the effect of gravitational field of the earth in advance.

(2) Effects with Regard to the Method of Arranging the Orbits of a Plurality of Artificial Satellites According to the present invention, in a case where communication service or broadcast service is concentratively and continuously performed using an arbitrary number of artificial satellites to a specified area on a celestial body of the artificial satellites traveling around, or where surveillance of a specified area on a celestial body of the artificial satellites traveling around or weather of the specified area is concentratively and continuously performed using an arbitrary number of artificial satellites, it is possible to easily set a semi-major axis, an eccentricity, an orbit inclination angle, an argument of perigee, a right ascension of north-bound node and a true anomaly of orbital elements of the artificial satellite.

Further, according to the present invention, using an arbitrary number of artificial satellites, communication service or broadcast service can be concentratively and continuously performed to a specified area on a celestial body which the artificial satellites travel around.

Furthermore, according to the present invention, using an arbitrary number of artificial satellites, surveillance of a specified area on a celestial body of the artificial satellites traveling around or weather of the specified area can be concentratively and continuously performed.

(3) Effects with Regard to Arrangement of a Plurality of Artificial Satellites Having Orbital Elements Employing the Orbital Element Obtained Using the Above-described Items (1) and (2)

According to the present invention, technical requirements to the satellite communication send and receive unit imposed due to short reachable distance of electromagnetic wave can be moderated, and a communication system having s short communication delay time can be constructed.

Further, according to the present invention, since the orbit is nearly circular, it is possible to shorten a breakdown time of communication and broadcast which may occur at service switching time between the plurality of artificial satellites.

Furthermore, according to the present invention, since using three or four artificial satellites, the artificial satellites are arranged so that any one of the artificial satellites is coincidentally visual in the sky in an elevation angle above 70 degrees over the territory of Japan from Nemuro to Naha, communication and broadcast service to a mobile object can be easily performed using the artificial satellites.

(4) Effect Common to the Above Items from (1) to (3)

According to the present invention, it is possible to provide an orbit control system by which orbit control of the artificial satellite can be performed based on the orbital element set by the method described above.

To assist the understanding of the drawings, reference numerals will be explained hereinafter.

In the attached figures, reference numeral 1 is an orbit projected on the ground over a span of one day from reference time, 2 . . . orbit projected on the ground over a span from 1095 day to 1096 day after reference time, 3 . . . orbit projected on the ground over a span from 2190 day to 2191 day after reference time, 4 . . . orbit projected on the ground over a span from 3650 day to 3651 day after reference time, 5 . . . setting of reference time, 6 . . . setting of number n of artificial satellites, 7 . . . setting of a temporary value of argument of perigee ω, 8 . . . setting of a temporary value of orbital semi-major axis a, 9 . . . setting of a temporary value of eccentricity e, 10 . . . setting of a temporary value of orbital inclination angle i, 11 . . . setting of temporary values of right ascension of north-bound node $\Omega_1$ and true anomaly $\theta_1$ of an orbit of an artificial satellite of satellite number 1, 12 . . . setting of temporary values of right ascension of north-bound node $\Omega_k$ and true anomaly $\theta_k$ of an orbit of an artificial satellite of satellite number k, 13 . . . simulation by a computer, 14 . . . evaluation, 15 . . . orbital elements of each artificial satellite at reference time, 17 . . . six orbital elements at reference time, 18 . . . artificial satellite tracking and control facility, 19 . . . control command, 20, 60, 61, 62 . . . artificial satellite, 21 . . . launch vehicle tracking and control facility, 22 . . . target injecting orbit element, 23 . . . launch vehicle, 24 . . . send and receive system, 25 . . . telemetering system, 26 . . . computer system, 27 . . . telemetry, ranging signal, 28 . . . ranging signal, 29 . . . distance and change rate of distance, 30 . . . orbit determining program, 31 . . . six orbital elements, 32 . . . orbit control program, 33 . . . attitude control variable, orbit control variable, 34 . . . command generating program, 35 . . . control command, 36 . . . command, ranging signal, 37 . . . communication system, 38 . . . data processing system, 39 . . . attitude and orbit control system, 40 . . . gas jet unit, 41 . . . attitude control actuator drive, 42 . . . thruster valve drive, 50 . . . the earth, 51 . . . equatorial plane of the earth, 63 . . . orbit of artificial satellite 60, 64 . . . orbit of artificial satellite 61, 65 . . . orbit of artificial satellite 62, 66 . . . ascending node of orbit 63, 67 . . . ascending node of orbit 64, 68 . . . ascending node of orbit 65, 70a . . . artificial satellite a, 70b . . . artificial satellite b, 70c . . . artificial satellite c, 70d . . . artificial satellite d, 71a . . . orbit a of artificial satellite a, 71b . . . orbit b of artificial satellite b, 71c . . . orbit c of artificial satellite c, 71d . . . orbit d of artificial satellite d, 72a . . . ascending node of orbit a, 72b . . . ascending node of orbit b, 72c . . . ascending node of orbit c, 72d . . . ascending node of orbit d, 90 . . . artificial satellite having subsystems such as an attitude control system, a power supply system, a communication system, a heat control system and the like suitable for an elliptical orbit in accordance with the present invention, 91 . . . base station for sending satellite broadcast through artificial satellite 90, 92 . . . satellite broadcast terminal for receiving satellite broadcast through artificial satellite 90, 93 . . . ground broadcast station, 94 . . . satellite broadcast terminal for receiving satellite broadcast through the artificial satellite 90 and a ground broadcast, 95 . . . ground communication network such as public line and cellular phone, 96 . . . base station for sending satellite broadcast through the artificial satellite 90 capable of receiving request from satellite broadcast terminal through the base communication network 95, 97 . . . satellite broadcast terminal having a function of communication with the ground communication network 95 and receiving satellite broadcast through the artificial satellite 90, 98 . . . base station performing satellite communication through the artificial satellite 90, 99 . . . satellite communication send and receive unit for performing satellite communication through the artificial satellite 90, 100 . . . artificial satellites composing a global positioning system, 101 . . . satellite communication send and receive unit having a function capable of measuring its own position using a telemetry signal from the artificial satellites composing a global positioning system and performing satellite communication through the artificial satellite 90, 102 . . . satellite communication send and receive unit having functions of measuring consumed amounts of electricity, city gas and city water and performing satellite communication through the artificial satellite 90, 103 . . . satellite communication send and receive unit having functions of collecting and relaying information of an information network and performing satellite communication through the artificial satellite 90, 104 . . . satellite communication send and receive unit having functions of monitoring environment and performing satellite communication through the artificial satellite 90, 105 . . . satellite communication send and receive unit having functions of detecting abnormality and performing satellite communication through the artificial satellite 90, 106 . . . traffic information informing system, 107 . . . traffic information, 108 . . . satellite communication send and receive unit having functions of receiving the traffic information 107 from the traffic information informing system 106 and performing satellite communication through the artificial satellite 90, 109 . . . artificial satellite, 110 . . . satellite communication send and receive unit for performing satellite communication through the artificial satellite 90, 111 . . . artificial satellite mounting a earth survey sensor and having subsystems such as an attitude control system, a power supply system, a communication system, a heat control system and the like suitable for an elliptical orbit in accordance with the present invention, 151 . . . artificial satellite orbit projected on the ground on which an artificial satellite travels with a 24-hour orbital period, an orbital inclination angle of 42.5 degrees, an eccentricity of 0.21 and an argument of perigee of 210 degrees, 152 . . . artificial satellite orbit projected on the ground on which an artificial satellite travels with a 24-hour orbital period, an orbital inclination angle of 42.5 degrees, an eccentricity of 0.21 and an argument of perigee of 230 degrees, 153 . . . artificial satellite orbit projected on the ground on which an artificial satellite travels with a 24-hour orbital period, an orbital inclination angle of 42.5 degrees, an eccentricity of 0.21 and an argument of perigee of 250 degrees, 154 . . . artificial satellite orbit projected on the ground on which an artificial satellite travels with a 24-hour orbital period, an orbital inclination angle of 42.5 degrees, an eccentricity of 0.21 and an argument of perigee of 270 degrees, 155 . . . artificial satellite orbit projected on the ground on which an artificial satellite travels with a 24-hour orbital period, an orbital inclination angle of 42.5 degrees, an eccentricity of 0.21 and an argument of perigee of 290 degrees, 156 . . . artificial satellite orbit projected on the ground on which an artificial satellite travels with a 24-hour orbital period, an orbital inclination angle of 42.5 degrees, an eccentricity of 0.21 and an argument of perigee of 310 degrees.

What is claimed is:

1. A communication system comprising a plurality of artificial satellites each having a communication unit traveling on elliptical orbits with an orbital period of 24 hours, each of the orbits is formed one of (a) so that an orbital inclination angle is in a range of larger than 37 degrees and smaller than 44 degrees and an eccentricity is not larger than 0.24 and (b) so that an orbital inclination angle is in a range of larger than 40 degrees and smaller than 44 degrees and an eccentricity is in a range of larger than 0.24 and smaller than 0.35.

2. A communication system comprising a group of artificial satellites each having a communication unit, wherein a plurality of elliptical orbits of which an apogee is located above a specified service target area are set so that an angle between right ascensions of north-bound node become a predetermined value, each of the satellites traveling on each of the elliptical orbits, the group of artificial satellites being arranged on said elliptical orbits so that at least one of the artificial satellite having the communication unit is always visible within a predetermined elevation angle with respect to a zenith direction from said service target area, wherein said group of artificial satellites travel with an orbital period of 24 hours on the elliptical orbits, each of the orbits being formed one of (a) so that an orbital inclination angle is in a range of larger than 37 degrees and smaller than 44 degrees and an eccentricity is not larger than 0.24 and (b) so that an orbital inclination angle is in a range of larger than 40 degrees and smaller than 44 degrees and an eccentricity is in a range of larger than 0.24 and smaller than 0.35.

3. A communication system according to any one of claim 1 and claim 2, wherein arguments of perigee are set to values with a predetermined allowance in a setting process of said artificial satellites.

4. A communication system comprising a group of artificial satellites, wherein a plurality of elliptical orbits are set so that each apogee is located above a specified service target area and the orbits projected on the ground nearly agree with one another; each of the artificial satellites having a communication unit and traveling on the elliptical orbit with an orbital period of 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite as seen from said service target area; said artificial satellites being arranged so that when one of said artificial satellites is at the perigee on the orbit, true anomalies of the others of said artificial satellites are separated by an angle corresponding to a time period of the orbital period divided by the number of the satellites; said group of artificial satellites traveling on the elliptical orbits with the-orbital period of 24 hours have each of the orbits formed one of (a) so that an orbital inclination angle is in a range of larger than 37 degrees and smaller than 44 degrees and an eccentricity is not larger than 0.24 and so that an orbital inclination angle is in a range of larger than 40 degrees and smaller than 44 degrees and an eccentricity is in a range of larger than 0.24 and smaller than 0.35.

5. A communication system comprising a group of artificial satellites, wherein a service target area is one of (a) an area set by latitudes and longitudes of four positions of a northernmost end, a southernmost end, a westernmost end and a easternmost end of said service target area and (b) a polygonal area including the service target area set by latitudes and longitudes other than those of said four positions when said service target area is not completely included in a quadrangle having apices of said four positions; a plurality of elliptical orbits being set so that each apogee is located above said service target area and the orbits projected on the ground nearly agree with one another; each of the artificial satellites having a communication unit and traveling on the elliptical orbit with an orbital period of 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite as seen from said service target area; said artificial-satellites being arranged so that when one of said artificial satellites is at the perigee on the orbit, true anomalies of the others of said artificial satellites are separated by an angle corresponding to a time period of the orbital period divided by the number of the satellites; said group of artificial satellites traveling on the elliptical orbits with the orbital period of 24 hours have each of the orbits formed one of (a) so that an orbital inclination angle is in a range of larger than 37 degrees and smaller than 44 degrees and an eccentricity is not larger than 0.24 and (b) so that an orbital inclination angle is in a range of larger than 40 degrees and smaller than 44 degrees and an eccentricity is in a range of larger than 0.24 and smaller than 0.35.

6. A communication system comprising a group of artificial satellites, wherein a service target area is an area selected from the whole world within a range from latitude approximately 70 degrees north to latitude approximately 70 degrees south; a plurality of elliptical orbits being set so that each apogee is located above said service target area and the orbits projected on the ground nearly agree with one another; each of the artificial satellites having a communication unit and traveling on the elliptical orbit with an orbital period of 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite seeing from said service target area; said artificial satellites being arranged so that when one of said artificial satellites is at the perigee on the orbit, true anomalies of the others of said artificial satellites are separated by an angle corresponding to a time period of the orbital period divided by the number of the satellites; an orbital inclination angle and an eccentricity of said elliptical orbit being set to values within corresponding ranges in combination with each other.

7. A communication system comprising a group of artificial satellites, wherein a service target area is an area selected from the whole world within a range from latitude approximately 85 degrees north to latitude approximately 85 degrees south; a plurality of elliptical orbits being set so that each apogee is located above said service target area and the orbits projected on the ground nearly agree with one another; each of the artificial satellites having a communication unit and traveling on the elliptical orbit with an orbital period of 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite seeing from said service target area; said artificial satellites being arranged so that when one of said artificial satellites is at the perigee on the orbit, true anomalies of the others of said artificial satellites are separated by an angle corresponding to a time period of the orbital period divided by the number of the satellites; an orbital inclination angle and an eccentricity of said elliptical orbit being set to values within corresponding ranges in combination with each other.

8. A communication system according to any one of claims 4, 5, 6, and 7, wherein number of said artificial satellites arranged is three or four.

9. A communication system comprising a group of artificial satellites each having a communication unit, wherein a plurality of elliptical orbits of which an apogee is located above a specified service target area are set so that an angle between right ascensions of north-bound node become a predetermined value, each of the satellites traveling on each of the elliptical orbits, the group of artificial satellites being arranged on said elliptical orbits so that at least one of the artificial satellite having the communication unit is always visible within a predetermined elevation angle with respect to a zenith direction from said service target area, wherein said group of artificial satellites are a plurality of artificial satellites of which arguments of perigee are set to values with a predetermined allowance in a setting process of said plurality of artificial satellites.

10. A communication system comprising a group of artificial satellites, wherein a service target area is an area set by latitudes and longitudes of four positions of a northernmost end, a southernmost end, a westernmost end and a easternmost end of said service target area, or a polygonal area including the whole service target area set by latitudes and longitudes other than those of said four positions when said service target area is not completely included in said quadrangle having apices of said four positions; a plurality of elliptical orbits being set so that each apogee is located above said service target area and the orbits projected on the ground nearly agree with one another; each of the artificial satellites having a communication unit and traveling on the elliptical orbit with an orbital period of 12 hours or 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite seeing from said service target area; said artificial satellites being arranged so that when one of said artificial satellites is at the perigee on the orbit, true anomalies of the others of said artificial satellites are separated by an angle corresponding to a time period of the orbital period divided by the number of the satellites; an orbital inclination angle and an eccentricity of said elliptical orbit being set to values within corresponding ranges in combination with each other; said group of artificial satellites being a plurality of artificial satellites of which arguments of perigee are set to values with a predetermined allowance in a setting process of said plurality of artificial satellites.

11. A communication system comprising a group of artificial satellites, wherein a service target area is an area selected from the whole world within a range from latitude approximately 70 degrees north to latitude approximately 70 degrees south; a plurality of elliptical orbits being set so that each apogee is located above said service target area and the orbits projected on the ground nearly agree with one another; each of the artificial satellites having a communication unit and traveling on the elliptical orbit with an orbital period of 12 hours or 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite seeing from said service target area; said artificial satellites being arranged so that when one of said artificial satellites is at the perigee on the orbit, true anomalies of the others of said artificial satellites are separated by an angle corresponding to a time period of the orbital period divided by the number of the satellites; an orbital inclination angle and an eccentricity of said elliptical orbit being set to values within corresponding ranges in combination with each other; said group of artificial satellites being a plurality of artificial satellites of which arguments of perigee are set to values with a predetermined allowance in a setting process of said plurality of artificial satellites.

12. A communication system comprising a group of artificial satellites, wherein a service target area is an area selected from the whole world within a range from latitude approximately 85 degrees north to latitude approximately 85 degrees south; a plurality of elliptical orbits being set so that each apogee is located above said service target area and the orbits projected on the ground nearly agree with one another; each of the artificial satellites having a communication unit and traveling on the elliptical orbit with an orbital period of 12 hours or 24 hours being arranged on each of the orbits; right ascensions of north-bound node of said orbits being separated by an angle of 360 degrees divided by number of the satellites; said artificial satellites being arranged so that at least one of said artificial satellites is always visible at a higher angle position than a maximum elevation angle of a stationary satellite seeing from said service target area; said artificial satellites being arranged so that when one of said artificial satellites is at the perigee on the orbit, true anomalies of the others of said artificial satellites are separated by an angle corresponding to a time period of the orbital period divided by the number of the satellites; an orbital inclination angle and an eccentricity of said elliptical orbit being set to values within corresponding ranges in combination with each other; said group of artificial satellites being a plurality of artificial satellites of which arguments of perigee are set to values with a predetermined allowance in a setting process of said plurality of artificial satellites.

13. A communication system according to any one of claims 9, 10, 11 and 12, wherein number of said artificial satellites arranged is three or four.

14. A communication system according to any one of claims 9, 10, 11 and 12, wherein said setting range of argument of perigee is 210 to 290 degrees.

15. A communication system according to any one of claims 9, 10, 11 and 12, wherein an initial value on the orbit to said setting range of argument of perigee is not larger than 270 degrees.

16. An orbit arranging method for artificial satellites, wherein a plurality of artificial satellites are arranged so that four elements of a semi-major axis, an eccentricity, an argument of perigee and an orbital inclination angle of the artificial satellite traveling on an orbit are set to nearly equal values among the artificial satellites, and said value of argument of perigee is set with a predetermined allowance.

17. An orbit arranging method for artificial satellites, wherein a plurality of artificial satellites are arranged so that four elements of a semi-major axis, an eccentricity, an argument of perigee and an orbital inclination angle of the artificial satellite traveling on an orbit are set to nearly equal values among the artificial satellites and so as to be spaced a true anomaly of nearly 360 degrees/N (N is number of the satellites), and said value of argument of perigee is set with a predetermined allowance.

18. A communication system comprising a group of artificial satellites each having a communication system composed of three or four artificial satellites traveling on different three or four elliptical orbits, wherein each of said artificial satellites is arranged on each of said elliptical orbits; a semi-major axis among orbital elements of each of the artificial satellites being set so that an orbital period becomes 24 hours, the orbit on which each of the artificial satellites travels being formed one of (a) so that an orbital inclination angle is in a range of larger than 37 degrees and smaller than 44 degrees and an eccentricity is not larger than 0.24 and (b) so that an orbital inclination angle is larger than 40 degrees and smaller than 44 degrees and an eccentricity is larger than 0.24 and smaller than 0.35; orbital configuration of each of the artificial satellites is formed so that four elements of a semi-major axis, an eccentricity, an argument of perigee and an orbital inclination angle of the artificial satellite traveling on an orbit are set to nearly equal values among the artificial satellites, and said value of argument of perigee is set with a predetermined allowance.

19. A tracking and controlling facility for tracking and controlling an artificial satellite, wherein an artificial satellite to be tracked and controlled is (1) an artificial satellite traveling on an elliptical orbit with an orbital period of 24 hours, the orbit is formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (2) an artificial satellite traveling on an elliptical orbit, wherein an argument of perigee is set to a value with a predetermined allowance in a setting process of said artificial satellite; or (3) an artificial satellite traveling on an orbit derived from the orbit arranging method according to any one of claims 18 and 19, or a group of artificial satellites to be tracked and controlled are (4) a group of artificial satellites composed of three or four artificial satellites traveling on different three or four elliptical orbits, wherein each of said artificial satellites is arranged on each of said elliptical orbits; a semi-major axis among orbital elements of each of the artificial satellites being set so that an orbital period becomes 24 hours, the orbit on which each of the artificial satellites travels being formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (5) a group of artificial satellites composed of three or four artificial satellites traveling on different three or four elliptical orbits, wherein an argument of perigee is set to a value with a predetermined allowance in a setting process of each of said group of artificial satellites.

20. A satellite broadcast system comprising an artificial satellite, a satellite broadcast terminal for receiving satellite broadcast through said artificial satellite, and a base station for performing broadcast to the satellite broadcast terminal through said artificial satellite, wherein said artificial satellite is (1) an artificial satellite traveling on an elliptical orbit with an orbital period of 24 hours, the orbit is formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (2) an artificial satellite traveling on an elliptical orbit, wherein an argument of perigee is set to a value with a predetermined allowance in a setting process of said artificial satellite; or (3) an artificial satellite traveling on an orbit derived from the orbit arranging method according to any one of claims 18, and 19, or a group of artificial satellites to be tracked and controlled are (4) a group of artificial satellites composed of three or four artificial satellites traveling on different three or four elliptical orbits, wherein each of said artificial satellites is arranged on each of said elliptical orbits; a semi-major axis among orbital elements of each of the artificial satellites being set so that an orbital period becomes 24 hours, the orbit on which each of the artificial satellites travels being formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (5) a group of artificial satellites composed of three or four artificial satellites traveling on different three or four elliptical orbits, wherein an argument of perigee is set to a value with a predetermined allowance in a setting process of each of said group of artificial satellites.

21. A satellite broadcast terminal used in the satellite broadcast system described in claim 20, which comprises
means for receiving satellite broadcast through the artificial satellite and means for receiving an electromagnetic wave from a ground broadcast station.

22. A satellite broadcast terminal used in the satellite broadcast system described in claim 20, which comprises
means for receiving satellite broadcast through the artificial satellite and means for sending information to the base station by a communication means not through the artificial satellite.

23. A mobile object comprising the satellite broadcast terminal described in any one of claims 20 to 21.

24. A satellite communication system comprising at least an artificial satellite, a for performing satellite communication through said artificial satellite and a base station for performing communication with the satellite communication send and receive apparatus through said artificial satellite, wherein
said artificial satellite is (1) an artificial satellite traveling on an elliptical orbit with an orbital period of 24 hours, the orbit is formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (2) an artificial satellite traveling on an orbit derived from the orbit arranging method according to any one of claims 18 and 19, or a group of artificial satellites to be tracked and controlled are (3) a group of artificial satellites composed of three or four artificial satellites traveling on different three or four elliptical orbits, wherein each of said artificial satellites is arranged on each of said elliptical orbits; a semi-major axis among orbital elements of each of the artificial satellites being set so that an orbital period becomes 24 hours, the orbit on which each of the artificial satellites travels being formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (4) a group of artificial satellites composed of three or four artificial satellites traveling on different three or four elliptical orbits, wherein an argument of perigee is set to a value with a predetermined allowance in a setting process of each of said group of artificial satellites.

25. A satellite communication send and receive apparatus used in the satellite communication system described in claim 24, which comprises
means for performing satellite communication through the artificial satellite; and a measuring means for measuring at least its own position by receiving an electromagnetic wave from a GPS satellite.

26. A satellite communication send and receive apparatus used in the satellite communication system described in claim 24, which comprises
means for performing satellite communication through the artificial satellite; and a measuring means for measuring a consumed amount with regard to at least one of electricity, city gas and city water.

27. A satellite communication send and receive apparatus used in the satellite communication system described in claim 24, which comprises
means for performing satellite communication through the artificial satellite; and means for collecting and relaying information on an information network.

28. A satellite communication send and receive apparatus used in the satellite communication system described in claim 24, which comprises
means for performing satellite communication through the artificial satellite; and means for monitoring environment.

29. A satellite communication send and receive apparatus used in the satellite communication system described in claim 24, which comprises
means for performing satellite communication through the artificial satellite; and means for detecting an abnormality.

30. A mobile object comprising the satellite communication send and receive apparatus described in any one of claims 25 to 29.

31. A survey ground station for receiving a survey result transmitted from an artificial satellite mounting an earth survey unit, wherein
a satellite communication system comprising at least an artificial satellite, a for performing satellite communication through said artificial satellite and a base station for performing communication with the satellite communication send and receive apparatus through said artificial satellite, wherein
said artificial satellite is (1) an artificial satellite traveling on an elliptical orbit with an orbital period of 24 hours, the orbit is formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (2) an artificial satellite traveling on an orbit derived from the orbit arranging method according to any one of claims 18 and 19, or a group of artificial satellites to be tracked and controlled are (3) a group of artificial satellites composed of three or four artificial satellites traveling on different three or four elliptical orbits, wherein each of said artificial satellites is arranged on each of said elliptical orbits; a semi-major axis among orbital elements of each of the artificial satellites being set so that an orbital period becomes 24 hours, the orbit on which each of the artificial satellites travels being formed so that an orbital inclination angle is larger than 37 degrees and smaller than 44 degrees and an eccentricity is not larger than 0.24, or so that an orbital inclination angle is larger than 40 degrees and smaller than 44 degrees and an eccentricity is larger than 0.24 and smaller than 0.35; or (4) a group of artificial satellites composed of three or four artificial satellites traveling on different three or four elliptical orbits, wherein an argument of perigee is set to a value with a predetermined allowance in a setting process of each of said group of artificial satellites.

32. A communication system according to claim 1, wherein the plurality of artificial satellites comprise at least three artificial satellites.

* * * * *